(12) United States Patent
Yoshiike et al.

(10) Patent No.: US 8,306,657 B2
(45) Date of Patent: Nov. 6, 2012

(54) CONTROL DEVICE FOR LEGGED MOBILE ROBOT

(75) Inventors: Takahide Yoshiike, Wako (JP); Hiroyuki Kaneko, Wako (JP); Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 12/912,167

(22) Filed: Oct. 26, 2010

(65) Prior Publication Data

US 2011/0098856 A1  Apr. 28, 2011

(30) Foreign Application Priority Data

Oct. 28, 2009 (JP) ................................. 2009-248165

(51) Int. Cl.
*G05B 19/04* (2006.01)
(52) U.S. Cl. ........ 700/246; 700/245; 700/252; 700/254; 700/260; 901/1; 901/47; 901/50
(58) Field of Classification Search .................. 700/245, 700/246, 252, 254, 260; 901/1, 47, 50
See application file for complete search history.

(56) References Cited

U.S. PATENT DOCUMENTS

| | | | | |
|---|---|---|---|---|
| 5,838,130 A * | 11/1998 | Ozawa | ...................... | 318/568.2 |
| 6,992,457 B2 * | 1/2006 | Furuta et al. | ............. | 318/568.12 |
| 6,999,851 B2 * | 2/2006 | Kato et al. | ..................... | 700/245 |
| 7,236,852 B2 * | 6/2007 | Moridaira et al. | ............ | 700/245 |
| 7,386,364 B2 * | 6/2008 | Mikami et al. | ................ | 700/245 |
| 7,606,634 B2 * | 10/2009 | Takenaka et al. | ............. | 700/260 |
| 7,734,377 B2 * | 6/2010 | Hasegawa | ..................... | 700/252 |
| 2004/0205417 A1 * | 10/2004 | Moridaira et al. | .............. | 714/48 |
| 2007/0126387 A1 * | 6/2007 | Takenaka et al. | .......... | 318/568.2 |
| 2007/0152620 A1 * | 7/2007 | Takenaka et al. | ......... | 318/568.13 |
| 2008/0065269 A1 * | 3/2008 | Hasegawa | ..................... | 700/260 |
| 2008/0208391 A1 * | 8/2008 | Hasegawa et al. | ............ | 700/245 |
| 2009/0312867 A1 * | 12/2009 | Hasegawa et al. | ............ | 700/245 |

FOREIGN PATENT DOCUMENTS

JP            05-337849       12/1993

* cited by examiner

*Primary Examiner* — Dalena Tran
*Assistant Examiner* — Jonathan L Sample
(74) *Attorney, Agent, or Firm* — Rankin, Hill & Clark LLP

(57) ABSTRACT

A control device for a legged mobile robot has a first motion determiner which sequentially determines the instantaneous value of a first motion of a robot by using a first dynamic model and a second motion determiner which sequentially determines the instantaneous value of a second motion of the robot by using a second dynamic model, and sequentially determines a desired motion of the robot by combining the first motion and the second motion. A low frequency component and a high frequency component of a feedback manipulated variable having a function for bringing a posture state amount error, which indicates the degree of the deviation of an actual posture of the robot from a desired posture, close to zero are fed back to the first motion determiner and the second motion determiner, respectively.

12 Claims, 27 Drawing Sheets

ORIGIN OF SUPPORTING LEG COORDINATE SYSTEM

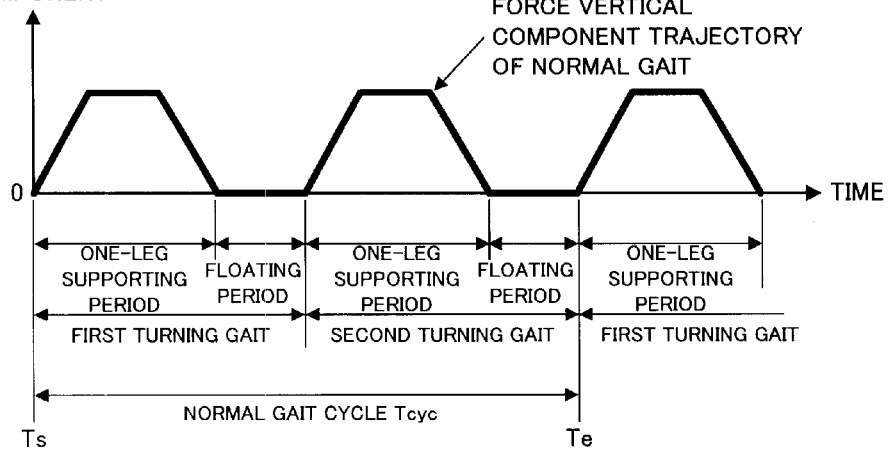
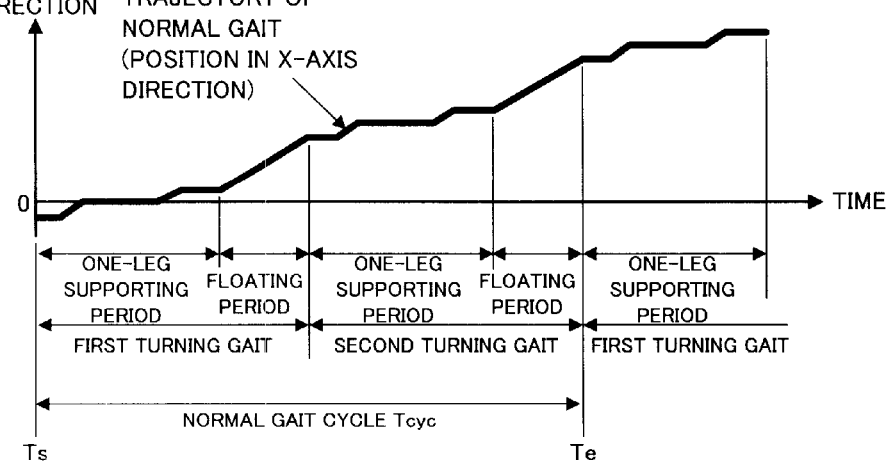

CONTROL DEVICE FOR LEGGED MOBILE ROBOT

BACKGROUND OF THE INVENTION

1. Field of the Invention

The present invention relates to a control device for a legged mobile robot, such as a bipedal walking robot.

2. Description of the Related Art

As a technique for enhancing the stability of the posture of a legged mobile robot, which travels by moving a plurality of legs extended from a base body, the technique disclosed in, for example, Japanese Patent No. 3269852, has been proposed by the applicant of the present application.

According to the technique, a state amount deviation of an actual posture of the body of a robot from a desired posture is observed, and an operational moment (an operational moment about a desired ZMP) to be additionally applied to the robot is calculated according to a PD law (proportional-differential law) from the observed value of the state amount deviation as the feedback manipulated variable (control input) required to converge the state amount deviation to zero.

Further, the operational moment is divided into an actual robot manipulation moment to be directly applied to an actual robot and a model manipulation moment to be applied to a robot in a dynamic model for generating a desired gait of the robot.

In the actual robot, the motions of the actual robot are controlled by compliance control such that the actual motion of the robot follows the motion of a desired gait (desired motion) while generating the actual robot manipulation moment about the desired ZMP. Further, in the dynamic model, a desired gait of the robot is generated such that a model manipulation moment is generated about the desired ZMP.

Thus, in the case where the actual posture of the body of the robot deviates from a desired posture due to a disturbance or the like, a floor reaction force moment for eliminating the deviation is applied to the robot.

To determine a desired motion that allows the actual motion of a legged mobile robot to stably continue by using an appropriate dynamic model, the desired motion is required to be determined such that a variety of requirements is satisfied. Typical requirements are that a desired ZMP (the position of a desired total floor reaction force central point) does not deviate from a predetermined zone (e.g., a supporting polygon), and that the desired motion of the robot does not diverge, i.e., the desired motion enables the robot to accomplish continuous motion. Frequently, such a desired motion cannot be generated by analytical arithmetic processing. Consequently, there are many cases where arithmetic processing that requires relatively high arithmetic load, such as exploratory arithmetic processing, is required to generate the desired motion.

Hence, in the case where the motion of the robot is controlled especially while sequentially determining a desired motion of the robot in real time, the cycle of the processing for generating a desired motion frequently has to be set to rather long time in order to leave a certain allowance.

Meanwhile, in order to particularly achieve still faster motions of a legged mobile robot, it is considered desirable to effect the adjustment or correction of the desired motion of the robot to eliminate the deviation of the actual posture of the robot from a desired posture as quickly as possible.

However, if the cycle of the processing for calculating a desired motion has to be set to rather long time, as described above, then it is difficult to ensure high responsiveness in adjusting the desired motion when the actual posture of the robot deviates from a desired posture. This in turn inconveniently makes it difficult to achieve still faster motions of the robot.

SUMMARY OF THE INVENTION

The present invention has been made with the background described above, and it is an object of the invention to provide a control device for a legged mobile robot which is capable of controlling the motion of a robot to a proper desired motion while sequentially determining a desired motion such that the deviation of an actual posture of the robot from a desired posture can be promptly compensated for.

To this end, a control device for a legged mobile robot in accordance with the present invention is adapted to control the motion of a legged mobile robot, which travels by moving a plurality of legs extended from a base body thereof, so as to cause the actual motion of the robot to follow the time series of an instantaneous value of a desired motion while sequentially determining the instantaneous value of the desired motion of the robot by using a dynamic model expressing the dynamics of the robot, the control device including:

a first motion determining unit which uses a first dynamic model preset for expressing the dynamics of the robot to carry out first arithmetic processing for calculating the motion of a robot on the first dynamic model, thereby sequentially determining the instantaneous value of a first motion constituting a desired motion of the robot;

a second motion determining unit which uses a second dynamic model preset for expressing the dynamics of the robot to carry out second arithmetic processing for calculating the motion of a robot on the second dynamic model, thereby sequentially determining the instantaneous value of a second motion constituting a desired motion of the robot;

a desired motion determining unit which sequentially determines an instantaneous value of the desired motion by combining an instantaneous value of the first motion and an instantaneous value of the second motion;

a motion control unit which controls the motion of the robot such that the actual motion of the robot follows the time series of an instantaneous value of the desired motion;

a feedback manipulated variable determining unit which sequentially observes a posture state amount error indicating the degree of deviation of an actual posture of the robot from a posture of the robot defined by an instantaneous value of the desired motion and sequentially determines, on the basis of the observed value of the posture state amount error, a model basic manipulated variable, which is a feedback manipulated variable for manipulating at least the first dynamic model and the second dynamic model as a feedback manipulated variable having a function for bringing the posture state amount error close to zero; and a model external force manipulated variable determining unit which sequentially determines, on the basis of the model basic manipulated variable, a first model external force manipulated variable that defines an additional external force to be additionally applied to the robot on the first dynamic model and a second model external force manipulated variable that defines an additional external force to be additionally applied to the robot on the second dynamic model as the manipulated variables to be distributed to the first dynamic model and the second dynamic model, respectively, from the model basic manipulated variable, wherein the execution cycle of the processing by the second motion determining unit, the desired motion determining unit, the motion control unit, and the feedback manipulated variable determining unit, respectively, and the execution cycle of the processing for determining at least the second model external force manipulated variable in the processing by the model external force manipulated variable determining unit are set to be shorter than the execution cycle of the processing by the first motion determining unit, the first motion determining unit carries out the first arithmetic processing while additionally applying the additional external force defined by the determined first model external force manipulated variable to the robot on the first dynamic model, the second motion determining unit carries out the second arithmetic processing while additionally applying the additional external force defined by the determined second model external force manipulated variable to the robot on the second dynamic model, and the model external force manipulated variable determining unit determines the first model external force manipulated variable and the second model external force manipulated variable such that the sensitivity of a change in the first model external force manipulated variable to a low frequency component is relatively higher than to a high frequency component out of the low frequency component and the high frequency component constituting the model basic manipulated variable and that the sensitivity of a change in the second model external force manipulated variable to the high frequency component is relatively higher than to the low frequency component (a first aspect of the invention).

In the present description, the term "external force" acting on the robot may mean only a floor reaction force acting from a floor of an environment in which a robot travels or may also include an external force other than the floor reaction force. For example, in a case where a robot comes in contact with an external object other than a floor while the robot is working, e.g., carrying an object, the reaction force received from the object is also included in the "external force." Further, the term "floor" used in the present description does not only mean a floor in a usual sense, such as an indoor floor, but also means a ground or a road surface outdoors.

According to the first aspect of the invention described above, as the feedback manipulated variable having a function for bringing the posture state amount error to zero, the model basic manipulated variable determined by the feedback manipulated variable determining unit is divided by the model external force manipulated variable determining unit into the first model external force manipulated variable to be fed back to the first dynamic model of the first motion determining unit and the second model external force manipulated variable to be fed back to the second dynamic model of the second motion determining unit.

At this time, the model external force manipulated variable determining unit determines the first model external force manipulated variable and the second model external force manipulated variable such that the sensitivity of a change in the first model external force manipulated variable in response to a low frequency component is relatively higher than to a high frequency component out of the low frequency component and the high frequency component constituting the model basic manipulated variable and that the sensitivity of a change in the second model external force manipulated variable in response to the high frequency component is relatively higher than to the low frequency component. In other words, the first model external force manipulated variable and the second model external force manipulated variable are determined such that a major component of the first model external force manipulated variable provides a low frequency component of the model basic manipulated variable and a major component of the second model external force manipulated variable provides a high frequency component of the model basic manipulated variable. Alternatively, the low frequency component and the high frequency component of the model basic manipulated variable may be directly determined as the first model external force manipulated variable and the second model external force manipulated variable, respectively.

In this case, the execution cycle of the processing by the feedback manipulated variable determining unit and the execution cycle of at least the processing for determining the second model external force manipulated variable in the processing carried out by the model external force manipulated variable determining unit are relatively short cycles. Hence, the model basic manipulated variable and the second model external force manipulated variable are determined, properly reflecting the posture state amount error even if the posture state amount error exhibits a relatively quick change.

Further, the first motion determining unit carries out the first arithmetic processing while additionally applying the additional external force defined by the first model external force manipulated variable to the robot on the first dynamic model. Thus, the instantaneous value of the first motion is sequentially determined by the first motion determining unit such that the instantaneous value leads to a motion that causes the posture state amount error which exhibits a relatively slow change to approach to zero.

In this case, the first model external force manipulated variable to be input to the first motion determining unit has the low frequency component of the model basic manipulated variable as the major component thereof. This makes it possible to sequentially determine the instantaneous value of the first motion such that the posture state amount error exhibiting a relatively slow change is properly brought close to zero even if the execution cycle of the processing by the first motion determining unit is a relatively long cycle.

Further, the second motion determining unit carries out the second arithmetic processing while additionally applying the additional external force defined by the second model external force manipulated variable to the robot on the second dynamic model. Thus, the instantaneous value of the second motion is sequentially determined by the second motion determining unit such that the instantaneous value leads to a motion that causes the posture state amount error, which exhibits a relatively quick change, to approach zero.

In this case, the second model external force manipulated variable to be input to the second motion determining unit has the high frequency component of the model basic manipulated variable as the major component thereof. In addition, the execution cycle of the processing carried out by the second motion determining unit is shorter than the execution cycle of the processing carried out by the first motion determining unit. This arrangement makes it possible to sequentially determine the instantaneous value of the second motion such that the posture state amount error exhibiting a relatively quick change is properly brought close to zero.

Then, the instantaneous value of the first motion and the instantaneous value of the second motion determined as described above are sequentially combined by the desired motion determining unit. Thus, an instantaneous value of the desired motion that reflects both the low frequency component and the high frequency component of the model basic manipulated variable is sequentially determined.

Further, the motion control unit controls the motion of the robot to cause the actual motion of the robot to follow the time series of the instantaneous value of the desired motion.

In this case, the processing by the desired motion determining unit and the motion control unit is carried out at a relatively short cycle, as with the processing by the second motion determining unit. Therefore, even if the posture state amount error exhibits a relatively quick change, the processing by the desired motion determining unit and the motion control unit can be carried out with high responsiveness.

Thus, according to the first aspect of the invention, the motion of the robot can be controlled while sequentially determining the instantaneous value of a desired motion of the robot such that the posture state amount error is properly brought close to zero, independently of whether the posture state amount error exhibits a relatively slow or quick change. In other words, the first aspect of the invention makes it possible to control the motion of the robot to a proper desired motion while sequentially determining a desired motion that allows the deviation of the actual posture of the robot from a desired posture to be promptly compensated for.

Further, the first model external force manipulated variable to be fed back to the first motion determining unit has the low frequency component of the model basic manipulated variable as the major component thereof. Therefore, even if the processing by the first motion determining unit has a relatively long cycle, the instantaneous value of the first motion can be sequentially determined, properly reflecting the first model external force manipulated variable. This enables the first motion determining unit to determine a highly reliable first motion by using a dynamic model having a high dynamic accuracy as the first dynamic model.

Meanwhile, the second model external force manipulated variable to be fed back to the second motion determining unit uses the high frequency component of the model basic manipulated variable as the major component thereof. In this case, a highly reliable first motion can be determined as described above, thus enabling the second motion determining unit to use a simple dynamic model which requires relatively short calculation time. Thus, the instantaneous value of the second motion can be sequentially determined at a faster cycle while properly reflecting the second model external force manipulated variable having the high frequency component of the model basic manipulated variable as the major component thereof.

Supplementarily, in the first aspect of the invention, regarding the processing by the first motion determining unit, additionally applying the additional external force defined by the first model external force manipulated variable to the robot on the first dynamic model means adding the additional external force to the external force to be applied to the robot on the first dynamic model (a reference desired external force) in the case where the additional external force is maintained at zero. The same applies also to the processing by the second motion determining unit in which the additional external force defined by the second model external force manipulated variable is additionally applied to the robot on the second dynamic model.

Further, as examples of the model basic manipulated variable, the first model external force manipulated variable, and the second model external force manipulated variable, the desired value of the additional external force (the translational force of a floor reaction force, a floor reaction force moment or the like, or a force moment) or the correction amount of a desired value of the point of action of an external force may be used.

Further, the posture state amount error may include, for example, the angular difference between a desired posture and an actual posture of the base body or the temporal change rate thereof, or a value obtained by multiplying the angular difference or the temporal change rate thereof by a predetermined value, or a difference in the horizontal direction between the position of the center-of-gravity point of the base body in a desired motion and the position of the center-of-gravity point of an actual base body or the temporal change rate thereof.

In the aforesaid first aspect of the invention, for example, the model external force manipulated variable determining unit may determine the first model external force manipulated variable and the second model external force manipulated variable, as described below. The model external force manipulated variable determining unit sequentially acquires the low frequency component and the high frequency component from the model reference manipulated variable by using at least one of a low-pass filter and a high-pass filter, and determines the acquired low frequency component and the high frequency component as the first model external force manipulated variable and the second model external force manipulated variable, respectively (a second aspect of the invention).

According to the second aspect of the invention, the first model external force manipulated variable and the second model external force manipulated variable can be easily determined by using at least one of the low-pass filter and the high-pass filter.

To be more specific, for example, the low frequency component can be acquired by passing the model basic manipulated variable through the low-pass filter (in other words, a high-cut filter). Further, the high frequency component can be acquired by subtracting (deducting) the acquired low frequency component from the model basic manipulated variable.

Alternatively, the high frequency component can be acquired by passing the model basic manipulated variable through the high-pass filter (in other words, a low-cut filter). Further, the low frequency component can be acquired by subtracting (deducting) the acquired high frequency component from the model basic manipulated variable.

Alternatively, passing the model basic manipulated variable through the low-pass filter and the high-pass filter, respectively, makes it possible to obtain the low frequency component and the high frequency component from the corresponding filters.

The low frequency component and the high frequency component acquired as described above may be determined as the first model external force manipulated variable and the second model external force manipulated variable, respectively.

In the first aspect and the second aspect of the invention described above, when determining the second model external force manipulated variable anew, the model external force manipulated variable determining unit preferably determines the second model external force manipulated variable such that the second model external force manipulated variable changes according to the resultant value of the difference between the value of the low frequency component at current time and the latest value of the low frequency component reflected on the instantaneous value of the first motion already determined by the first motion determining unit and the value of the high frequency component at current time (a third aspect of the invention).

More specifically, the first motion determining unit generally carries out the first arithmetic processing by using the first model external force manipulated variable sampled at a predetermined timing of each execution cycle of the processing. For this reason, when the first model external force manipulated variable changes during a period from the instant the first model external force manipulated variable is sampled by the first motion determining unit at a certain execution cycle to the instant the first model external force manipulated variable is sampled at the next execution cycle (i.e., the period of two consecutive execution cycles), the change will not be reflected on the time series of the instantaneous value of the first motion determined by the first motion determining unit.

According to the third aspect of the invention, therefore, the second model external force manipulated variable is determined such that the second model external force manipulated variable changes according to the resultant value of the difference between the value of the low frequency component at current time and the latest value of the low frequency component reflected on the instantaneous value of the first motion already determined by the first motion determining unit and the value of the high frequency component at current time, as described above.

Thus, the aforesaid difference in addition to the high frequency component of the model basic manipulated variable will be reflected on the second model external force manipulated variable. This makes it possible to reflect the change in the first model external force manipulated variable during the period of two consecutive execution cycles of the first motion determining unit on the second model external force manipulated variable and consequently on the second motion.

As a result, the time series of the instantaneous value of a desired motion that allows the aforesaid posture state amount error to further properly approach to zero can be determined.

Supplementarily, in the second aspect of the invention, the second model external force manipulated variable may be determined such that the second external force manipulated variable consequently changes according to the resultant value of the difference between the value of the low frequency component at current time and the latest value of the low frequency component reflected on the instantaneous value of the first motion already determined by the first motion determining unit and the value of the high frequency component at current time, and the aforesaid difference itself does not have to be necessarily calculated. For instance, the aforesaid resultant value is consequently obtained by subtracting the latest value of the low frequency component reflected on the instantaneous value of the first motion already determined by the first motion determining unit from the value of the model basic manipulated variable at current time. The resultant value thus obtained may be directly determined as the second model external force manipulated variable.

To be more specific, in the first to the third aspects of the invention described above, the model external force manipulated variable determining unit determines the low frequency component sequentially acquired from the model basic manipulated variable as the first model external force manipulated variable and determines, as a new value of the second model external force manipulated variable, the value obtained by subtracting the latest value of the first model external force manipulated variable already used to determine the first motion by the first motion determining unit from the model basic manipulated variable at current time when newly determining the second model external force manipulated variable (a fourth aspect of the invention).

According to the fourth aspect of the invention, the value obtained by subtracting the latest value of the first model external force manipulated variable already used for determining the first motion by the first motion determining unit from the model basic manipulated variable at current time will agree with the aforesaid resultant value. Hence, according to the fourth aspect of the invention, the resultant value will be directly determined as the new value of the second model external force manipulated variable. As a result, the change in the first model external force manipulated variable during the period of two consecutive execution cycles of the first motion determining unit can be reflected on the second model external force manipulated variable and consequently on the second motion.

In the first to the fourth aspects of the invention described above, the feedback manipulated variable determining unit is a unit that sequentially determines, on the basis of an observed value of the posture state amount error, the model basic manipulated variable and an actual robot external force manipulated variable defining an additional external force to be additionally applied to the actual robot as the feedback manipulated variables that have the function for bringing the posture state amount error close to zero, and the motion control unit may have a compliance control function that controls the motion of the robot to cause the actual motion of the robot to follow the time series of the instantaneous value of the desired motion while additionally applying an additional external force defined by the actual robot external force manipulated variable to the actual robot (a fifth aspect of the invention).

According to the fifth aspect of the invention, the motion of the robot can be controlled to bring the posture state amount error close to zero by the combined effect of the model basic manipulated variable to be fed back to the first dynamic model and the second dynamic model and the actual robot external force manipulated variable to be fed back to the actual robot.

In the fifth aspect of the invention, the difference between the additional external force defined by the actual robot external force manipulated variable and the sum of the additional external forces defined by the first model external force manipulated variable and the second model external force manipulated variable, respectively (or the additional external force defined by the model basic manipulated variable) preferably functions to bring the posture state amount error close to zero. In this case, for example, the feedback manipulated variable for bringing the posture state amount error close to zero may be calculated by computation from the posture state amount error according to an appropriate feedback control law (e.g., a proportional law or a proportional-differential law), and the actual robot external force manipulated variable and the model basic manipulated variable may be determined such that the aforesaid difference agrees with (or is proportional to) the determined feedback manipulated variable.

In this case, if the actual robot external force manipulated variable is, for example, a manipulated variable that causes the horizontal component (the component about a horizontal axis) of a floor reaction force moment about a desired ZMP of the actual robot to be perturbed and therefore causes an actual floor reaction force central point to be perturbed, then the actual robot external force manipulated variable or a floor reaction force moment (or the position of an actual floor reaction force central point) defined thereby is preferably restricted to a predetermined permissible range. In this case, the permissible range may be variably set according to a floor geometry or the properties of a floor.

In the fifth aspect of the invention in which the actual robot external force manipulated variable is fed back to the actual robot as described above, the feedback manipulated variable determining unit preferably has a unit that sequentially calculates a model state amount error, which is the difference between the value of a predetermined type of state amount of the second dynamic model and a predetermined desired value of the state amount, and determines a set of the model basic manipulated variable and the actual robot external force manipulated variable on the basis of an observed value of the posture state amount error and a calculated value of the model state amount error as a feedback manipulated variable having a function for bringing the posture state amount error and the model state amount error close to zero (a sixth aspect of the invention).

According to the sixth aspect of the invention, in a situation wherein, for example, the posture state amount error is maintained at zero, the additional external force to be additionally applied to the actual robot and the additional external force to be additionally applied to the robot on the second dynamic model can be manipulated so as to cause the model state amount error of the second dynamic model to approach to zero while not influencing the posture state amount error. This arrangement makes it possible to prevent the state of the second dynamic model from diverging into an inappropriate state.

Examples of the predetermined type of state amount of the second dynamic model include the posture or the position of the center-of-gravity point of a predetermined portion (e.g., the base body) of the robot on the second dynamic model or the temporal changes thereof.

In the first to the sixth aspects of the invention, preferably, the instantaneous value of the second motion determined by the second motion determining unit is the instantaneous value of a perturbation motion of the predetermined portion for correcting the instantaneous value of the motion of the predetermined portion of the robot defined by the instantaneous value of the first motion determined by the first motion determining unit, and the second motion determining unit uses, as the second dynamic model, a perturbation dynamic model preset to express the relationship between the perturbation motion of the predetermined portion and the perturbation amount of an external force to be applied to the robot and carries out, as the second arithmetic processing, the arithmetic processing for calculating the perturbation motion of the predetermined portion on a perturbation dynamic model while causing the perturbation amount of an external force to be applied to the robot on the perturbation dynamic model to agree with the additional external force defined by the second model external force manipulated variable (a seventh aspect of the invention).

According to the seventh aspect of the invention, the second dynamic model is a perturbation dynamic model that expresses the relationship between the perturbation motion of the predetermined portion and the perturbation amount of the external force to be applied to the robot, thus allowing the second dynamic model to have a simple construction with high linearity. This arrangement makes it possible to minimize the arithmetic load on the second motion determining unit and to further shorten the execution cycle of the processing carried out by the second motion determining unit. As a result, the responsiveness of the instantaneous value of a second motion in response to a quick change in the posture state amount error and the responsiveness of the motion of the actual robot can be further enhanced.

In the seventh aspect of the invention, preferably, the first motion determining unit is a unit that carries out the first arithmetic processing by using leg motion parameters defining a desired motion trajectory of the distal end portion of each leg of the robot and ZMP trajectory parameters defining the trajectory of a desired ZMP of the robot, and has a unit that variably determines the leg motion parameters and the ZMP trajectory parameters such that at least a predetermined requirement related to the motion of the robot on the first dynamic model is satisfied and the desired ZMP defined by the ZMP trajectory parameters exists in a predetermined permissible range that depends upon the desired motion trajectory of the distal end portion of each of the legs defined by the leg motion parameters, and the perturbation motion of the predetermined portion as the instantaneous value of the second motion determined by the second motion determining unit is a perturbation motion of the base body (an eighth aspect of the invention).

According to the eighth aspect of the invention, the first motion determining unit variably determines the leg motion parameters and the ZMP trajectory parameters such that at least a predetermined requirement related to the motion of the robot on the first dynamic model is satisfied and the desired ZMP defined by the ZMP trajectory parameters exists in a predetermined permissible range that depends upon the desired motion trajectory of the distal end portion of each of the legs defined by the leg motion parameters. In this case, the execution cycle of the processing by the first motion determining unit can be set to be relatively long, thus allowing appropriate leg motion parameters and ZMP trajectory parameters to be determined.

Further, the first motion determining unit uses the leg motion parameters and the ZMP trajectory parameters determined as described above to carry out the first arithmetic processing, thereby sequentially determining the instantaneous value of the first motion.

The aforesaid arrangement enables the first motion determining unit to properly determine the time series of the instantaneous value of the first motion that permits stable motions of the robot while satisfying dynamic restrictions, such as the requirement that a desired ZMP (a desired actual floor reaction force central point) fall within a so-called supporting polygon. Further, the second motion determining unit determines the perturbation motion of the base body as the instantaneous value of the second motion. Hence, the instantaneous value of a second motion, which indicates a correction amount of a first motion, can be sequentially determined without impairing an appropriate leg motion parameters or ZMP trajectory parameters determined by the first motion determining unit.

Thus, the eighth aspect of the invention allows instantaneous values of ideal desired motions to be sequentially generated while satisfying requirements for proper motions of the robot.

Further, in the first to the seventh aspects of the invention, preferably, the control device includes a model external force manipulated variable predicting unit which determines the time series of a future predicted value of the first model external force manipulated variable supplied to the first motion determining unit from the model external force manipulated variable determining unit on the basis of the first model external force manipulated variable determined by the model external force manipulated variable determining unit; and a future target determining unit which determines a future target of a desired motion of the robot, wherein the first motion determining unit includes at least a unit which determines arithmetic parameters necessary for the first arithmetic processing by using the time series of a future predicted value of the determined first model external force manipulated variable and the determined target such that a requirement that the time series of the instantaneous value of the first motion determined in the case where it is assumed that the first arithmetic processing is carried out while additionally applying the time series of an additional external force, which is defined by the time series of a future predicted value of the determined first model external force manipulated variable, to the robot on the first dynamic model in a predetermined period in the future will reach or converge to the determined target in the future is satisfied, and carries out the first arithmetic processing by using the determined arithmetic parameters (a ninth aspect of the invention).

According to the ninth aspect of the invention, the first motion determining unit determines arithmetic parameters necessary for the first arithmetic processing by using the time series of a future predicted value of the determined first model external force manipulated variable and the determined target such that a requirement that the time series of the instantaneous value of the first motion determined in the case where it is assumed that the first arithmetic processing is carried out while additionally applying at least the time series of an additional external force, which is defined by the time series of a future predicted value of the determined first model external force manipulated variable, to the robot on the first dynamic model in a predetermined period (e.g., a predetermined period immediately after current time) in the future will reach or converge to the determined target in the future is satisfied.

Accordingly, the first motion determining unit determines the arithmetic parameters so as to allow the time series of the instantaneous value of the first motion to reach or converge to the target in the future, anticipating the time series of an additional external force predicted to be additionally applied to the robot on the first dynamic model in a future predetermined period. Hence, more appropriate arithmetic parameters can be determined for the time series of the instantaneous value of the first motion to reach or converge to the target in the future, as compared with a case where the arithmetic parameters are determined without considering the future additional external force to be additionally applied to the robot on the first dynamic model. Then, the first motion determining unit carries out the first arithmetic processing by using the arithmetic parameters so as to sequentially determine the instantaneous value of the first motion. Thus, the time series of the instantaneous value of the first motion can be generated to allow the time series to reach or converge to the target.

As a result, the time series of the instantaneous value of a desired motion that permits continuous stable motions of the robot can be properly determined.

The ninth aspect of the invention described above can be applied to the eighth aspect of the invention. In this case, the control device may include a model external force manipulated variable predicting unit which determines the time series of a future predicted value of the first model external force manipulated variable supplied to the first motion determining unit from the model external force manipulated variable determining unit on the basis of the first model external force manipulated variable determined by the model external force manipulated variable determining unit; and a future target determining unit which determines a future target of a desired motion of the robot, wherein the predetermined requirement may be a requirement that the time series of the instantaneous value of the first motion determined in the case where it is assumed that the first arithmetic processing is carried out while additionally applying the time series of an additional external force, which is defined by the time series of a future predicted value of the determined first model external force manipulated variable, to the robot on the first dynamic model in a predetermined period in the future (e.g., predetermined period immediately after current time) will reach or converge to the determined target in the future (a tenth aspect of the invention).

According to the tenth aspect of the invention, the first motion determining unit determines the leg motion parameters and the ZMP trajectory parameters as the arithmetic parameters in the ninth aspect of the invention.

Supplementarily, in the ninth aspect or the tenth aspect of the invention, the first motion determining unit may carry out the processing for determining the arithmetic parameters (the leg motion parameters and the ZMP trajectory parameters in the tenth aspect of the invention) at the same cycle as the execution cycle of the processing for determining the instantaneous value of the first motion, but may alternatively carry out the processing for each predetermined timing at a cycle of a longer span than that of the execution cycle of the processing for determining the instantaneous value of the first motion. For instance, the arithmetic parameters may be determined each time a free leg of the robot lands.

Further, in the ninth aspect or the tenth aspect of the invention, a cyclic reference motion is preferably adopted as the target. More specifically, for example, the future target determining unit is a unit that determines a reference parameter, which is a virtual reference motion indicative of a future convergence target for a desired motion of the robot and which defines a reference motion cyclically repeating the same pattern of motion, as the target. The essential requirement preferably adopts a requirement that the time series of the instantaneous value of the first motion determined in the case where it is assumed that the first arithmetic processing is carried out while additionally applying the time series of a future predicted value of the determined first model external force manipulated variable to the robot on the first dynamic model in a predetermined period in the future will converge to a reference motion defined by the determined reference parameter in the future (an eleventh aspect of the invention).

In this case, the reference motion is a cyclic motion, so that the reference motion permits continuous motions of the robot. Hence, the time series of the instantaneous value of a desired motion that permits continuous robot motions to be accomplished can be properly determined by determining the time series of the instantaneous value of the first motion such that the essential requirement that the time series of the instantaneous value of the first motion determined under the aforesaid assumption will converge to the aforesaid reference motion in the future is satisfied.

The reference motion is preferably a cyclic motion of a type which is, for example, approximately close to a motional state of the robot at current time or in the vicinity thereof (i.e., a cyclic motion that does not cause a sudden change from the motional state of the robot at current time or in the vicinity thereof).

BRIEF DESCRIPTION OF THE DRAWINGS

FIG. 12 is a graph illustrating a desired floor reaction force vertical component trajectory in a normal turning gait of the robot shown in FIG. 1;

FIG. 13 is a graph illustrating a desired ZMP trajectory (a component in the X-axis direction) in the normal turning gait of the robot shown in FIG. 1;

DESCRIPTION OF THE PREFERRED EMBODIMENTS

The following will describe an embodiment of the present invention by taking a bipedal mobile robot as an example of a legged mobile robot.

Figure 1:
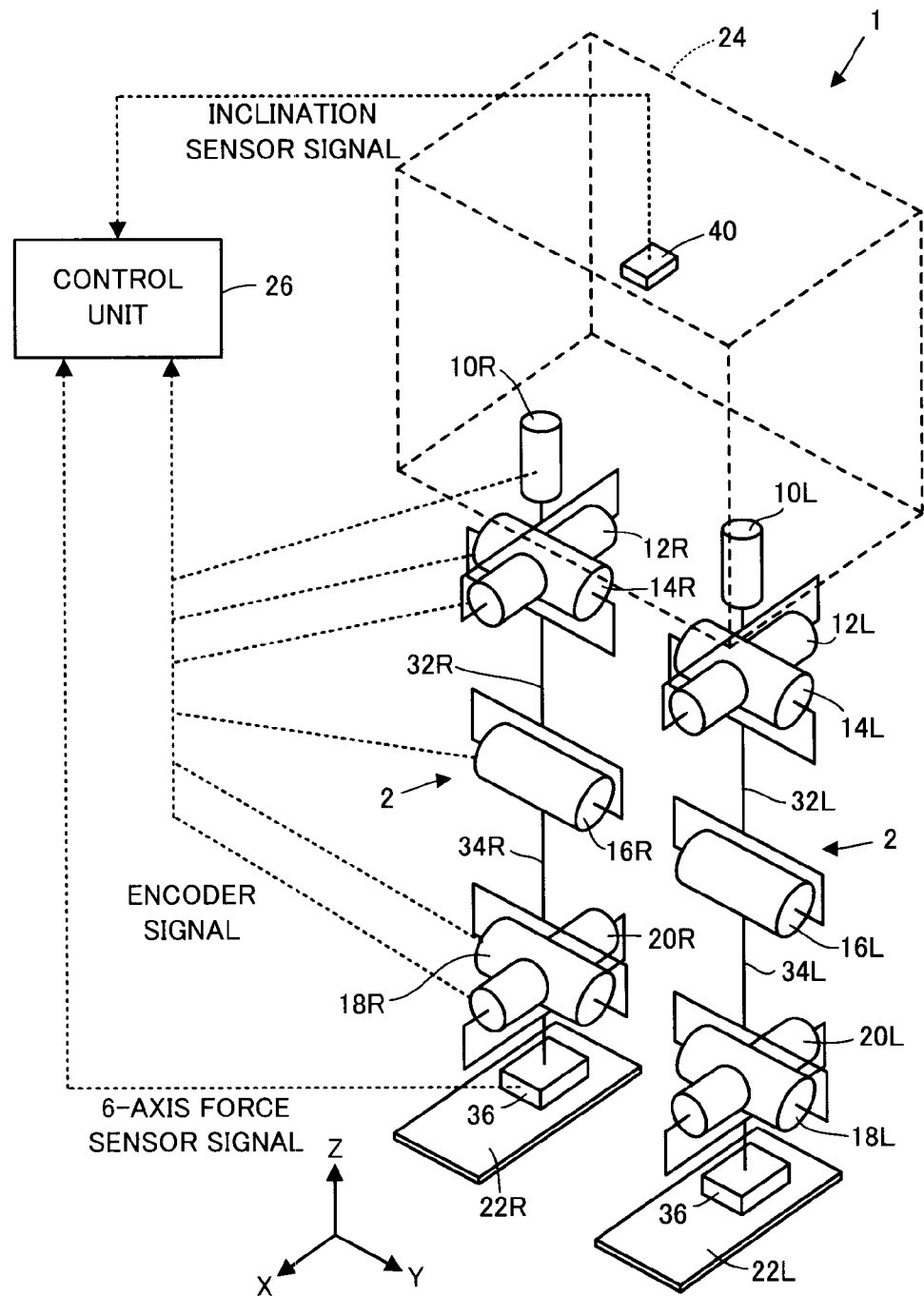
FIG. 1 is a perspective view illustrating the schematic construction of a bipedal mobile robot as a mobile body in each embodiment of the present invention.

As illustrated in FIG. 1, a bipedal mobile robot 1 (hereinafter referred to simply as the robot 1) according to the present embodiment has a body 24 as a base body and a pair of right and left legs (leg links) 2, 2 interposed between the body 24 and a floor as a moving mechanism for moving the body 24 on a floor surface.

The body 24 is connected to the proximal end portions (upper end portions) of the two legs 2, 2 through the intermediary of a waist joint (hip joint), which will be discussed later, and is supported above the floor surface by one or both of the legs 2, 2 that are in contact with the ground.

The two legs 2, 2 share the same construction and each thereof has six joints. The six joints are a joint 10R or 10L for turning a waist (hip) (for the rotation in the yaw direction relative to the body 24), a joint 12R or 12L for turning the waist (hip) in a roll direction (about an X-axis), a joint 14R or 14L for rotating the waist (hip) in a pitch direction (about a Y-axis), a joint 16R or 16L for rotating a knee in the pitch direction, a joint 18R or 18L for rotating an ankle in the pitch direction, and a joint 20R or 20L for rotating an ankle in the roll direction, which are arranged in this order from the body 24.

In the description of the present embodiment, reference characters R and L mean the correspondence to the right leg and the left leg. Further, the X-axis, a Y-axis, and a Z-axis mean three coordinate axes of a supporting leg coordinate system, which will be discussed later. The X-axis direction and the Y-axis direction of the supporting leg coordinate system are the directions of two axes that are orthogonal to each other on a horizontal plane, the X-axis direction corresponding to the longitudinal direction (the direction of the roll axis) of the robot 1 and the Y-axis direction corresponding to the lateral direction (the direction of the pitch axis) of the robot 1. The Z-axis direction is the vertical direction (the gravitational direction) and corresponds to the up-and-down direction (the direction of a yaw axis) of the robot 1. In this case, in the present embodiment, the vertical direction, which is the Z-axis direction, means the up-and-down direction in the present invention.

The joints 10R(L), 12R(L) and 14R(L) of each leg 2 constitute a waist joint (hip joint) having 3 degrees of freedom, the joint 16R(L) constitutes a knee joint having 1 degree of freedom, and the joints 18R(L) and 20R(L) constitute an ankle joint having 2 degrees of freedom.

Further, the waist joint (hip joint) 10R(L), 12R(L), and 14R(L) and the knee joint 16R(L) are connected by a thigh link 32R(L), while the knee joint 16R(L) and the ankle joint 18R(L) and 20R(L) are connected by a ems link 34R(L). A foot 22R(L) constituting a distal portion (lower end portion) of each leg 2 is attached under the ankle joints 18R(L) and 20R(L) of each leg 2. Further, the upper end portion (the proximal end portion) of each leg 2 is connected to the body 24 through the intermediary of the waist joints (hip joints) 10R(L), 12R(L), and 14R(L).

Each of the aforesaid joints may have a publicly known structure proposed in, for example, Japanese Patent Publication Laid-Open No. 3-184782 by the applicant of the present application. In this case, an actuator rotatively driving each joint is constructed of an electric motor 42 (refer to FIG. 2) provided with a speed reducer.

The construction of each leg 2 described above provides the foot 22R(L) of each leg 2 with 6 degrees of freedom relative to the body 24. When the robot 1 travels, desired motions of the two feet 22R and 22L can be accomplished by driving 6*2=12 joints of the two legs 2, 2 together ("*" in the present description denotes multiplication for scalar calculation, while it denotes an outer product in vector calculation) at appropriate angles. This arrangement enables the robot 1 to implement motions for traveling in a three-dimensional space, such as a walking motion or a running motion.

In this case, both legs 2, 2 function as the moving mechanism for moving the body 24, which serves as the base body, on the floor surface. The body 24 serving as the base body is supported by the legs 2, 2 such that the body 24 is enabled to perform relative motions in relation to the legs 2, 2 through the intermediary of the waist joint (hip joint). Further, the motions of the body 24 relative to the floor surface can be controlled by controlling the drive of each joint of both legs. The motions of the body 24 include motions in an up-and-down direction (the vertical direction, a direction perpendicular to the floor surface, and the like) and motions for changing the posture of the body 24 in addition to motions in the horizontal direction (or a direction parallel to the floor surface) of the body 24.

In the present embodiment, a pair of right and left arms is attached to both sides of an upper portion of the body 24 and a head is mounted on the upper end of the body 24, although not shown. Further, each arm is capable of performing motions, such as swinging the arm to the front and the rear relative to the body 24, by a plurality of joints (a shoulder joint, an elbow joint, a wrist joint, and the like) provided therein. However, these arms and the head may be omitted.

The body 24 includes therein a control unit 26 which controls the operation of the robot 1. In FIG. 1, however, the control unit 26 is shown outside the body 24 for the convenience of illustration.

A six-axis force sensor 36 is interposed between the ankle joints 18R(L), 20R(L) and the foot 22R(L) of each leg 2. The six-axis force sensor 36 detects the translational force components in the directions of three axes of a floor reaction force and the moment components about the three axes, which are transmitted to each of the legs 2 from a floor through the intermediary of the foot 22R(L), then outputs the detection signals to the control unit 26.

The body 24 has an inclination sensor 40 for measuring the inclination angles (the inclination angles in the roll direction and the pitch direction) of the body 24 relative to the vertical direction (the gravitational direction) and the changing velocities (angular velocities) thereof. More specifically, the inclination sensor 40 is constructed of an acceleration sensor and a rate sensor (angular velocity sensor), such as a gyro sensor, and outputs the detection signals of these sensors to the control unit 26. Then, the control unit 26 measures the inclination angle and the angular velocity of the body 24 relative to the vertical direction by a publicly known technique on the basis of the outputs of the inclination sensor 40.

Further, the electric motor 42 (refer to FIG. 2), which rotatively drives each joint is provided with an encoder (rotary encoder) 44 (refer to FIG. 2) for detecting the rotational angle of each joint, and a detection signal of the encoder 44 is output to the control unit 26.

Figure 2:
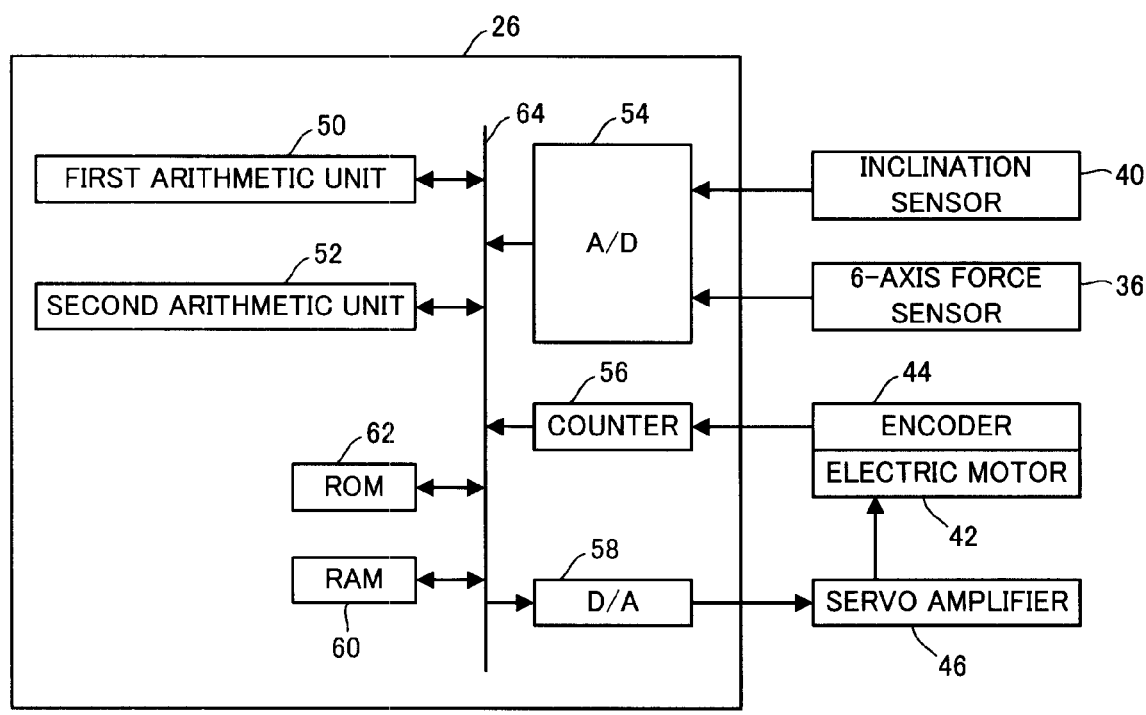
FIG. 2 is a block diagram illustrating the hardware configuration of a control unit provided in the robot of FIG. 1.

Referring to FIG. 2, the control unit 26 is constructed of an electronic circuit unit having a microcomputer including a first arithmetic unit 50 and a second arithmetic unit 52 composed of CPUs, an A/D converter 54, a counter 56, a D/A converter 58, a RAM 60, a ROM 62, and a bus line 64 which transfers data among these constituent elements.

In the control unit 26, the outputs of the six-axis force sensor 36 and the inclination sensor 40 are converted into digital values by the A/D converter 54, and then input to the RAM 60 through the bus line 64. An output of the encoder (rotary encoder) 44 of each joint of the robot 1 is input to the RAM 60 through the counter 56.

The first arithmetic unit 50 generates a desired gait, which will be discussed later, calculates a joint displacement command (the desired value of the rotational angle of each joint), and sends out the calculated joint displacement command to the RAM 60. The second arithmetic unit 52 reads out a joint displacement command from the RAM 60 and an actual joint displacement (the actually measured value of the rotational angle of each joint) measured through the counter 56 from an output of the encoder 44, and calculates a drive command of the electric motor 42 of each joint necessary to cause the actual joint displacement to follow the joint displacement command (a command value that specifies the output torque of the electric motor 42).

Further, the second arithmetic unit 52 outputs the calculated drive command to a servo amplifier 46 for driving the electric motor 42 through the intermediary of the D/A converter 58. At this time, the servo amplifier 46 drives the electric motor 42 (energizes the electric motor 42) on the basis of the input drive command. Thus, the actual joint displacement of each joint is controlled to follow a joint displacement command.

Figure 3:
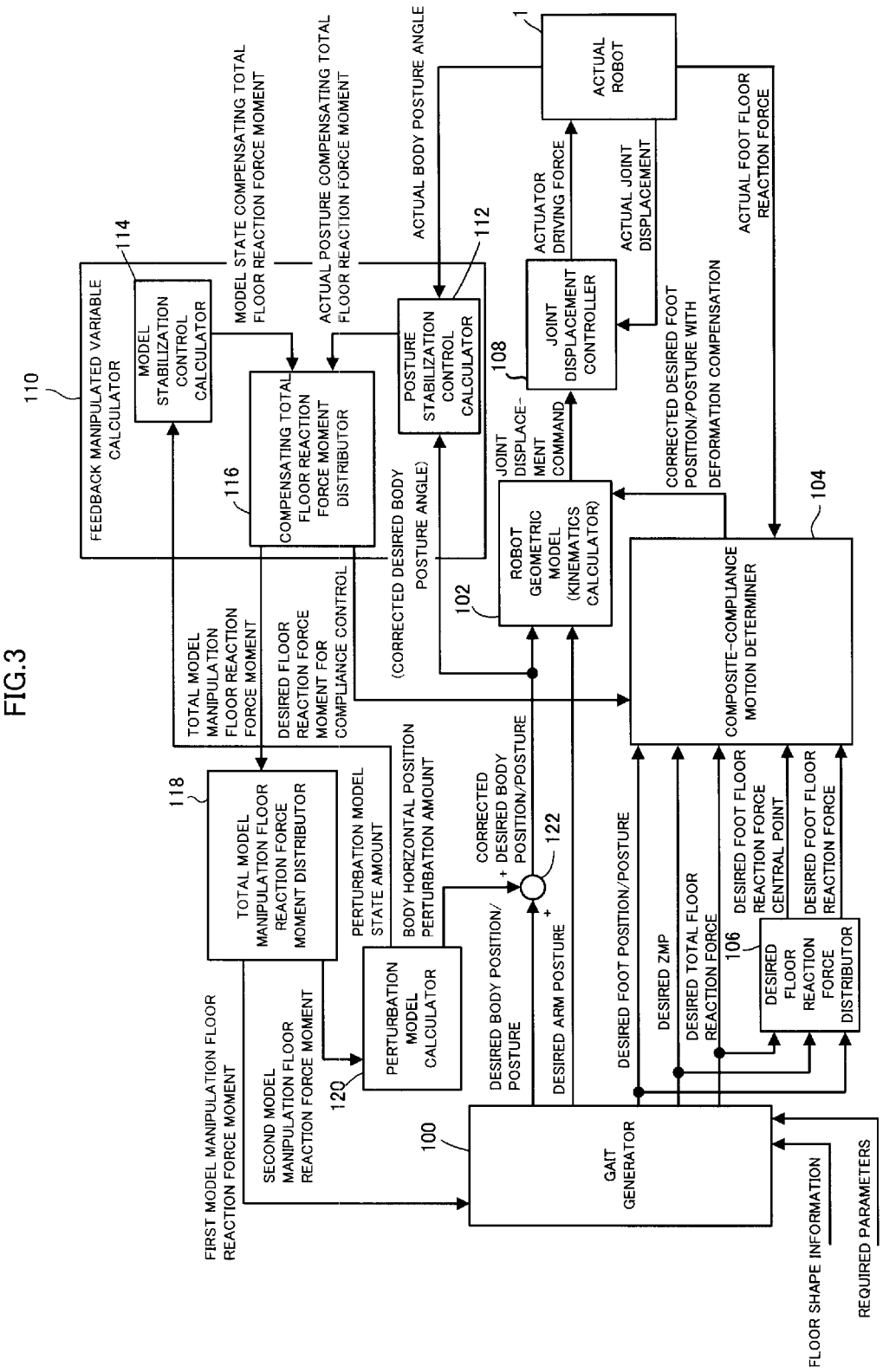
FIG. 3 is a block diagram illustrating the functional construction of the control unit in a first embodiment.

Referring now to FIG. 3, the operation of the control device of the robot 1 in the present embodiment will be outlined. The sections except for the actual robot in FIG. 3 indicate the functions implemented by the processing carried out by the control unit 26 (the processing carried out primarily by the first arithmetic unit 60 and the second arithmetic unit 62).

In FIG. 3, for the sake of convenience, it is assumed that the actually measured values (actual joint displacements and the like) recognized by the control unit 26 from the outputs of the aforesaid sensors mounted on the robot 1 are output from the actual robot 1. In the following description, the aforesaid reference characters R and L will be omitted unless is necessary to distinguish the right leg 2 and the left leg 2.

The control unit 26 is provided with a gait generator 100, which generates and outputs a desired gait, i.e., the target of a motion (gait) of the robot 1 by using a dynamic model that expresses the dynamics of the robot 1 (the relationship between the motion of the robot 1 and an external force acting on the robot 1). A desired gait generated and output by the gait generator 100 is comprised of a target related to the motion of the robot 1 and a target related to an external force acting on the robot 1.

In the present embodiment, a desired gait generated and output by the gait generator 100 is composed of a desired body position/posture trajectory, which is the trajectory of a desired position and a desired posture of the body 24, a desired foot position/posture trajectory, which is the trajectory of a desired position and a desired posture of each foot 22, a desired arm posture trajectory, which is the trajectory of a desired posture of each arm, a desired ZMP trajectory, which is the trajectory of a desired position of the ZMP (Zero Moment Point) of the robot 1, and a desired total floor reaction force trajectory, which is a desired trajectory of the total floor reaction force acting on the robot 1 If any other part that can be moved in relation to the body 24 in addition to the legs 2 and the arms are provided, then a desired position/posture trajectory of the movable part will be added to the desired gait.

Here, the term "trajectory" in the aforesaid desired gait means a temporal change pattern (time series patter) and is formed of the time series of instantaneous values calculated for each control cycle (arithmetic processing cycle) of the gait generator 100. In the following description, the term "trajectory" may be replaced by the term "pattern." In the following description, the term "desired" will be frequently omitted unless there is a possibility of misunderstanding.

The position and the velocity of the body 24 will mean the position and its moving speed of a predetermined representative point of the body 24 (e.g., the central point between the right and left hip joints). Similarly, the position and the speed of each foot 22 will mean the position and its moving velocity of a predetermined representative point of each foot 22. In the present embodiment, the representative point of each foot 22 is set at a point on the bottom surface of each foot 22, such as a point at which a perpendicular line from the center of the ankle joint of each of the legs 2 to the bottom surface of each foot 22 intersects with the bottom surface.

The term "posture" means a spatial orientation. For example, the posture of the body is expressed by the inclination angle (posture angle) of the body 24 in the roll direction relative to the vertical direction (about the X-axis) and the inclination angle (posture angle) of the body 24 in the pitch direction (about the Y-axis). The posture of a foot is expressed by the spatial azimuths of two axes fixedly set on each foot 22. In the present description, a body posture may be referred to as a body posture angle. The body posture may include the rotational angle of the body 24 in the yaw direction (about the Z-axis).

Further, constituent elements in a gait other than the elements related to a floor reaction force (a desired ZMP and a desired total floor reaction force), namely, foot position/posture, body position/posture and the like, which relate to the motion of each portion of the robot 1 are generically referred to as "motions."

The floor reaction force acting on each foot 22 (a floor reaction force composed of a translational force and a moment) is referred to as "each foot floor reaction force" and the resultant force of "each foot floor reaction force" of all (two) feet 22R and 22L of the robot 1 is referred to as "total floor reaction force." The following description, however, will hardly refer to each foot floor reaction force. Hence, the term "floor reaction force" will be regarded to have the same meaning as the term "total floor reaction force."

The ZMP means a point on a floor surface at which the horizontal component of a moment (a moment component about the horizontal axis) acting about the point due to the resultant force of an inertial force generated by a motion of the robot 1 and the gravitational force acting on the robot 1 becomes zero. In a gait that satisfies a dynamic balance condition, the ZMP and the central point of a floor reaction force agree with each other. In this case, imparting a desired ZMP is equal to imparting the central point of a desired floor reaction force.

A desired floor reaction force is generally expressed by a point of action and a translational force and moment acting on the point. The point of action may be set anywhere, and in the present embodiment, a desired ZMP is used as the point of action of a desired floor reaction force. In a gait that satisfies the dynamic balance condition, the ZMP and the central point of a floor reaction force agree with each other, as described above, so that the moment component of the desired floor reaction force having the desired ZMP as the point of action will be zero, excluding a vertical component (a moment component about the Z-axis).

A desired arm posture trajectory in the motion of a desired gait generated by the gait generator 100 is input to a robot geometric model (kinematics calculator) 102.

Further, a desired body position/posture trajectory is input to a body position/posture corrector 122. Then, the body position/posture corrector 122 corrects the input desired body position/posture on the basis of a value supplied from a perturbation model calculator 120 and inputs the desired body position/posture after the correction (hereinafter referred to as "the corrected desired body position/posture") to the robot geometric model 102.

Here, in the present embodiment, to be more specific about the object to be corrected by the body position/posture corrector 122, the object is the body horizontal position (the position of the body in the horizontal direction) of the desired body position/posture. The value supplied to the body position/posture corrector 122 from the perturbation model calculator 120 is a body horizontal position perturbation amount defined as the correction amount of a desired body horizontal position. Then, the body position/posture corrector 122 combines or adds the aforesaid body horizontal position perturbation amount to the body horizontal position of the desired body position/posture received from the gait generator 100 thereby to determine the body horizontal position of the corrected desired body position/posture.

Further, the body position/posture corrector 122 determines elements (the body vertical position and the body posture) other than the body horizontal position of the desired body position/posture received from the gait generator 100 directly as the elements of the corrected desired body position/posture. According to the present embodiment, therefore, the corrected desired body position/posture are determined as the ones obtained by correcting only the body horizontal position thereof from the desired body position/posture output from the gait generator 100 by the body horizontal position perturbation amount. Then, the body position/posture corrector 122 inputs the corrected desired body position/posture determined as described above to the robot geometric model 102.

Further, a desired foot position/posture trajectory, a desired ZMP trajectory (a desired floor reaction force central point trajectory), and a desired total floor reaction force trajectory (more specifically, a desired translational floor reaction force vertical component trajectory, a desired translational floor reaction force horizontal component trajectory, and the trajectory of a desired floor reaction force moment about a desired ZMP) are input to a composite-compliance motion determiner 104 and a desired floor reaction force distributor 106.

Then, the desired floor reaction force distributor 106 distributes the desired floor reaction force to the respective feet 22R and 22L to determine the desired foot floor reaction force central point (the desired position of the floor reaction force central point of each of the feet 22R and 22L) and the desired foot floor reaction force (the desired floor reaction force to be applied to the floor reaction force central point of each of the feet 22R and 22L). The trajectories of desired foot floor reaction force central points and the desired foot floor reaction forces, which have been determined, are input to the composite-compliance motion determiner 104. Regarding a desired floor reaction force output from the gait generator 100, only a component necessary for the compliance control by the composite-compliance motion determiner 104 may be output. For example, the output of a desired translational floor reaction force horizontal component from the gait generator 100 may be omitted.

The composite-compliance motion determiner 104 determines a corrected desired foot position/posture with mechanism deformation compensation obtained by correcting a desired foot position/posture. The trajectory of the corrected desired foot position/posture is input to the robot geometric model 102.

The robot geometric model 102 calculates the joint displacement commands of the joints of the two legs 2, 2 that satisfy the desired body position/posture and the corrected desired foot position/posture with mechanism deformation compensation, which have been received, by inverse-kinematics calculation on the basis of a kinematics model (rigid link model) of the robot 1, and then outputs the calculated joint displacement commands to a joint displacement controller 108. Further, the robot geometric model 102 calculates the joint displacement commands of the joints of the arms that satisfy a desired arm posture, and outputs the calculated joint displacement commands to the joint displacement controller 108.

Then, the joint displacement controller 108 uses the joint displacement commands calculated by the robot geometric model 102 as the desired values to carry out follow-up control of the rotational angles of the joints (actual joint displacements) of both legs 2, 2 and both arms of the robot 1 through the intermediary of the servo amplifier 46. More specifically, the joint displacement controller 108 adjusts the output torque of the electric motor 42 as an actuator driving force such that the actual joint displacements (actually measured values) measured on the basis of the outputs of the encoder 44 agree with the joint displacement commands.

An actual foot floor reaction force, which is the floor reaction force actually acting on each foot 22 of the robot 1 by an actual motion of the robot 1 subjected to the follow-up control described above is measured from an output of the six-axis force sensor 36, and the actually measured value of the actual foot floor reaction force is input to the composite-compliance motion determiner 104.

Further, the actual body posture angle, which is the real posture angle (an inclination angle relative to the vertical direction) of the body 24 of the robot 1, is measured on the basis of an output of the inclination sensor 40, and the actually measured value of the actual body posture angle is input to a feedback manipulated variable calculator 110. The feedback manipulated variable calculator 110 also receives a corrected desired body posture angle of the aforesaid corrected desired body position/posture and the state amount of a perturbation dynamic model (hereinafter referred to as the perturbation model state amount in some cases) in the perturbation model calculator 120, which will be discussed hereinafter.

Although it will be discussed in detail hereinafter, the feedback manipulated variable calculator 110 determines and outputs the total model manipulation floor reaction force moment and the desired floor reaction force moment for compliance control as the feedback manipulated variables that have the function for causing the body posture angle error, which indicates the difference between an input actual body posture angle (actually measured value) and a corrected desired body posture angle, and the model state amount error, which indicates the difference between an input perturbation model state amount and a predetermined desired value for the state amount, to approach to zero.

Here, the desired floor reaction force moment for compliance control is a perturbation floor reaction force moment about a desired ZMP to be additionally applied to the actual robot 1 to bring (converge) the body posture angle error and the model state amount error close to zero. The model manipulation floor reaction force moment indicates the total sum of the perturbation floor reaction force moments about a desired ZMP to be additionally applied to a robot on a dynamic model (to be discussed hereinafter) used by the gait generator 100 to generate a desired gait and a robot on a perturbation dynamic model (to be discussed hereinafter) used by the perturbation model calculator 120 to calculate a body horizontal position perturbation amount, respectively, in order to effect the same purpose as that of a desired floor reaction force moment for compliance control.

In other words, in the total feedback manipulated variable for bringing a body posture angle error and the model state amount error close to zero, the manipulated variable component to be fed back to the actual robot 1 (the share to be borne by the actual robot 1) is a desired floor reaction force moment for compliance control and the total manipulated variable component to be fed back to all of the dynamic model used by the gait generator 100 and perturbation dynamic model used by the perturbation model calculator 120 (the share to be borne by all the dynamic models) is a total model manipulation floor reaction force moment.

The total model manipulation floor reaction force moment of the feedback manipulated variable determined by the feedback manipulated variable calculator 110 is input to a total model manipulation floor reaction force moment distributor 118.

The total model manipulation floor reaction force moment distributor 118 determines a first model manipulation floor reaction force moment as a component to be fed back to the gait generator 100 and a second model manipulation floor reaction force moment as a component to be fed back to the perturbation model calculator 120 our of the received total model manipulation floor reaction force moment, and inputs the determined components to the gait generator 100 and the perturbation model calculator 120, respectively. This will be described in more detail later.

The first model manipulation floor reaction force moment is a portion of the total model manipulation floor reaction force moment to be distributed to the dynamic model of the gait generator 100, while the second model manipulation floor reaction force moment is a portion of the total model manipulation floor reaction force moment to be distributed to the perturbation dynamic model of the perturbation model calculator 120. In this case, the total model manipulation floor reaction force moment is basically separated into a low frequency component and a high frequency component. Of these components, the low frequency component is determined as the first model manipulation floor reaction force moment and the high frequency component is determined as the second model manipulation floor reaction force moment.

Thus, the first model manipulation floor reaction force moment functions as a feedback manipulated variable for bringing the body posture angle error and the model state amount error in a low frequency range close to zero, while the second model manipulation floor reaction force moment functions as a feedback manipulated variable for bringing the body posture angle error and the model state amount error in a high frequency range close to zero.

The gait generator 100 sequentially generates the motion of a desired gait (desired motion) by using a dynamic model such that the horizontal component of a floor reaction force moment about the desired ZMP determined in the gait generator 100 (more specifically, the horizontal component of a floor reaction force moment generated about a desired ZMP in the robot on the dynamic model used by the gait generator 100) agrees with the first model manipulation floor reaction force moment that has been input. The desired ZMP output to the composite-compliance motion determiner 104 from the gait generator 100 is output, aiming to cause the horizontal component of the floor reaction force moment about the desired ZMP to become zero.

The perturbation model calculator 120 calculates the body horizontal position perturbation amount such that the horizontal component of a floor reaction force moment to be additionally applied to the robot on the perturbation dynamic model (the perturbation floor reaction force moment to be applied about the desired ZMP of a desired gait) agrees with the second model manipulation floor reaction force moment that has been received, and outputs the calculated body horizontal position perturbation amount to the body position/posture corrector 122.

Further, in the feedback manipulated variable determined by the feedback manipulated variable calculator 110, the desired floor reaction force moment for compliance control is input to the composite-compliance motion determiner 104. Then, the composite-compliance motion determiner 104 determines the corrected desired foot position/posture with mechanism deformation compensation (trajectory) obtained by correcting a desired foot position/posture such that the actual floor reaction force moment about the desired ZMP approaches the desired floor reaction force moment for compliance control, while causing the actual motion of the robot 1 to follow the motion of the desired gait (the corrected desired body position/posture for the body position/posture) generated by the gait generator 100.

In this case, it is virtually impossible to make all states of the foot position/posture of the robot 1 and floor reaction force agree with desired states, so that a tradeoff relationship therebetween is adopted to achieve maximum possible agreement in a compromising manner. More specifically, the composite-compliance motion determiner 104 imparts a weight to the control error relative to each desired value when determining the corrected desired foot position/posture with mechanism deformation compensation (trajectory) thereby to minimize the weighted average of the control error (or the squared control error).

In other words, the corrected desired foot position/posture with mechanism deformation compensation (trajectory) is determined such that the actual floor reaction force moment about the desired ZMP and the actual foot position/posture of the robot 1 approach the desired floor reaction force moment for compliance control and the desired foot position/posture, respectively, as much as possible. Then, the composite-compliance motion determiner 104 outputs the corrected desired foot position/posture as the final desired values of the foot position/posture to the robot geometric model 102, thereby controlling the operation of the robot 1.

The aforesaid constructions and the operations of the composite-compliance motion determiner 104 and the like are described in detail in, for example, Japanese Patent Application Laid-Open No. 10-277969 filed previously by the present applicant. Therefore, no further detail of the composite-compliance motion determiner 104 will be given in the present description.

The above has outlined the processing of the control unit 26 in the present embodiment. According to the present embodiment, in the processing functions of the control unit 26 illustrated in FIG. 3, the arithmetic processing of the functional section excluding the gait generator 100 is carried out at high speed at a relatively short control cycle (e.g., 1 ms). In contrast, thereto, the arithmetic processing by the gait generator 100 is carried out at a longer control cycle (e.g., 100 ms) than the control cycle of the arithmetic processing by the rest of the functional section.

Detailed descriptions will now be given to the processing carried out by the gait generator 100, the feedback manipulated variable calculator 110, the total model manipulation floor reaction force moment distributor 118, and the perturbation model calculator 120.

First, taking the running gait illustrated in FIG. 4 as an example, a desired gait generated by the gait generator 100 will be explained more specifically.

In the following description, the terms "floor reaction force vertical component" and "floor reaction force horizontal component" will mean "translational floor reaction force vertical component" and "translational floor reaction force horizontal component," respectively, unless otherwise particularly specified.

Further, the term "two-leg supporting period" in a gait will refer to a period during which the robot 1 supports its own weight by its both legs 2, 2, the term "one-leg supporting period" will refer to a period during which the robot 1 supports its own weight by either one of the legs 2, 2, and the term "floating period" will refer to a period during which both legs 2, 2 are off a floor (floating in the air). Further, the leg 2 supporting the self weight of the robot 1 during the one-leg supporting period will be referred to as "the supporting leg," while the leg 2 not supporting the self eight will be referred to as "the free leg." The running gait, which will be mainly described in the present embodiment, does not include the two-leg supporting period. Instead, the running gait repeats the one-leg supporting period (landing phase) and the floating period alternately. In this case, neither of the legs 2, 2 supports the self weight of the robot 1; however, the leg 2 which was a free leg and the leg 2 which was a supporting leg in the one-leg supporting period immediately preceding the floating period will be still called the free leg and the supporting leg, respectively, in the floating period.

Figure 4:
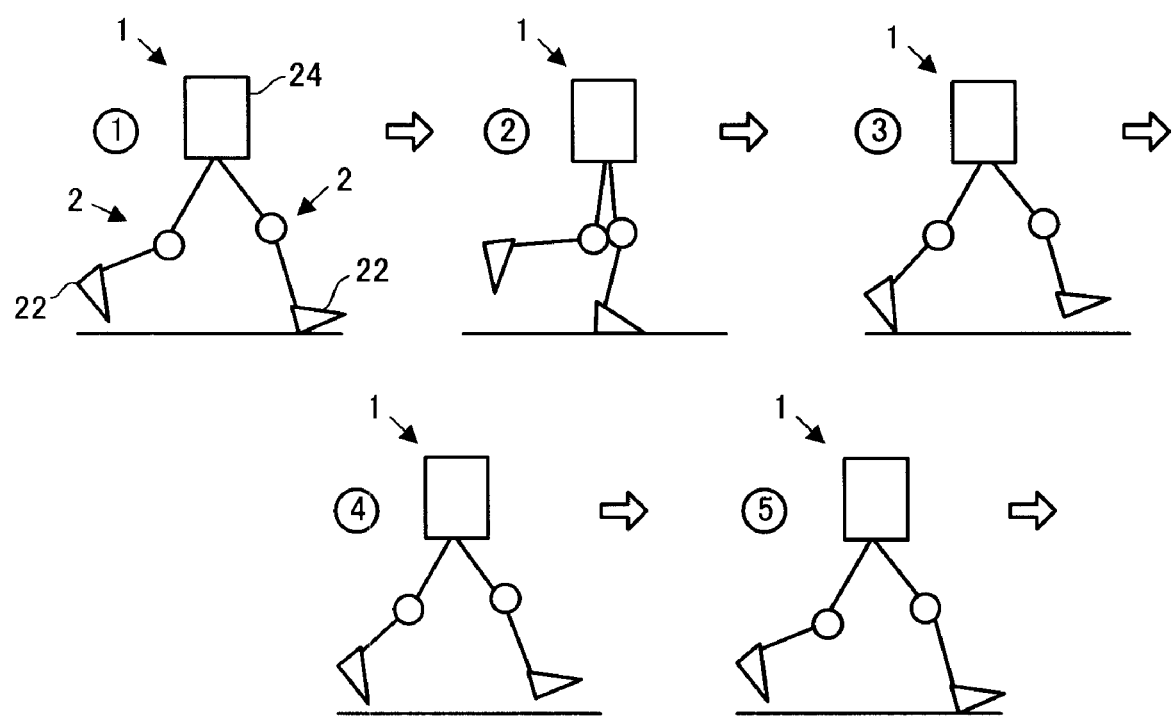
FIG. 4 is a diagram illustrating a running gait of the robot of FIG. 1.

First, referring to FIG. 4, which illustrates the running gait, this running gait is the same gait as that of a normal running gait of a human. This running gait alternately repeats the one-leg supporting period during which the foot 22 of only one of the right and left legs 2 (supporting leg) of the robot 1 lands (comes in contact with the ground) and the floating period during which both legs 2, 2 float in the air.

The circled numerals in FIG. 4 indicate the time-series sequence in the running gait. In this case, the first state in FIG. 4 indicates the state at the beginning (initial state) of the one-leg supporting period, the second state indicates the state at a midpoint of the one-leg supporting period, the third state indicates the state at the beginning of the floating period (the end of the one-leg supporting period) following the one-leg supporting period, the fourth state indicates the state at a midpoint in the floating period, and the fifth state indicates the state at the end of the floating period (the beginning of the next one-leg supporting period). The blank arrows in FIG. 4 indicate the direction in which the robot 1 advances.

In this running gait, the robot 1 lands at the heel of the foot 22 of the supporting leg (the leg 2 on the front side in the running direction of the robot 1) at the beginning of the one-leg supporting period, as illustrated in the first state of FIG. 4.

Subsequently, after landing with substantially the entire bottom surface of the landed foot 22 (the foot 22 of the supporting leg) in contact with the floor, as illustrated by the second state in FIG. 4, the robot 1 jumps into the air by kicking the floor with the tiptoe of the foot 22 of the supporting leg (the foot 22 of the leg 2 on the rear side relative to the advancing direction of the robot 1 in the third state of FIG. 4), as illustrated by the third state in FIG. 4. This ends the one-leg supporting period and starts the floating period at the same time. The free leg in the one-leg supporting period exists at the rear of the supporting leg at the beginning of the one-leg supporting period, as illustrated by the first state in FIG. 4. Thereafter, the free leg is swung to the front of the supporting leg toward the next intended landing position, as illustrated by the second and the third states in FIG. 4.

Subsequently, after the floating period illustrated by the fourth state in FIG. 4, the robot 1 lands at the heel of the foot 22 of the free leg (the leg 2 that was the free leg in the one-leg supporting period immediately before the start of the floating period), starting the next one-leg supporting period.

Assuming the running gait illustrated in FIG. 4, the basic general outline of a desired gait generated by the gait generator 100 will be given.

When the gait generator 100 generates a desired gait, a required parameter representing basic requirements related to a motion mode of the robot 1 is input to the gait generator 100 through radio communication or the like from a control device, a server or the like, which are outside the robot 1 and which are not shown. The required parameter is composed of, for example, the type of motion (walking, running, or the like) of the robot 1, desired landing position/posture (intended landing position/posture) of the foot 22 of the free leg, targeted landing time (expected landing time) or a parameter necessary to determine the above factors (e.g., the mean moving speed or moving direction or the like of the robot 1). The required parameter may be stored and retained beforehand in a memory device, not shown, of the robot 1 and may be read by the gait generator 100 according to a predetermined schedule. The gait generator 100 also receives, as necessary, the information on a floor geometry in an environment in which the robot 1 travels from a memory device of the robot 1 or an external server or the like, which is not shown.

Supplementarily, the floor geometry information may be acquired as described below. For example, an imaging camera may be mounted on the robot 1 to take an image of an area ahead of the robot 1, thereby acquiring floor geometry information in the control unit 26 on the basis of the captured image. As another example, map information, including the information on a floor geometry in the environment in which the robot 1 travels, may be stored and retained in the control unit 26 of the robot 1 beforehand and a self-position recognizing function may be imparted to the robot 1. The recognized self-position is referred to the map information thereby to acquire the information on a floor geometry around the robot 1 by the control unit 26. The floor geometry information may include the information on properties, such as a hardness or frictional coefficient of a floor.

The gait generator 100 generates a desired gait according to a predetermined algorithm by using the aforesaid required parameter or the floor geometry information. To be more specific, according to the present embodiment, the gait generator 100 determines the gait parameters as the parameters that define some constituent elements of the desired gait, such as the desired foot position/posture trajectory of the desired gait and a desired floor reaction force vertical component trajectory, on the basis of the required parameter and the floor geometry information for generating gaits, and then sequentially determines the instantaneous values of the desired gait by using the aforesaid gait parameters and the dynamic model of the robot 1. Thus, the gait generator 100 generates the time series pattern (trajectory) of the desired gait.

In this case, the desired foot position/posture trajectory is generated for each foot 22 by using a finite-duration setting filter proposed in, for example, U.S. Pat. No. 3,233,450 by the applicant of the present application. The finite-duration setting filter is constituted of a plurality of stages (three stages or more in the present embodiment) of variable time constant first-order lag filters, i.e., filters whose transfer functions are expressed in the form of $1/(1+\tau s)$ ("$\tau$" denotes a variable time constant; the filters will be hereinafter referred to as the unit filters), the stages being connected in series. The finite-duration setting filter is capable of generating and outputting a trajectory in which a specified value is reached at desired specified time.

In this case, the time constant $\tau$ of the unit filters in each stage is set in a sequentially variable manner according to the remaining time from a start of the output/generation through the finite-duration setting filter to the aforesaid specified time. More specifically, the time constant $\tau$ is set such that the value of $\tau$ reduces from a predetermined initial value ($>0$) as the remaining time becomes shorter until finally the value of $\tau$ reaches zero at the specified time when the remaining time reaches zero. Further, a step input having a height based on the specified value (more specifically, a change amount from the initial value to the specified value of the output of the finite-duration setting filter) is supplied to the finite-duration setting filter.

The finite-duration setting filter is capable of not only generating an output that reaches a specified value at specified time but also setting a changing velocity of an output of the finite-duration setting filter at specified time to zero or approximately zero. Especially when three or more stages (three stages are fine) of the unit filters are connected, even the changing acceleration (the differential value of the changing speed) of an output of the finite-duration setting filter can be set to zero or approximately zero.

The foot position/posture trajectory (the position/posture trajectory from the instant the foot 22 lands to the instant the foot 22 lands next) is generated, for example, as described below by using the aforesaid finite-duration setting filter. The desired foot position trajectory in, for example, the X-axis direction (longitudinal direction) is generated as follows.

The height of the step input to the finite-duration setting filter is determined on the basis of the position in the X-axis direction of the next expected landing position of each foot 22 defined by the aforesaid required parameter (more specifically, a change amount (movement amount) in the X-axis direction relative to the landing position preceding the next expected landing position, which corresponds to the aforesaid specified value). Further, the time constant $\tau$ is initialized to a predetermined initial value and then the determined step input is supplied to the finite-duration setting filter, starting the generation of the trajectory of the position of the foot 22 in the X-axis direction. At the time of generating the trajectory, the time constant $\tau$ is sequentially and variably set such that the time constant $\tau$ reduces from the initial value to zero by the expected landing time (corresponding to the aforesaid specified time) of the foot 22. Thus, the trajectory of the position of the foot 22 in the X-axis direction, by which the expected landing position is reached at the expected landing time, is generated.

Further, the desired foot position trajectory in the Z-axis direction (the vertical direction) is generated, for example, as described below. First, the position of the foot 22 in the Z-axis direction at which the height (the vertical position) of the foot 22 becomes maximum (hereinafter referred to as the highest-point position) and the time at which the highest-point position is reached are determined on the basis of the next expected landing position and expected landing time of the foot 22. Then, the height of the step input to the finite-duration setting filter is determined on the basis of the highest-point position (corresponding to the aforesaid specified value). Further, the time constant τ is initialized, and thereafter, the determined step input is supplied to the finite-duration setting filter and the foot position trajectory in the Z-axis direction to the highest-point position is sequentially generated. At this time, the time constant τ is sequentially and variably set such that the time constant τ reduces from the initial value to zero until the time at which the highest-point position is reached (corresponding to the aforesaid specified time).

Further, when the generation of the trajectory of the position in the Z-axis direction up to the highest-point position is completed, the time constant τ is initialized, and a step input having a polarity opposite from that of the previous step input (more specifically, a step input with an opposite polarity that has a height based on the change amount in the Z-axis direction from the highest-point position to the next expected landing position (corresponding to the aforesaid specified value)) is input to the finite-duration setting filter, and the trajectory of the foot position in the Z-axis direction from the highest-point position to the expected landing position is sequentially generated. At this time, the time constant τ is sequentially and variably set such that the time constant τ reduces from the initial value to zero by the expected landing time of the foot 22.

In the generation of the foot position trajectory in the Z-axis direction, the time constant τ may alternatively be variably set such that it continuously reduces from its initial value to zero from the time at which the trajectory generation is started to the time at which the foot 22 is expected to land. At the same time, the polarity of a step input may be switched to an opposite polarity at or in the vicinity of the time when the highest-point position is reached, thereby generating the foot position trajectory in the Z-axis direction. This arrangement enables the foot 22 to reach an expected landing position at expected landing time with no problem although it does not enable the foot 22 to accurately reach a desired highest-point position.

A foot posture trajectory can be also generated by using the finite-duration setting filter in the same manner as with the foot position trajectory described above. In this case, among spatial components of a foot posture, for a component involved in a posture angle that monotonously changes (monotonously increases or monotonously decreases), the foot posture trajectory may be generated in the same manner as the generation of the foot position trajectory in the X-axis direction described above. Further, for a component involved in a posture angle change of an extremely large value or an extremely small value, the foot posture trajectory may be generated in the same manner as the generation of the foot position trajectory in the Z-axis direction described above.

The desired foot position/posture trajectory generated by the finite-duration setting filter as described above is the desired position/posture trajectory of each foot 22 in a supporting leg coordinate system, which will be discussed later.

The desired foot position/posture trajectory to be generated as described above is generated such that the position of each foot 22 starts moving while gradually accelerating from an initial ground contacting state (the state at the starting time of a desired gait) to an expected landing position. Then, the desired foot position/posture trajectory gradually reduces the changing velocity of the position to zero or approximately zero until finally the expected landing time is reached, and the foot stops at the expected landing position at the expected landing time. Accordingly, the ground speed at the instant each foot 22 lands (the changing velocity of the position of each foot in the supporting leg coordinate system fixed to a floor) becomes zero or approximately zero. Therefore, the landing impact will be small even when both legs 2, 2 simultaneously land from the state in which both legs 2, 2 are in the air (the state in the floating period) in the running gait.

In the aforesaid running gait, the vertical velocity of the body 24 is directed downward from the latter part of the floating period due to the gravitational force acting on the robot 1, and remains downward at the time of landing. Hence, the relative velocity of the foot 22 of the free leg in relation to the body 24 is directed upward immediately before landing when the desired foot position/posture trajectory is generated such that the ground speed becomes zero or approximately zero at the instant the foot 22 lands, as described above, and the desired position/posture trajectory of the body 24 is generated such that the dynamic balance condition is satisfied, as will be described later. This means that, at the landing instant in the running gait, the desired gait of the robot 1 is a gait in which the leg 2 of the free leg side is drawn in toward the body 24 at the time of landing. In other words, according to the desired gait in the present embodiment, the robot 1 lands with the foot 22 of the free leg pulled up, as observed from the body 24, such that the ground speed of the foot 22 becomes zero or approximately zero at the instant of landing. This reduces a landing impact, thus preventing an excessive landing impact.

In the present embodiment, since the finite-duration setting filter is formed of three stages or more (e.g., three stages) of the unit filters connected in series, the velocity of each foot 22 (the changing velocity of the foot position) reaches zero or approximately zero by the expected landing time and also each foot 22 stops with the acceleration thereof reaching zero or approximately zero at the expected landing time. This means that the ground speed at the landing instant also becomes zero or approximately zero. Hence, the landing impact will be further smaller. In particular, even if the landing time of the actual robot 1 deviates from desired landing time, the impact will not increase much. Supplementarily, in order to set the ground speed of each foot 22 to zero or approximately zero at expected landing time, the number of stages of the unit filters of the finite-duration setting filter may be two. However, in this case, the acceleration of each foot 22 at the expected landing time will not generally become zero.

Regarding the foot posture, after each foot 22 lands at the heel thereof at the expected landing time, the foot 22 continues to move until substantially the entire bottom surface of the foot 22 comes in contact with the floor. For this reason, the time at which substantially the entire bottom surface of the foot 22 comes in contact with the floor is set to the aforesaid specified time when generating the foot posture trajectory by the finite-duration setting filter.

In the present embodiment, the foot position trajectory has been generated by using the finite-duration setting filter. Alternatively, however, a desired foot position trajectory may be generated by using a function of, for example, a polynomial expression, which is set such that the changing velocity of the foot position at expected landing time becomes zero or approximately zero (the temporal differential value of the foot position becomes zero) and further the changing acceleration (the temporal differential value of the changing velocity) of the foot position at the expected landing time becomes zero or approximately zero. This applies also to the generation of a desired foot posture trajectory. However, regarding the generation of the desired foot posture trajectory, a function of a polynomial expression or the like is set such that the changing velocity of the posture of each foot 22 and further the changing acceleration thereof becomes zero or approximately zero at the time when substantially entire bottom surface of each foot 22 comes in contact with the floor, as described above.

Figure 5:
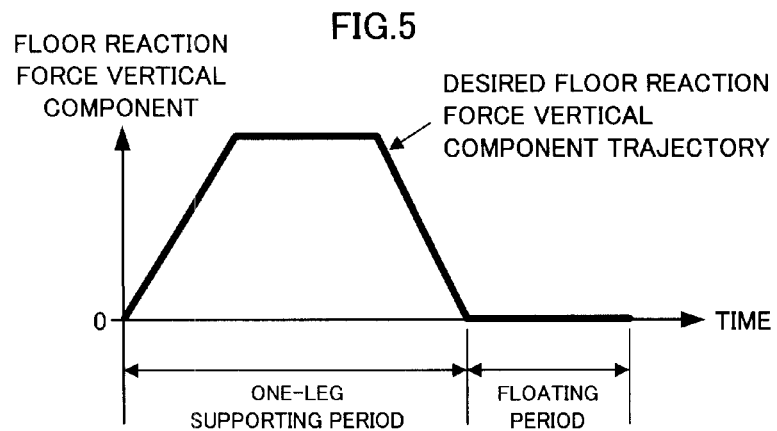
FIG. 5 is a graph illustrating an example of a desired floor reaction force vertical component trajectory generated by a gait generator shown in FIG. 3.

The gait generator 100 explicitly sets a desired floor reaction force vertical component. The desired floor reaction force vertical component trajectory is set, for example, as illustrated in FIG. 5. In the present embodiment, the shape of a desired floor reaction force vertical component trajectory (specifically, the shape in a one-leg supporting period) in a running gait is fixed to a trapezoidal shape (a shape bulging toward an increasing side of the floor reaction force vertical component). Further, the height of the trapezoid and the time of breakpoints are determined as the gait parameters (floor reaction force vertical component trajectory parameters) that define the desired floor reaction force vertical component trajectory.

In the floating period of a running gait, the desired floor reaction force vertical component is constantly set to zero. The desired floor reaction force vertical component trajectory is preferably set to be substantially continuous (such that values are not discontinuous) as with this example. This is for ensuring smooth operations of joints of the robot 1 when controlling a floor reaction force. Here, the phrase "substantially continuous" means that skipped values which inevitably result when a trajectory that is continuous in an analog manner (continuous trajectory in a true sense) is expressed in a digital manner by a discrete-time system do not cause loss of the continuity of the trajectory.

Supplementarily, in the present embodiment, a floor reaction force is taken as a total external force acting on the robot 1, so that a desired floor reaction force vertical component defines the inertial force in the vertical direction of the entire robot 1 (of the overall center of gravity of the robot 1). In other words, the result obtained by subtracting a component balancing the gravitational force acting on the entire robot 1 from the desired floor reaction force vertical component will balance the inertial force in the vertical direction of the entire robot 1. Accordingly, determining the desired floor reaction force vertical component eventually determines the inertial force in the vertical direction of the entire robot 1.

Figure 6A:
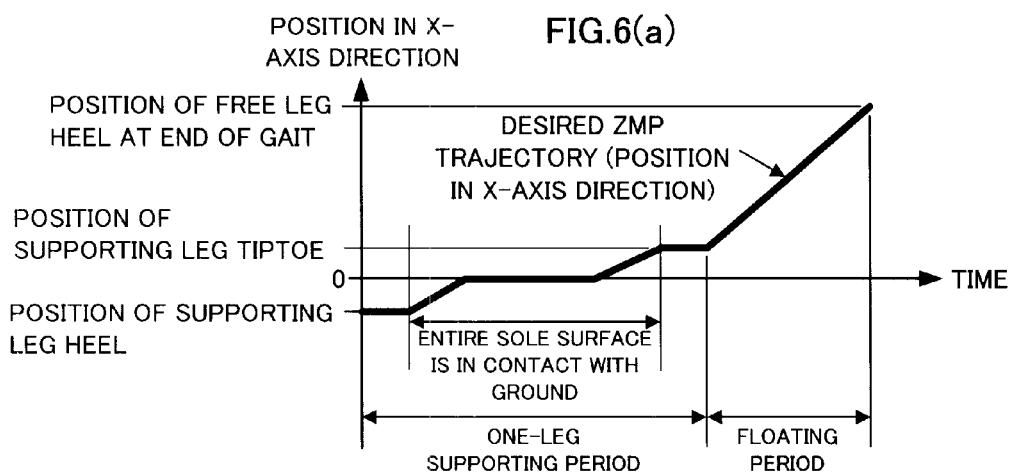
FIG. 6(a) and FIG. 6(b) are graphs illustrating an example of a desired floor reaction force vertical component trajectory (component in an X-axis direction and a component in a Y-axis direction) generated by the gait generator shown in FIG. 3.
Figure 6B:
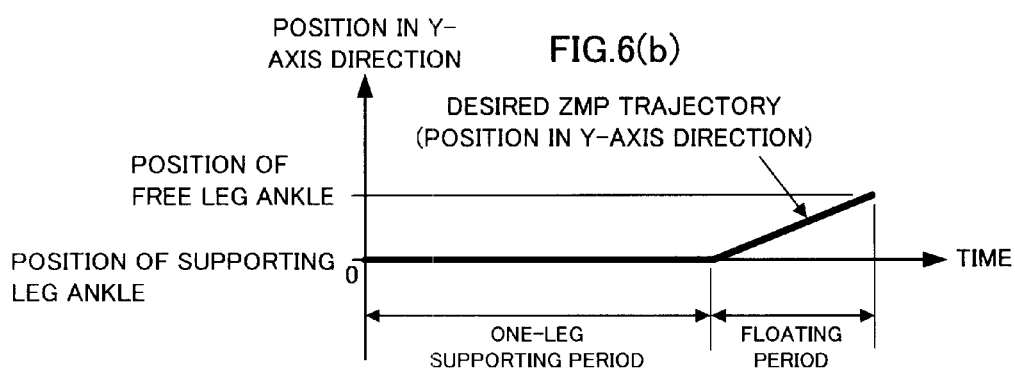

The desired ZMP trajectory is set as illustrated in, for example, FIGS. 6(a) and 6(b). In the running gait illustrated in FIG. 4, the robot 1 lands at its heel of the foot 22 of the supporting leg, as described above, then jumps into the air by kicking at the tiptoe of the foot 22 of the supporting leg, and lastly lands at the heel of the foot 22 of a free leg.

Hence, the position in the X-axis direction (longitudinal position) of the desired ZMP trajectory in the one-leg supporting period is set such that the position starts from the heel of the foot 22 of the supporting leg as its initial position, moves to the center in the longitudinal direction of the foot 22 in the period during which substantially the entire bottom surface of the foot 22 of the supporting leg comes in contact with the ground, and then moves to the tiptoe of the foot 22 of the supporting leg by the time of leaving the floor, as illustrated in FIG. 6(a). The position in the Y-axis direction (lateral position) of the desired ZMP trajectory in the one-leg supporting period is set at the same position as the position in the Y-axis direction of the center of the ankle joint of the leg 2 on the supporting leg side, as illustrated in FIG. 6(b).

As illustrated in FIG. 6(a), the position of the desired ZMP trajectory in the X-axis direction during the floating period is set to continuously move from the tiptoe of the foot 22 of the supporting leg to the landing position of the heel of the foot 22 of the free leg until the floating period ends (until the leg 2 of the free leg side lands).

Further, as illustrated in FIG. 6(b), the position of the desired ZMP trajectory in the Y-axis direction during the floating period is set to continuously move from the position in the Y-axis direction at the center of the ankle joint of the leg 2 on the supporting leg side to the position in the Y-axis direction at the center of the ankle joint of the leg 2 on the free leg side until the floating period ends (until the leg 2 of the free leg side lands). In other words, the desired ZMP trajectory is set to be a trajectory that is continuous (substantially continuous) throughout the entire period of the gait. Here, the meaning of the phrase "substantially continuous" ZMP trajectory mentioned above is the same as that in the case of the aforesaid floor reaction force vertical component trajectory.

In the present embodiment, the positions and time of the breakpoints of the desired ZMP trajectories illustrated in FIGS. 6(a) and 6(b) are set as the ZMP trajectory parameters (the parameters that define the desired ZMP trajectory).

The ZMP trajectory parameters are determined to have a high stability allowance and not to develop a sudden change. Here, a state in which a desired ZMP exists around the center of a smallest convex polygon (so-called supporting polygon) that includes a ground contact surface of the robot 1 indicates a high stability allowance (for more detail, refer to Japanese Patent Application Laid-Open No. 10-86081). The desired ZMP trajectories illustrated in FIGS. 6(a) and 6(b) are set such that the aforesaid conditions are satisfied.

Further, a desired arm posture is expressed in terms of a relative posture in relation to the body 24.

Further, desired body position/posture and desired foot position/posture are described using a global coordinate system. The global coordinate system is a coordinate system fixed to a floor. More specifically, the supporting leg coordinate system described below is used. The supporting leg coordinate system is a coordinate system fixed to a floor, in which the origin thereof is a point at which the normal extended from the center of the ankle of the leg 2 on the supporting leg side to a floor surface intersects with the floor surface (this point agrees with the representative point of the foot 22 in a state wherein the substantially entire bottom surface of the foot 22 of the supporting leg is in contact with the floor surface in an example of the present embodiment) in a state wherein the foot 22 of the supporting leg is in a posture parallel to the floor surface and substantially the entire bottom surface of the foot 22 of the supporting leg is in contact (close contact) with the floor surface. The horizontal plane passing the origin is defined as an XY plane. In this case, the X-axis direction and the Y-axis direction are the longitudinal direction and the lateral direction, respectively, of the foot 22 of the supporting leg.

The origin of the supporting leg coordinate system does not necessarily coincide with the representative point of the foot 22 (the point that represents the position of the foot 22) in the state wherein substantially the entire bottom surface of the foot 22 of the supporting leg is in contact with the floor surface. Alternatively, the origin may be set at a point on the floor surface that is different from the aforesaid representative point.

Figure 7:
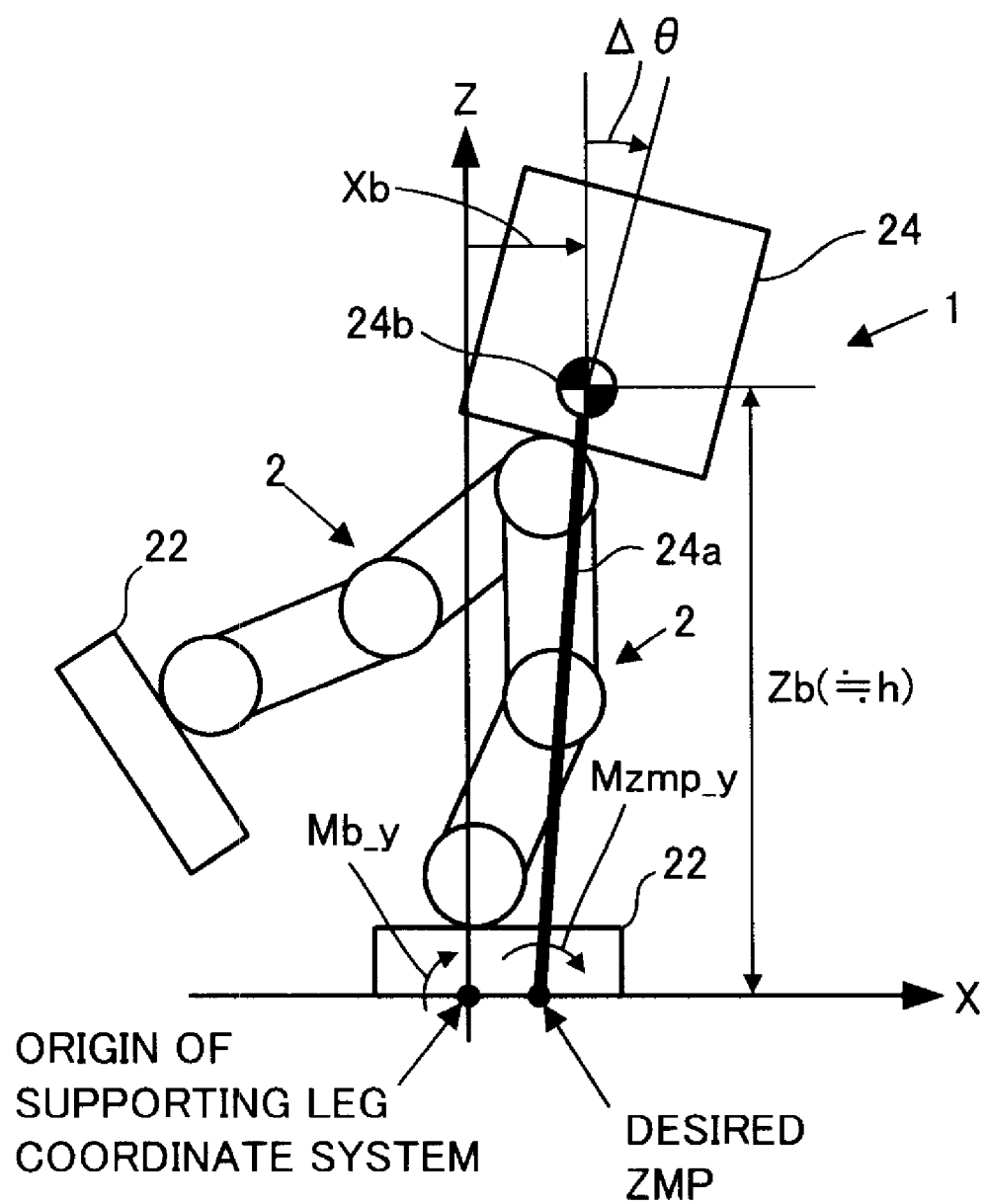
FIG. 7 is a diagram visually illustrating a dynamic model of a robot used in the processing by the gait generator and a posture stabilization control calculator shown in FIG. 3.

Referring now to FIG. 7, the dynamic model of the robot 1 used for generating gaits by the gait generator 100 will be described.

The dynamic model of the robot 1 used in the present embodiment is a model formed of an inverted pendulum provided with a rod 24a, which can be swung with a desired ZMP as its supporting point and which has a variable length, and a mass point 24b supported by the upper end of the rod 24a, as illustrated in FIG. 7 (hereinafter referred to as the inverted pendulum model in some cases). It is assumed that the rod 24a does not have a mass.

In this dynamic model, a motion of the mass point 24b of the inverted pendulum corresponds to a motion of the body 24 of the robot 1, and the relationship between a motion of the body 24 and a floor reaction force acting on the robot 1 is expressed in terms of the relationship between a motion of the mass point 24b (hereinafter referred to as the body mass point 24b) and a floor reaction force acting on the inverted pendulum.

Further, in the dynamic model, the masses of the legs 2, 2 of the robot 1 are regarded to be sufficiently smaller than that of the body 24 (or the mass of the combination of the body 24, the arms and the head), and the mass of the body mass point 24b is to agree with the mass of the entire robot 1. The position of the body mass point 24b is set to a position uniquely determined from the body position/posture of the robot 1.

The behavior of the dynamic model (the dynamics of the robot on the dynamic model) is mathematized as shown below. However, for the purpose of simplifying the description, only a dynamic equation on a sagittal plane (a plane that includes the X-axis and the Z-axis of the supporting leg coordinate system) will be described, omitting a dynamic equation on a lateral plane (a plane that includes the Y-axis and the Z-axis of the supporting leg coordinate system).

For the convenience of description, the variables and parameters related to the dynamic model are defined as follows.

Zb: Vertical position of the body mass point (Position in the Z-axis direction)

Xb: Horizontal position of the body mass point (Position in the X-axis direction)

mb: Mass of the body mass point

Xzmp: Horizontal position of a desired ZMP (Position in the X-axis direction)

Zzmp: Vertical position of a desired ZMP (Position in the Z-axis direction)

Fx: Horizontal component of a floor reaction force (more specifically, a component in the X-axis direction of a translational floor reaction force)

Fz: Vertical component of a floor reaction force (more specifically, a component in the Z-axis direction of a translational floor reaction force)

Mzmp_y: Floor reaction force moment about a desired ZMP (more specifically, a component about the Y-axis of the floor reaction force moment)

Mb_y: Floor reaction force moment about the origin of the supporting leg coordinate system (more specifically, a component about the Y-axis of the floor reaction force moment)

On an arbitrary variable A, dA/dt denotes a first-order differential value of A, and d2A/dt2 denotes a second-order differential value of A. Accordingly, if the variable A denotes a displacement (position), then dA/dt denotes a velocity, and d2A/dt2 denotes acceleration. Reference character "g" denotes a gravitational acceleration constant. Here, "g" takes a positive value.

The dynamic equations of the dynamic model are given by expressions 01 to 04.

$$Fz=mb*(g+d2Zb/dt2) \qquad \text{Expression 01}$$

$$Fx=mb*d2Xb/dt2 \qquad \text{Expression 02}$$

$$Mb\_y=-mb*Xb*(g+d2Zb/dt2)+mb*Zb*(d2Xb/dt2) \qquad \text{Expression 03}$$

$$Mzmp\_y=-mb*(Xb-Xzmp)*(g+d2Zb/dt2)+mb*(Zb-Zzmp)*(d2Xb/dt2) \qquad \text{Expression 04}$$

In this case, the relationship between Mb_y and Mzmp_y is represented by the following expression 05.

$$Mb\_y=Mzmp\_y-mb*Xzmp*(g+d2Zb/dt2)+mb*Zzmp*(d2Xb/dt2)=Mzmp\_y-Xzmp*Fz+Zzmp*Fx \qquad \text{Expression 05}$$

The positional difference between a desired ZMP and the origin of the supporting leg coordinate system in the vertical direction (Z-axis direction) is usually zero or approximately zero, so that Zzmp may be regarded as zero (Zzmp=0).

Further, a relative variation amount of height of the body 24 (the position in the vertical direction) relative to a mean height, that is, the divergence of the vertical position of the body 24, when the robot 1 travels is generally sufficiently small. Therefore, Zb≈h is applicable (h: Constant value indicating a mean height of the body mass point 24b corresponding to a mean height of the body 24). Accordingly, Zb in the second term of the right side of expression 03 given above and the second term of the right side of expression 04 given above may be replaced by the constant value h.

The gait generator 100 in the present embodiment generates a desired gait for one step in order, the desired gait for one step being defined by a period from the instant one of the legs 2 of the robot 1 lands to the instant the other leg 2 lands. Thus, in the running gait which is generated in the present embodiment and which is illustrated in FIG. 4, the desired gait from the instant the one-leg supporting period begins to the instant the floating period following the one-leg supporting period ends (the instant the next one-leg supporting period begins) is generated in order.

Here, in the present description, the term "one step" of a desired gait is used to mean the period from the instant one of the legs 2 of the robot 1 lands to the instant the other leg 2 lands. Further, a desired gait which is about to be generated anew is referred to as "a current time's gait," the next desired gait is referred to as "a next time's gait," and the further next desired gait is referred to as "a next but one time's gait." A desired gait generated immediately preceding a current time's gait is referred to as "a last time's gait."

Further, when the gait generator 100 generates a current time's gait, the required parameters that define the expected landing position/posture and the expected landing time of the foot 22 of a free leg for the next two steps of the robot 1 are input to the gait generator 100 (or the gait generator 100 reads the required parameters from a memory device). Then, the gait generator 100 uses the required parameters to generate a desired body position/posture trajectory, a desired foot position/posture trajectory, a desired ZMP trajectory, a desired floor reaction force vertical component trajectory, a desired arm posture trajectory and the like.

At this time, in order to generate a current time's gait that enables the continuity of the motion of the robot 1 to be secured, the gait generator 100 determines a normal turning gait as a virtual cyclic gait following the current time's gait (a gait in which the same pattern of motion of the robot 1 is continuously repeated at a certain cycle) on the basis of the required parameters. Then, the gait generator 100 generates the current time's gait such that the current time's gait will be converged to a normal turning gait in the future.

Taking the generation of a running gait illustrated in FIG. 4 as a major example, the following will explain the processing for generating a gait carried out by the gait generator 100 with reference to detailed diagrams of FIG. 8 to FIG. 21.

Figure 8:
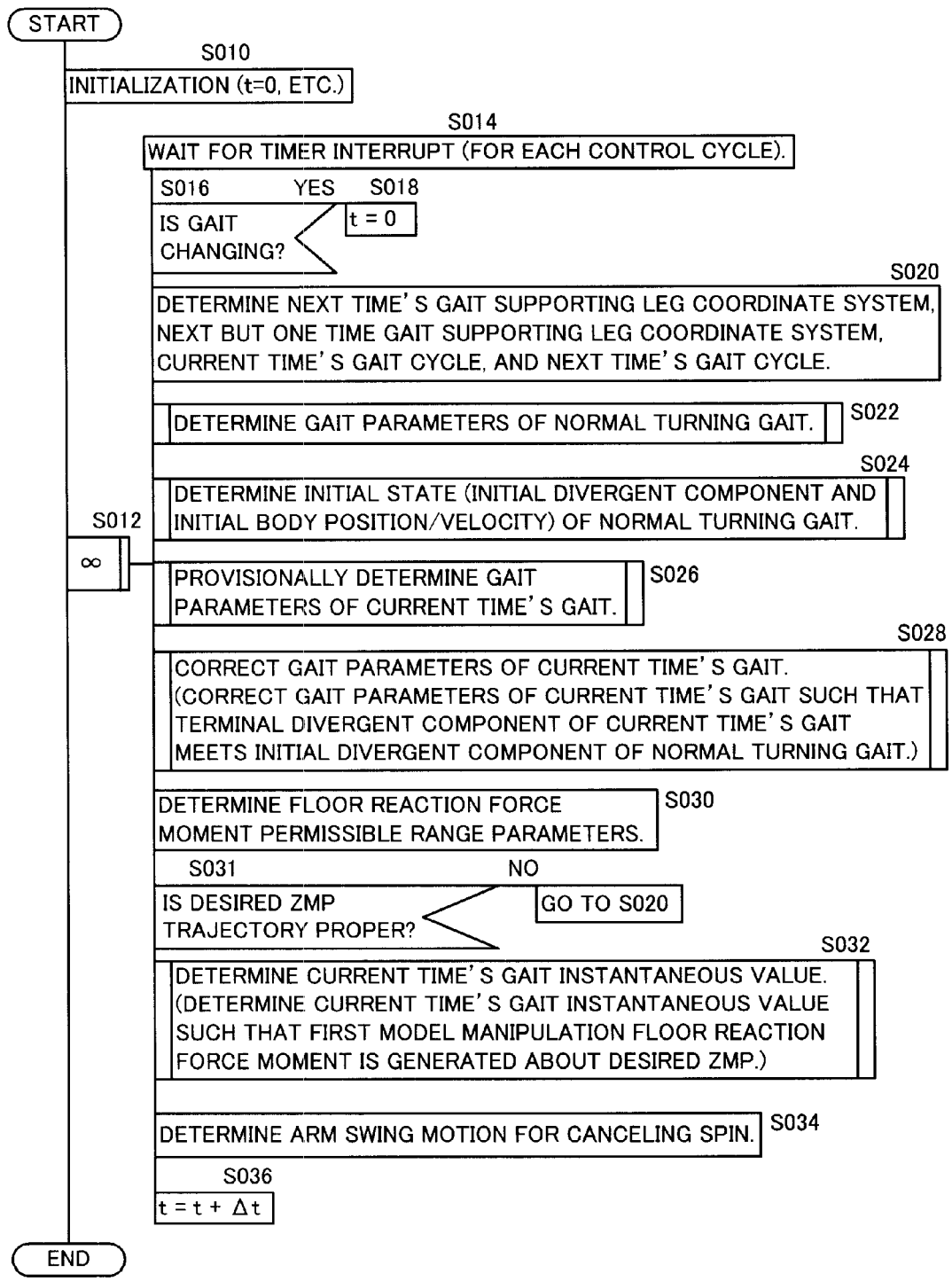
FIG. 8 is a flowchart illustrating main routine processing carried out by the gait generator shown in FIG. 3.

The gait generator 100 generates a desired gait by carrying out the gait generating processing (main routine processing) illustrated by the flowchart (structured flowchart) of FIG. 8.

First, in S010, various initializing operations, such as initializing time t to zero, are performed. This processing is carried out at the time of a startup or the like of the gait generator 100.

Subsequently, the gait generator 100 proceeds via S012 to S014 wherein the gait generator 100 waits for a timer interrupt at each control cycle (the arithmetic processing cycle in the flowchart of FIG. 8). The control cycle is denoted by $\Delta t$.

Subsequently, the gait generator 100 proceeds to S016 to determine whether a gait changeover has taken place. At this time, if a changeover of a gait has occurred, then the gait generator 100 proceeds to S020 via the processing in S018. In this case, the gait generator 100 initializes time t to zero in S108. If it is determined in S016 that a changeover of the gait has not occurred, then the gait generator 100 proceeds to S020.

Here, the phrase "the gait changeover" means the timing at which the generation of a last time's gait is completed and the generation of a current time's gait is about to begin. For example, a control cycle that follows the control cycle at which the generation of the last time's gait has been completed indicates the gait changeover.

Subsequently, the gait generator 100 proceeds to S020 to determine a next time's gait supporting leg coordinate system, a next but one time's gait supporting leg coordinate system, a current time's gait cycle, and a next time's gait cycle. Determining a supporting leg coordinate system means to determine the position of the origin thereof and the posture of the supporting leg coordinate system (the orientation of each coordinate system axis).

These supporting leg coordinate system and gait cycle are basically determined on the basis of the aforesaid required parameters. More specifically, in the present embodiment, the required parameters input to the gait generator 100 include required values that define the expected landing positions/postures of the foot 22 of a free leg for the following two steps (the foot position/posture in a state wherein the foot 22 is rotated without a slippage such that substantially the entire sole comes in contact with a floor surface after the foot 22 lands) and expected landing time. The required values for the first step and the required values for the second step are considered to correspond to the current time's gait and the next time's gait, respectively, and supplied to the gait generator 100 before the generation of the current time's gait is started (before the gait changeover in S016 mentioned above).

Then, at the control cycle of a gait changeover (a control cycle at which t becomes zero), the next time's gait supporting leg coordinate system is determined on the basis of the required value of the expected landing position/posture of the foot 22 of the free leg of the first step (the foot 22 of the free leg in the current time's gait) in the aforesaid required parameters.

Figure 11:
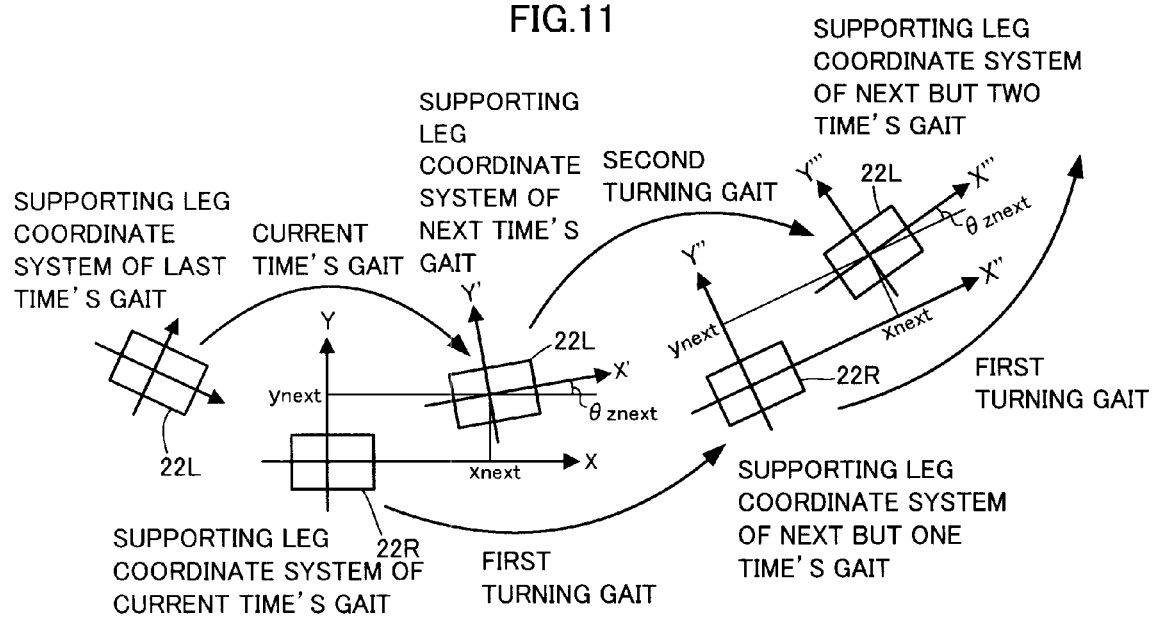
FIG. 11 is a diagram illustrating the modes of motions of feet of the robot shown in FIG. 1 and supporting leg coordinate systems.

For example, referring to FIG. 11, it is assumed that the required values of the expected landing position/posture of the foot 22 of the free leg (22L in the figure) involved in the current time's gait (the first step) specify the position/posture obtained by moving, from the landing position/posture of the foot 22 (22R in the figure) of the supporting leg of the current time's gait, in the X-axis direction (in the longitudinal direction of the foot 22R of the supporting leg in the current time's gait) and in the Y-axis direction (in the lateral direction of the foot 22R of the supporting leg in the current time's gait) of the current time gait's supporting leg coordinate system by xnext and ynext, respectively, and rotating about the Z-axis (about the vertical axis) by $\theta$znext.

At this time, the next time's gait supporting leg coordinate system is determined to be a coordinate system in which the origin thereof is the representative point of a foot 22L (more specifically, a point on the floor that coincides with the representative point) in the case where the foot 22L is landed according to the required values of the expected landing position/posture of the foot 22L of the free leg in the current time's gait (in the case where the representative point of the foot 22 coincides with the required value of the expected landing position and the posture (orientation) of the foot 22 coincides with the required value of the expected landing posture), and the longitudinal direction and the lateral direction of the foot 22L in the horizontal plane passing the origin are defined as an X'-axis direction and a Y'-axis direction, as illustrated.

In the same manner as that described above, the next but one time's gait supporting leg coordinate system (refer to the X"Y" coordinate in FIG. 11) is determined on the basis of the required values of the expected landing position/posture of the foot 22 of the free leg of the second step. The current time's gait cycle is determined to be the time from the expected landing time (required value) of the foot 22 of the supporting leg of the current time's gait to the expected landing time (required value) of the foot 22 of the free leg of the first step (current time's gait). The next time's gait cycle is determined to be the time from the expected landing time (required value) of the foot 22 of the free leg of the first step to the expected landing time (required value) of the foot 22 of the free leg of the second step.

At a control cycle after the gait changeover (a control cycle at which t>0), the next time's gait supporting leg coordinate system, the next but one time's gait supporting leg coordinate system, the current time's gait cycle and the next time's gait cycle will be basically set to the same as those determined in a previous control cycle.

The required parameters are input to the gait generator 100 from, for example, an external controlling device, a server or the like of the robot 1. Alternatively, the required parameters may be stored and retained beforehand in a memory device of the robot 1 as a moving schedule of the robot 1. Further alternatively, the next time and the next but one time's gait supporting leg coordinate systems and the current time's and the next time's gait cycles may be determined on the basis of a command (request) from the controlling device and a movement history of the robot 1 up to the moment. The required parameters may be parameters that directly specify the positions and postures of the next time and the next but one time's gait supporting leg coordinate systems and the current time's and the next time's gait cycles.

Supplementarily, according to the present embodiment, the expected landing position/posture of the free leg foot 22 of the robot 1 in one or both of a current time's gait and a next time's gait (by extension, the position/posture of at least one of the next gait's supporting leg coordinate system and the next but one time's gait supporting leg coordinate system), or the gait cycle of a current time's gait or the next time's gait may be corrected at each control cycle from the one determined first in S020. In other words, the processing in S020 may be carried out a plurality of times at each control cycle.

Subsequently, the gait generator 100 proceeds to S022 to determine the gait parameters of a normal turning gait as a virtual cyclic gait following the current time's gait (a virtual cyclic gait to which the current time's gait aims to converge). The gait parameters in the present embodiment include a foot trajectory parameter that defines a desired foot position/posture trajectory in a normal turning gait, a body posture trajectory parameter that defines a desired body posture trajectory, an arm posture trajectory parameter that defines a desired arm posture trajectory, a ZMP trajectory parameter that defines a desired ZMP trajectory, and a floor reaction force vertical component trajectory parameter that defines a desired floor reaction force vertical component trajectory.

Here, "the normal turning gait" means a cyclic gait in which no discontinuity takes place in the motional states (motional states, such as foot position/posture and body position/posture) of the robot 1 at the boundary of a gait (a gait boundary of each cycle) when the gait is repeated. Further, "the normal turning gait" is a cyclic gait, which repeats the same pattern of gait at a certain cycle, meaning that it is a gait that permits continuous motions of the robot 1. In other words, "the normal turning gait" is a cyclic gait that enables repeated motions of the same pattern without developing discontinuity in a gait trajectory (a gait which, in principle, does not develop "divergence," which will be discussed later, when repeated an infinite number of times).

In the present embodiment, the normal turning gait, which is a cyclic gait, repeats a gait for one cycle at certain intervals, the gait for one cycle being formed of a gait for two steps of the robot 1, i.e., the gait composed of the first turning gait following the current time's gait and the second turning gait following the first turning gait. Here, the term "turning" is used, because a zero turning rate means traveling straight, so that traveling straight can be also included in the term "turning" in a broad sense.

If a desired gait to be generated is a running gait illustrated in FIG. 4, then the first turning gait and the second turning gait of a normal gait are both gaits having the one-leg supporting period and the floating period as with a desired gait. In other words, the basic gait pattern of the first turning gait and the second turning gait are the same as that of the current time's gait.

To supplement the description of the normal turning gait (hereinafter referred to simply as the normal gait in some cases), the gait for one cycle of a normal gait of a bipedal robot need to include a gait for at least two steps. In this case, it is possible to set a complicated normal gait in which the gait for one cycle has three steps for more. However, the normal gait is used merely to determine the value of a desired (proper) divergent component at the end (ending time) of the current time's gait, as will be discussed later. Therefore, using a normal gait formed of a gait having three steps or more as one cycle provides little effect despite the complicated processing for generating the gait. For this reason, the gait for one cycle of the normal gait in the present embodiment is formed of a gait of two steps (a set of the first turning gait and the second turning gait). In the case of a legged mobile having three feet or more, the number of gaits defining the normal gait will increase accordingly.

Figure 9:
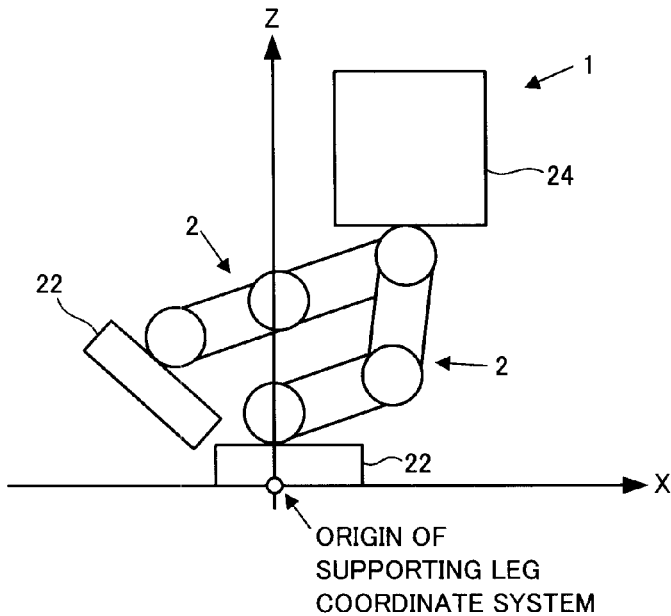
FIG. 9 is a diagram visually showing a divergent state of the posture of the robot shown in FIG. 1.

Here, "divergence" means that the position of the body 24 of the robot 1 deviates to a position far apart from the positions of both feet 22, 22, as illustrated in FIG. 9. The value of a divergent component is a numerical value indicating the degree of the deviation of the position of the body 24 of the robot 1 from the positions of both feet 22, 22 (more specifically, the origin of the supporting leg coordinate system set on the ground contact surface of the foot 22 of the supporting leg).

The normal gait is a virtual gait prepared by the gait generator 100 to determine a desired motional state of the robot 1 at the end of the current time's gait. Hence, the normal turning gait is not directly output from the gait generator 100.

In the present embodiment, a divergent component is used as an indicator in generating gaits so as to continuously generate desired gaits without developing the aforesaid divergence. In this case, even for a normal gait, which is a typical example of a continuous gait, the initial divergent component of the normal gait (the divergent component at the starting time of the normal gait) changes if the gait parameters of the normal gait change. More specifically, a proper divergent component changes according to the type of gait, such as walking, running and a traveling speed.

In the present embodiment, therefore, when generating a current time's gait, the gait generator 100 first determines a normal gait as a virtual cyclic gait in the future ideally suited as the gait following the current time's gait to be generated (a gait targeted also at convergence in the future) (virtual cyclic gait in the future that enables stable travel of the robot 1 to be continued) on the basis of the required parameters related to the current time's gait (or the supporting leg coordinate system and the gait cycle determined in S020), then determines an initial divergent component of the normal gait. Then, the gait generator 100 generates the current time's gait such that the terminal divergent component of the current time's gait coincides with the initial divergent component of the determined normal gait (more generally, the current time's gait is continued or gradually approximated to the normal gait). The basic guideline of the gait generation described above is the same as that disclosed in U.S. Pat. No. 3,726,081 previously proposed by the present applicant.

However, in the present embodiment, the divergent component of a gait is defined on the basis of a state equation of the aforesaid dynamic model (the inverted pendulum model) illustrated in FIG. 7, as will be discussed later. The definition of the divergent component will be discussed in detail hereinafter.

Figure 10:
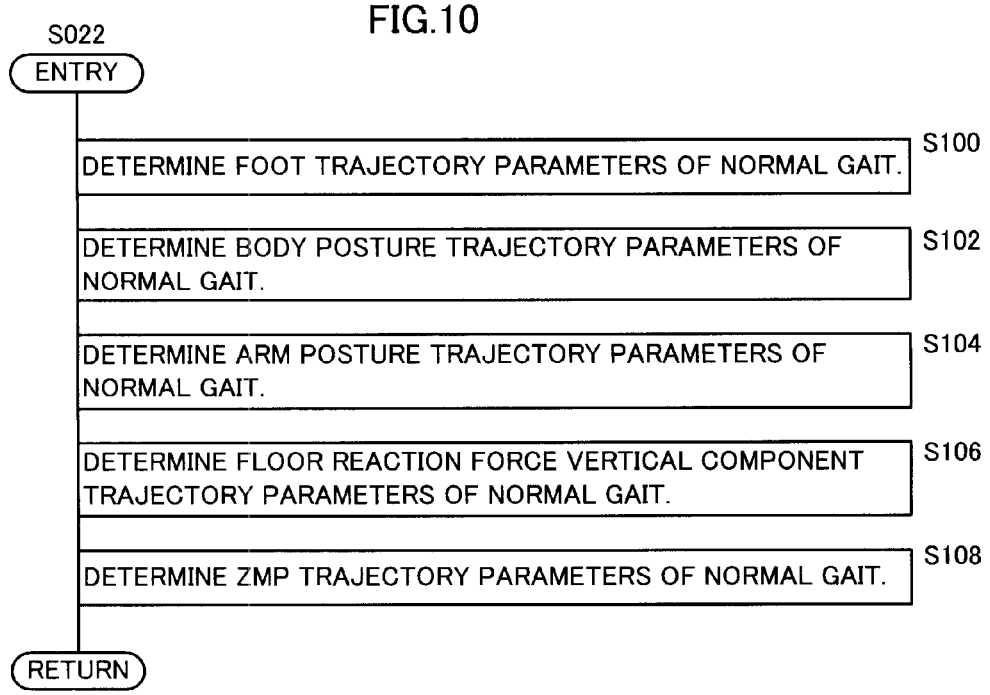
FIG. 10 is a flowchart illustrating subroutine processing in S022 of FIG. 8.

Referring back to the main subject, the gait generator 100 carries out in S022 the subroutine processing illustrated by the flowchart of FIG. 10.

First, in S100, the gait generator 100 determines a foot trajectory parameter of the gait parameters of the normal gait such that a foot position/posture trajectory continues in the order of a current time's gait, a first turning gait, and a second turning gait. The following will describe a specific setting method with reference to FIG. 11. In the following description, the foot 22 of the leg 2 on the supporting leg side will be referred to as the supporting leg foot 22, while the foot 22 of the leg 2 on the free leg side will be referred to as the free leg foot 22. The "initial" gait and the "terminal" gait will mean the starting time and the ending time, respectively, of each gait or instantaneous gaits at the starting time and the ending time.

The foot trajectory parameter is constituted of the positions/postures of the supporting leg foot 22 and the free leg foot 22, respectively, at the beginning and the end of the first turning gait and the second turning gait, respectively, and the gait cycle of each turning gait (the time from the beginning to the end of each turning gait). In the foot trajectory parameter, the free leg foot position/posture at the beginning of the first turning gait are defined as the supporting leg foot position/posture at the end of the current time's gait observed from a next time's gait supporting leg coordinate system.

In this case, in a running gait, the supporting leg foot 22 at the end of the current time's gait is moving in the air. Further, the supporting leg foot position/posture at the end of the current time's gait is determined by generating a foot position/posture trajectory (more specifically, a trajectory observed from the next time's gait supporting leg coordinate system) from the supporting leg foot position/posture at the beginning of the current time's gait (=the free leg foot position/posture at the end of a last time's gait) to a free leg foot position/posture at the end of the next time's gait, which is determined on the basis of the required value of the expected landing position/posture of the free leg foot 22 of the second step in the aforesaid required parameter (the required values of the expected landing position/posture in the next time's gait of the supporting leg foot 22 of the current time's gait) or a next but one time's gait supporting leg coordinate system corresponding to the required value, to the end of the current time's gait by using the aforesaid finite-duration setting filter.

The free leg foot position/posture at the end of the next time's gait is determined such that the position/posture of the foot 22 obtained by turning the foot 22 in the pitch direction with the toes down while keeping the foot 22 in contact with the ground from the position/posture to a horizontal posture coincide with the position/posture of the next but one time's gait supporting leg coordinate system. In other words, the free leg foot position/posture at the end of the next time's gait are the position/posture of the foot 22 in a state wherein the foot has been rotated by a predetermined angle in the pitch direction with the toes lifted while the foot 22 is kept in contact with the ground without a slippage from the required values of the expected landing position/posture of the free leg foot 22 of the second step in the required parameter (a state wherein the heel has been landed with the toes up).

Further, the supporting leg foot position/posture at the beginning of the first turning gait are the free leg foot position/posture at the end of the current time's gait observed from the next time's gait supporting leg coordinate system. In this case, the free leg foot position/posture at the end of the current time's gait are determined on the basis of the aforesaid next time's gait supporting leg coordinate system or the required values of the expected free leg landing position/posture of the first step (the current time's gait) of the aforesaid required parameter corresponding thereto, as with the case of the free leg foot position/posture at the end of the next time's gait. More specifically, the free leg foot position/posture at the end of the current time's gait are determined such that the representative point of the foot 22 when the foot 22 has been rotated, from the position/posture, with the toes down while keeping the foot 22 in contact with the ground until substantially the entire bottom surface of the foot 22 comes in contact with a floor surface coincides with the origin of next time's gait supporting leg coordinate system.

The free leg foot position/posture at the end of the first turning gait is determined on the basis of the position/posture of the next but one time's gait supporting leg coordinate system observed from the next time's gait supporting leg coordinate system, as with the technique for determining the free leg foot position/posture at the end of the current time's gait or the free leg foot position/posture at the end of the next time's gait. To be more specific, the free leg foot position/posture at the end of the first turning gait are determined such that the position/posture of the foot 22 when the foot 22 has been rotated in the pitch direction without a slippage while keeping the foot 22 in contact with the ground from the position/posture to the horizontal posture coincide with the position/posture of the next but one time's gait supporting leg coordinate system observed from the next time's gait supporting leg coordinate system.

At the end of the first turning gait, the supporting leg foot 22 is off the floor and in the air. In order to determine the trajectory after the supporting leg foot 22 leaves the floor, the expected landing position/posture of the supporting leg foot of the first turning gait are set. The expected landing position/posture of the supporting leg foot of the first turning gait are determined on the basis of the position/posture of the next but two time's gait supporting leg coordinate system observed from the next time's gait supporting leg coordinate system. To be more specific, the expected landing position/posture of the supporting leg foot of the first turning gait are the position/posture of the next but two time's gait supporting leg coordinate system observed from the next time's gait supporting leg coordinate system. The next but two time's gait supporting leg coordinate system is determined such that the relative position/posture relationship between the next but one time's gait supporting leg coordinate system and the next but two time's gait supporting leg coordinate system coincides with the relative position/posture relationship between the current time gait's supporting leg coordinate system and the next time's gait supporting leg coordinate system.

The supporting leg foot position/posture at the end of the first turning gait are determined by generating a foot position/posture trajectory from the supporting leg foot position/posture at the beginning of the first turning gait to the expected landing position/posture of the supporting leg foot of the first turning gait (more specifically, the trajectory observed from the next time's gait supporting leg coordinate system) until the end of the first turning gait by using the aforesaid finite-duration setting filter, as with the case where the supporting leg foot position/posture at the beginning of the first turning gait have been determined.

The free leg foot position/posture at the beginning of the second turning gait are the supporting leg foot position/posture at the end of the first turning gait observed from the next but one time's gait supporting leg coordinate system. The supporting leg foot position/posture at the beginning of the second turning gait are the free leg foot position/posture at the end of the first turning gait observed from the next but one time's gait supporting leg coordinate system.

The free leg foot position/posture at the end of the second turning gait are the free leg foot position/posture at the end of the current time's gait observed from the current time gait's supporting leg coordinate system. The supporting leg foot position/posture at the end of the second turning gait are the supporting leg foot position/posture at the end of the current time's gait observed from the current time gait's supporting leg coordinate system.

The gait cycles of the first turning gait and the second turning gait are set to be the same as the next time's gait cycle. The gait cycles of the first turning gait and the second turning gait do not necessarily have to be the same; however, both cycles are preferably determined on the basis of at least the next time's gait cycle.

Subsequently, the gait generator 100 proceeds to S102 wherein the gait generator 100 determines the body posture trajectory parameters that define the desired body posture trajectory in the normal gait.

In this case, according to the present embodiment, the body posture trajectory parameter of the normal gait is determined such that the desired body posture trajectory defined thereby coincides with the trajectory of a reference body posture of a predetermined pattern determined in advance. The reference body posture in the present embodiment is set to be a constant posture (fixed posture) with no temporal changes. The reference body posture is, for example, a posture in which the body trunk axis of the body 24 is constantly oriented in the vertical direction (the body posture in a state wherein the robot 1 is standing straight), i.e., a posture in which the body posture angle relative to the vertical direction is constantly maintained at zero. Further, the parameters defining the trajectory of the reference body posture (the parameters including the value of a constant body posture angle of the reference body posture) are determined as the body posture trajectory parameters. En the case where the body posture is set to the constant posture as described above, the angular velocity and the angular acceleration of the body posture angle will be naturally maintained at zero at all times.

Supplementarily, the body posture of the normal gait does not have to be a constant posture as long as the body posture is set such that the beginning of the normal gait (the beginning of the first turning gait) and the end thereof (the end of the second turning gait) are connected (such that the body posture angle and the angular velocity thereof coincide with each other at the beginning and the end of the normal gait). En the present embodiment, the reference body posture has been set to be the constant posture for the purpose of easy understanding of the present embodiment.

Subsequently, the gait generator 100 proceeds to S104 to determine arm posture trajectory parameters, more specifically, arm posture trajectory parameters other than those related to the angular momentum changes of both arms about the vertical axis (or the body trunk axis of the body 24). For example, the parameters defining the relative height of the hand distal end of an arm in relation to the body 24 and the relative center-of-gravity position of the entire arm are determined as the arm posture trajectory parameters. In this case, according to the present embodiment, the relative center-of-gravity position of the entire arm is set to be maintained constant relative to the body 24.

Subsequently, the gait generator 100 proceeds to S106 to determine floor reaction force vertical component trajectory parameters. In this case, the floor reaction force vertical component trajectory parameters are determined such that the floor reaction force vertical component trajectory defined by the parameters will be substantially continuous in both the first turning gait and the second turning gait.

To be more specific, a desired floor reaction force vertical component trajectory of a normal gait is set according to a pattern illustrated in, for example, FIG. 12. According to the pattern, in both the first turning gait and the second turning gait, the floor reaction force vertical component changes in a trapezoidal shape in a one-leg supporting period, and the floor reaction force vertical component is maintained at zero in a floating period. The time of a breakpoint of the pattern and the height (peak value) of the trapezoidal portion are determined as the floor reaction force vertical component trajectory parameters.

The floor reaction force vertical component trajectory parameters are determined such that the mean value of the floor reaction force vertical components in the period equivalent to one cycle of the normal gait (the period combining the period of the first turning gait and the period of the second turning gait) agrees with the self weight of the robot 1. In other words, the floor reaction force vertical component trajectory parameters are determined such that the mean value of the floor reaction force vertical components during the period equivalent to one cycle of the normal gait has the same magnitude as that of the gravitational force acting on the entire robot 1 and is in the opposite direction.

Determining the floor reaction force vertical component trajectory parameters (and subsequently the floor reaction force vertical component trajectory) is necessary to satisfy a condition of a normal gait. The condition of the normal gait is that an initial state (the initial state of a first turning gait observed from the supporting leg coordinate system of the first turning gait of the normal gait) and a terminal state (the terminal state of a second turning gait observed from the supporting leg coordinate system of the first turning gait following the second turning gait of the normal gait) on every state amount of the normal gait (motional state amounts, including the position, the posture and the velocity of each portion of the robot 1) coincide with each other (hereinafter, the condition will be referred to as the boundary condition of a normal gait in some cases).

Hence, the difference between the overall center-of-gravity vertical velocity of the robot 1 at the end of the normal gait and the overall center-of-gravity vertical velocity at the beginning of the normal gait (more specifically, the difference between the overall center-of-gravity vertical velocity at the end of the second turning gait and the overall center-of-gravity vertical velocity at the beginning of the first turning gait) must be also zero. The aforesaid difference is the integral value of the difference between the floor reaction force vertical component and the gravitational force (the first-order integral value in the period equivalent to one cycle from the beginning to the end of the normal gait). Therefore, in order to bring the difference to zero, the floor reaction force vertical component trajectory must be determined such that the mean value of the floor reaction force vertical components in the period equivalent to one cycle of the normal gait agrees with the self weight of the robot 1, as described above.

In the present embodiment, the mean value of the floor reaction force vertical components in the period of the first turning gait and the period of the second turning gait, respectively, is made to agree with the self weight of the robot 1. To be more specific, for example, the time of each of the breakpoint of the trapezoidal portion of the floor reaction force vertical component trajectory in each turning gait is set according to the gait cycles of the first turning gait and the second turning gait, and then the height of the trapezoidal portion (the peak value of the floor reaction force vertical component) is determined such that the mean value of the floor reaction force vertical components in each of the periods of the first turning gait and the second turning gait agrees with the self weight of the robot 1. In this case, the height of the trapezoidal portion can be determined by solving an equation which indicates a condition that the mean value and the self weight coincide with each other, taking the height as an unknown value.

Thus, the difference between the overall center-of-gravity vertical velocity at the end of the first turning gait and the overall center-of-gravity vertical velocity at the beginning of the first turning gait becomes zero, and the difference between the overall center-of-gravity vertical velocity at the end of the second turning gait and the overall center-of-gravity vertical velocity at the beginning of the second turning gait also becomes zero. This, however, is not a must. For example, if there is a possibility that the body vertical position becomes excessively high or low in the vicinity of the boundary between the first turning gait and the second turning gait, then the height or the like of the trapezoidal shape of the floor reaction force vertical component trajectory of each turning gait may be corrected from the state wherein the mean value and the self weight coincide with each other in each turning gait.

Subsequently, the gait generator 100 proceeds to S108 to determine ZMP trajectory parameters which define a desired ZMP trajectory of a normal gait composed of the combination of the first turning gait and the second turning gait. In this case, the desired ZMP trajectory is determined such that the stability allowance is high and no sudden change occurs, as previously described.

More specifically, in the running gait illustrated in FIG. 4, the heel of the supporting leg foot 22 (the free leg foot 22 in the floating period) lands, and after a while, substantially the entire bottom surface of the supporting leg foot 22 comes in contact with the ground, then after a while, only the tiptoe of the supporting leg foot 22 comes in contact with the ground.

Next, the robot 1 kicks the floor at the tiptoe of the supporting leg foot 22 and jumps into the air, and lastly, lands at the heel of the free leg foot 22. The desired ZMP must exist in a ground contact plane.

In the present embodiment, therefore, the position of the desired ZMP of each of the first turning gait and the second turning gait of a normal gait in the X-axis direction is determined such that the desired ZMP remains at that position until substantially the entire bottom surface of the foot 22 comes in contact with the ground, taking the heel of the supporting leg foot 22 as the initial position, as illustrated in FIG. 6(*a*).

Subsequently, the desired ZMP is determined such that the desired ZMP moves to the center of the supporting leg foot 22 and further moves to the tiptoe by the time when the tiptoe of the foot 22 comes in contact with the ground, and thereafter remains at the tiptoe of the supporting leg foot 22 until leaving the floor. After that, as previously described, the desired ZMP is determined such that the desired ZMP continuously moves from the tiptoe of the supporting leg foot 22 to the landing position of the heel of the free leg foot 22 by the time of the next landing of the free leg foot 22.

Thus, the desired ZMP trajectory (the trajectory of the position in the X-axis direction) of the normal gait formed of the first turning gait and the second turning gait is determined as illustrated in FIG. 13. The time and position of each of the breakpoints of the desired ZMP trajectory are determined as the ZMP trajectory parameters of the normal gait. In this case, the time of the breakpoints is determined according to the gait cycles of the first turning gait and the second turning gait determined on the basis of the aforesaid required parameters. Further, the positions of the breakpoints are determined on the basis of the positions/postures of the next time's gait supporting leg coordinate system and the next but one time's gait supporting leg coordinate system or the required values of the expected free leg foot landing positions/postures of the first step and the second step that define the positions/postures of these coordinate systems.

The position in the Y-axis direction of the desired ZMP trajectory is determined in the same manner as that illustrated in FIG. 6(*b*). To be more specific, the trajectory of the position of the desired ZMP in the Y-axis direction in the first turning gait is determined according to the same pattern illustrated in FIG. 6(*b*). Further, the trajectory of the position of the desired ZMP in the Y-axis direction in the second turning gait is determined to be a trajectory which has the same configuration as the trajectory of the first turning gait and continues to the end of the trajectory.

This completes the detailed description of the processing in S022 of FIG. 8.

Referring back to FIG. 8, after carrying out the processing in S022 as described above, the gait generator 100 proceeds to S024 wherein the gait generator 100 calculates the initial state of the normal gait. The initial state calculated here specifically includes the initial body posture velocity (the initial body position and the initial body velocity) and the initial divergent component of the normal gait. The initial state is exploratorily calculated by the processing illustrated by the flowchart of FIG. 14.

First, in S200, the gait generator 100 determines the initial states of the desired foot position/posture, the desired arm posture, and the desired body posture angle of the normal gait (the state at the starting time of the normal gait (=the ending time of the current time's gait)) on the basis of the normal gait parameters (the gait parameters determined in S022 of FIG. 8). Here, the term "state" means the pair of a position or posture and the temporal change rate thereof (the changing velocity of a position or posture). For example, the initial state of the desired foot position/posture means the pair of the foot position/posture at the starting time of the normal gait and the temporal change rate thereof (i.e., the moving velocity and the changing velocity of the posture of the foot 22). The same applies to the initial state of the desired arm posture and the initial state of the desired body posture angle.

In this case, the initial state of the position/posture of the supporting leg foot and the initial state of the position/posture of the free leg foot are determined on the basis of the foot trajectory parameters determined in S100 of FIG. 10.

To be more specific, among the foot trajectory parameters, the supporting leg foot position/posture at the beginning of the first turning gait and the free leg foot position/posture at the beginning of the first turning gait are determined as the supporting leg foot position/posture and the free leg foot position/posture, respectively, at the starting time of the normal gait.

Further, the temporal change rate of the supporting leg foot position/posture at the starting time of the normal gait is calculated as the temporal change rate of the foot position/posture at the starting time (the starting time of the normal gait) of a foot position/posture trajectory from the supporting leg foot position/posture at the beginning of the first turning gait to the free leg foot position/posture at the end of the second turning gait (the trajectory observed from the next time's gait supporting leg coordinate system), the trajectory being generated by a finite-duration setting filter. In this case, the temporal change rate of the supporting leg foot position/posture at the starting time of the normal gait can be calculated on the basis of the trajectory from the normal gait beginning time to the time immediately thereafter in the foot position/posture trajectory from the supporting leg foot position/posture at the beginning of the first turning gait to the free leg foot position/posture at the end of the second turning gait.

Further, the temporal change rate of the free leg foot position/posture at the starting time of the normal gait is calculated as the temporal change rate of the foot position/posture at the starting time (the starting time of the normal gait) of a foot position/posture trajectory from the supporting leg foot position/posture at the beginning of the current time's gait to the free leg foot position/posture at the end of the first turning gait (the trajectory observed from the next time's gait supporting leg coordinate system), the trajectory being generated by a finite-duration setting filter. In this case, in the foot position/posture trajectory from the supporting leg foot position/posture at the beginning of the current time's gait to the free leg foot position/posture at the end of the first turning gait, generating a trajectory from the starting time of the current time's gait to the starting time (or time immediately thereafter) of the normal gait makes it possible to calculate the temporal change rate of the free leg foot position/posture at the starting time of the normal gait from the trajectory (the trajectory in the vicinity of the starting time of the normal gait).

The initial state of an arm posture is determined by determining the arm posture (including the overall center-of-gravity positions of both arms relative to the body 24) at the starting time of the normal gait and the change amounts of the arm postures in a period immediately following the starting time of the normal gait on the basis of the arm posture trajectory parameters determined in S104 of FIG. 10.

Further, the initial state of the body posture angle is determined by determining the body posture angle at the starting time of the normal gait and the change amount of the body posture angle in a period immediately following the starting time on the basis of the body posture trajectory parameters determined in S102 of FIG. 10. In the present embodiment, the body posture defined by the body posture trajectory parameters is a posture in which the body trunk axis of the body 24 is steadily oriented in the vertical direction. Therefore, the body posture angle and the angular velocity thereof are both zero at the starting time of the normal gait.

Subsequently, the gait generator 100 proceeds to S202 to provisionally determine (Xs, Vxs) (Xs: horizontal position; Vxs: horizontal velocity), which are the candidates of the initial body horizontal position/velocity (the candidates of the horizontal position and the horizontal velocity of the body 24 at the starting time of the normal gait). The candidates (Xs, Vxs) provisionally determined here may be arbitrary and may be provisionally determined as, for example, the candidates (Xs, Vxs) of the body horizontal position/velocity at the initial state of the normal gait determined when the last time's gait was generated.

To simplify the description, an example will be taken in which the initial state (the initial body horizontal position/velocity) of a normal gait in the X-axis direction (the roll-axis direction) on a sagittal plane is explored. However, in effect, the initial state of the normal gait (the initial state that satisfies the aforesaid boundary condition of the normal gait) must be explored separately or simultaneously in the X-axis direction (the roll-axis direction) and the Y-axis direction (the pitch-axis direction) on both the position and the velocity.

As an exploratory determining technique, a method in which a pseudo Jacobian (sensitivity matrix) is determined and a next candidate is determined by a steepest descent method or the like, or a simplex method may be used. In the present embodiment, for example, the steepest descent method is used.

Subsequently, the gait generator 100 proceeds to S206 via S204 to determine initial body vertical position/velocity (Zs, Vzs), which is a pair of the vertical position (the position in the Z-axis direction) Zs and the vertical velocity (the velocity in the Z-axis direction) Vzs of the body 24 at the starting time of the normal gait.

In the present embodiment, the initial body vertical velocity Vzs is determined, for example, as described below.

The following expression applies to the kinetic relationship for the robot 1.

Terminal overall center-of-gravity vertical position−Initial overall center-of-gravity vertical position=Second-order integration of (Floor reaction force vertical component/Overall mass of the robot)+Second-order integration of gravitational acceleration+Initial overall center-of-gravity vertical velocity*Duration of one step    Expression 13

(where the gravitational acceleration takes a negative value)

In the normal gait, a terminal overall center-of-gravity vertical position and an initial overall center-of-gravity vertical position coincide with each other, so that the right side of the above expression 13 must be zero. Thus, the initial overall center-of-gravity vertical velocity can be determined from the relationship. To be more specific, first, the value obtained by dividing the floor reaction force vertical component calculated on the basis of the floor reaction force vertical component trajectory parameters determined in S104 of FIG. 10 described above is divided by the overall mass of the robot 1 and the obtained result is subjected to the second-order integration in the period from the beginning to the end of the normal gait, thereby determining the overall center-of-gravity movement amount (the first term of the right side of expression 13) based on the floor reaction force vertical component.

Further, the gravitational velocity is subjected to the second-order integration in the period from the beginning to the end of the normal gait thereby to determine the overall center-of-gravity movement amount (the second term of the right side of expression 13) based on the gravitational force. Then, the sign of the sum of the overall center-of-gravity movement amount based on the floor reaction force vertical component and the overall center-of-gravity movement amount based on the gravitational force, which have been determined as described above, is reversed, and the sum with the reversed sign is divided by the time of one cycle Tcyc of the normal gait to determine the initial overall center-of-gravity vertical velocity.

Further, according to the present embodiment, a multi-mass-point model (geometric model) having mass points in, for example, the body 24 and other portions (legs 2, 2 and arms) is used to determine the vertical velocity of the body 24 which causes the vertical velocity of the center-of-gravity point of the multi-mass-point model to coincide with the initial overall center-of-gravity vertical velocity on the basis of the initial state, including the foot position/posture and the arm postures, determined in S200 and the initial body horizontal position/velocity (Xs, Vxs) determined in S202 (or S218 to be discussed later). The vertical velocity thus obtained is determined as the initial body vertical velocity Vzs.

As the multi-mass-point model, there is, for example, a 3-mass-point model which includes one body mass point having a mass of the body 24 (or the mass combining the body 24 and the arms) and two leg mass points having the masses of the two respective legs 2, 2. In this case, for example, the position of the body mass point is to be defined on the basis of the position/posture of the body 24, and the position of each leg mass point is to be defined on the basis of the foot position/posture of each leg 2. In the case where the 3-mass-point model is used, the vertical velocity of the body mass point can be calculated on the basis of the initial overall center-of-gravity vertical velocity and the initial state of the foot position/posture determined as described above. Then, based on the vertical velocity of the body mass point and the initial state of the body posture angle determined in S200, the initial body vertical velocity Vzs can be determined.

A multi-mass-point model having more mass points (e.g., a geometric model having a mass point in each link of the robot 1) may be used to determine the initial body vertical velocity Vzs more accurately. If the mass of a portion excluding the body 24 of the robot 1 is sufficiently smaller than the body 24, then the aforesaid initial overall center-of-gravity vertical velocity may be determined directly as the initial body vertical velocity Vzs, regarding that, for example, the vertical velocity of the overall center of gravity of the robot 1 substantially agrees with the vertical velocity of the body 24.

Meanwhile, the initial body vertical position Zs of the normal gait is determined by, for example, the body height determining technique previously proposed in Japanese Patent Application Laid-Open No. 10-86080 by the present applicant. At this time, the initial body vertical position Zs that prevents the knees of the legs 2, 2 from being fully stretched at the starting time is determined on the basis of the foot position/posture at the starting time (the supporting leg foot position/posture at the beginning of the first turning gait and the free leg foot position/posture at the beginning of the first turning gait determined in S100 of FIG. 10 described above) and a predetermined geometric condition regarding the bending angle of the knee of each leg 2.

For example, if the knee bending angle of the leg 2 on the supporting leg side is denoted by θsup and the knee bending angle of the leg 2 on the free leg side is denoted by θswg, then the initial body vertical position is determined such that the sum of the reciprocals of the sine function values of the knee bending angles θsup and θswg is a predetermined value (a finite value). Here, the knee bending angles θsup and θswg denote the angles of the axial centers of the cruses relative to the axial centers of the thighs of the legs 2, and increase from zero as the knees are bent from the state wherein the legs 2 are fully stretched. The technique for determining the vertical position of the body 24 is described in detail in the aforesaid Japanese Patent Application Laid-Open No. 10-86080. so that no further description will be given herein.

Supplementarily, the robot 1 has 6 degrees of freedom per leg, so that once the initial states of the foot position/posture trajectory and the body position/posture trajectory (the positions/postures and the temporal change rates thereof) are given, the initial states of the motions of the body 24 and the legs 2, 2 of the robot 1 will be all uniquely determined. Accordingly, for example, if the overall mass of the body 24 and the legs 2, 2 substantially agrees with the overall mass of the robot 1, then once the initial states of the motions of the body 24 and the legs 2, 2 are given, the initial overall center-of-gravity vertical velocity will be uniquely determined.

Inversely, since each leg has 6 degrees of freedom, even if one state related to the velocity (e.g., the initial body vertical velocity) in the initial states of the foot position/posture trajectory and the body position/posture trajectory is unknown, the unknown initial state will be uniquely determined once the initial overall center-of-gravity vertical velocity is given.

After the processing in S206, the gait generator 100 proceeds to S208 to provisionally generate a gait as a candidate of a normal gait (a gait for one step (one cycle) of a normal gait). More specifically, based on the normal gait parameters determined in S022 of FIG. 8, the instantaneous values of the desired ZMP, the desired floor reaction force vertical component, the desired foot position/posture, the desired body posture and the desired arm posture at each instant from the starting time to the ending time are sequentially determined. Then, the body position is sequentially determined using the dynamic model (inverted pendulum model) illustrated in FIG. 7 such that the determined desired ZMP and the determined desired floor reaction force vertical component are satisfied, thus generating the gait from the starting time to the ending time of the normal gait. In this case, the aforesaid initial body horizontal position/velocity (Xs, Vxs) and the initial body vertical position/velocity (Zs, Vzs) are set as the initial states of the position and the velocity of the body 24.

The gait is generated only in the gait generator 100 and not output from the gait generator 100 as the desired value for driving the actual robot 1.

Figure 15:
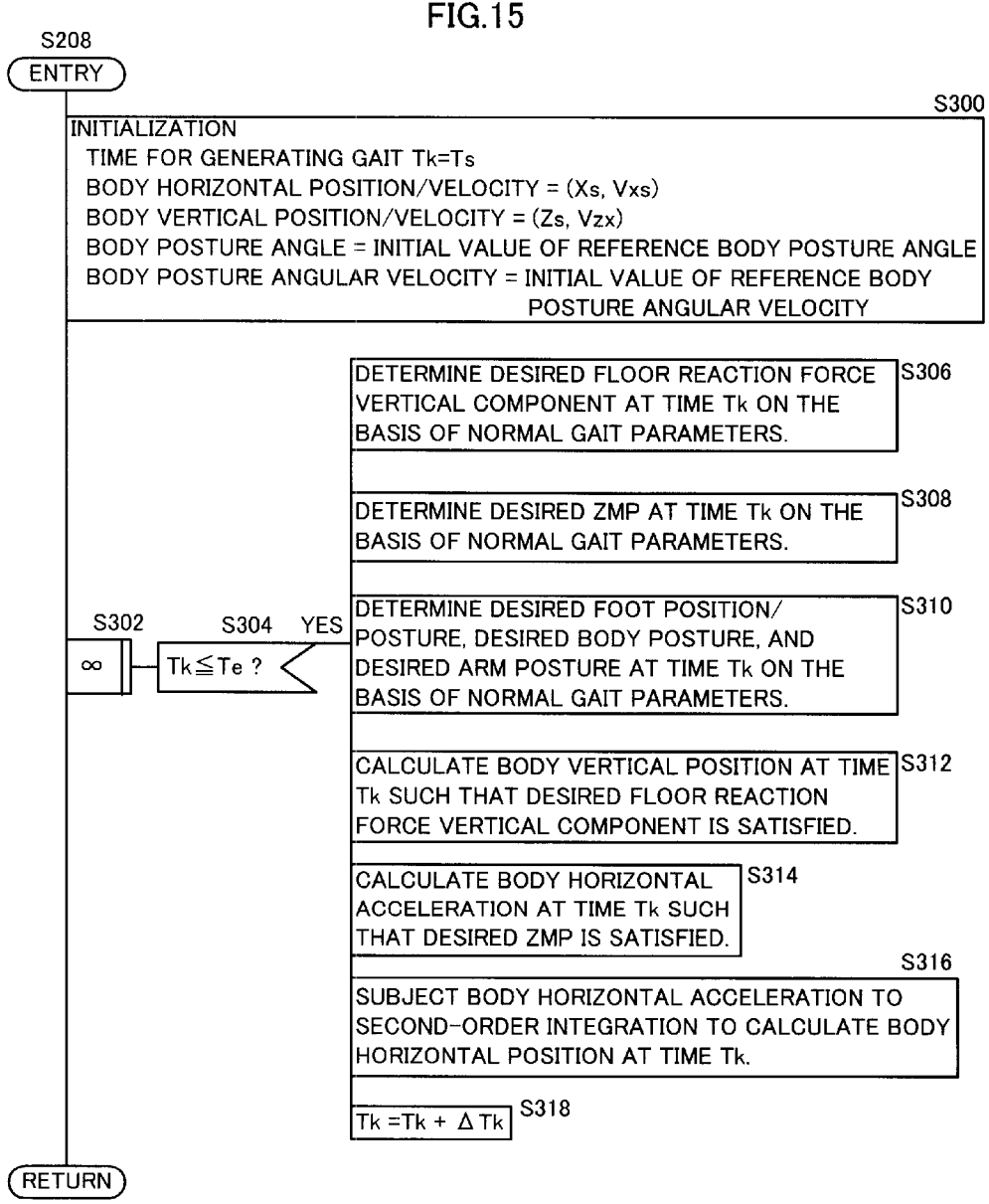
FIG. 15 is a flowchart illustrating the subroutine processing in S208 of FIG. 14.

To be more specifically, the processing in S208 is executed as illustrated by the flowchart of FIG. 15.

The gait generator 100 first carries out various types of initialization in S300. To be more specific, time Tk for generating a gait is initialized to starting time Ts of a normal gait. Further, a latest candidate value (the latest candidate value determined in S202 of FIG. 14 or S216 or S218, which will be discussed later) of the initial body horizontal position/velocity (Xs, Vxs) is substituted into the body horizontal position/velocity, and a latest value (the latest value determined in S206 of FIG. 14) of the initial body vertical position/velocity (Zs, Vzs) is substituted into the body vertical position/velocity. Further, the initial value of a reference body posture angle is substituted into the body posture angle and the initial value of a reference body posture angular velocity is substituted into the body posture angular velocity.

Subsequently, the gait generator 100 proceeds to S304 via S302 to determine whether the time Tk (the current value) for generating a gait is time before ending time Te (=Ts+Tcyc), i.e., whether Tk≦Te. If the determination result is affirmative, then the gait generator 100 carries out the processing of S306 to S316 (the details will be discussed later) so as to determine the instantaneous value of the gait at time Tk.

Subsequently, the gait generator 100 proceeds to S318 to increase the time Tk for generating a gait by a predetermined notch time ΔTk and then carries out the determination in S304 again. Here, the notch time ΔTk may be set to agree with, for example, the control cycle Δt. However, in order to reduce the calculation volume, ΔTk may be set to be longer than Δt.

Figure 14:
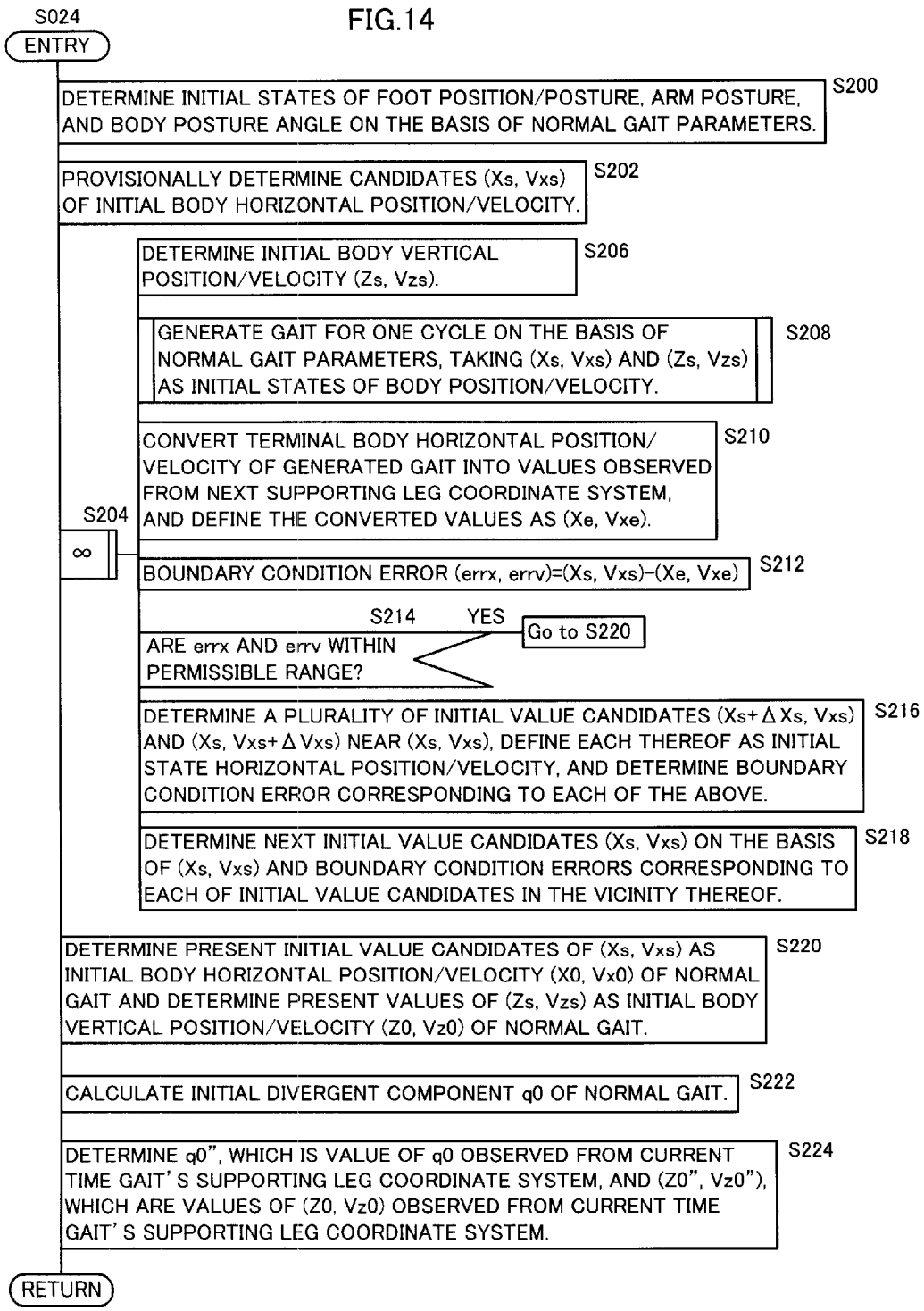
FIG. 14 is a flowchart illustrating the subroutine processing in S024 of FIG. 8.

If the determination result in S304 is affirmative, the processing from S306 to S318 is repeated. If the determination result in S304 is negative, then the processing in FIG. 15, that is, the processing in S208 of FIG. 14, is terminated. Thus, the generation of the normal gait (the provisional normal gait) for one cycle from the starting time to the ending time of the normal gait is completed.

The gait generator 100 carries out the processing for determining the instantaneous value of the provisional normal gait in the aforesaid S306 to S316 as described below. First, in S306, the gait generator 100 determines an instantaneous value of the desired floor reaction force vertical component trajectory shown in FIG. 12 at time Tk on the basis of the normal gait parameters (more specifically, the floor reaction force vertical component trajectory parameters).

Further, in S308, the gait generator 100 determines an instantaneous value of the desired ZMP trajectory shown in FIG. 13 at time Tk on the basis of the normal gait parameters (more specifically, the ZMP trajectory parameters).

Subsequently, the gait generator 100 proceeds to S308 to determine the instantaneous values of the desired foot position/posture (the desired foot positions/postures of both the supporting leg and the free leg), the desired body posture, and the desired arm posture, respectively, at time Tk on the basis of the normal gait parameters (more specifically, the foot trajectory parameter, the body posture trajectory parameter, and the arm posture trajectory parameter). Regarding the desired arm posture, however, more specifically, the overall center-of-gravity positions of both arms are determined, whereas the motions of the arms (arm swinging motions) attributable to changes in the amounts of angular motions about the vertical axis (or the body trunk axis of the body 24) are not yet determined.

Subsequently, the gait generator 100 proceeds to S310 to calculate the body vertical position at time Tk such that the desired floor reaction force vertical component determined in S306 is satisfied (the sum of the inertial force in the vertical direction of the overall center of gravity of the robot 1 and the gravitational force balances with the desired floor reaction force vertical component).

To be more specific, the kinetic relational expressions indicated by expression 15 and expression 16 given below (expressions obtained by discretizing Newton's dynamic equations in the vertical direction) are used to calculate the overall center-of-gravity vertical velocity and the overall center-of-gravity vertical position of the robot 1.

> Overall center-of-gravity vertical velocity at time $Tk$=Overall center-of-gravity vertical velocity at time $(Tk-\Delta Tk)$+(Floor reaction force vertical component/Overall mass of the robot at time $Tk$)+Gravitational acceleration)*$\Delta Tk$ (where the gravitational acceleration takes a negative value)   Expression 15

> Overall center-of-gravity vertical position at time $Tk$=Overall center-of-gravity vertical position at time $(Tk-\Delta Tk)$+Overall center-of-gravity vertical velocity at time $Tk$*$\Delta Tk$   Expression 16

Then, in the present embodiment, the gait generator 100 determines the body vertical position by using, for example, the aforesaid 3-mass-point model (the 3-mass-point model described in relation to the processing in S206) on the basis of the overall center-of-gravity vertical position, the desired foot position/posture, and the reference body posture (the desired body posture) at time Tk calculated as described above. In this case, the positions of two leg mass points in the 3-mass-point model are determined on the basis of the desired foot position/posture. Further, the vertical position of the body mass point at which the vertical position of the overall center of gravity in the 3-mass-point model agrees with the overall center-of-gravity vertical position at time Tk obtained as described above is determined. Then, the body vertical position is determined on the basis of the vertical position of the body mass point and the desired body posture (the reference body posture).

A multi-mass-point model having more mass points (e.g., a model having a mass point in each link of the robot 1) may be used to determine the body vertical position more accurately. If the mass of a portion excluding the body 24 is sufficiently smaller than the body 24, then the overall center-of-gravity vertical position may be considered, in a simplified manner, to agree with the vertical position of the center of gravity of the body 24, and the body vertical position may be determined from the overall center-of-gravity vertical position and the desired body posture (reference body posture).

Subsequently, the gait generator 100 proceeds to S314 to determine the body horizontal acceleration (the acceleration of the body 24 in the horizontal direction) at time Tk such that the desired ZMP is satisfied (such that the dynamic balance condition that the horizontal component of a moment generated about the desired ZMP by the resultant force of the inertial force of the robot 1 and the gravitational force is zero is satisfied).

At this point, the instantaneous values (the values at current time Tk) of the foot position/posture, the arm postures, the body posture, and the body vertical position of the normal gait (provisional normal gait) have been determined, so that determining the remaining body horizontal position will determine the desired motion of the entire robot 1, excluding the motional degrees of freedom of the arms that cause changes in the amount of the angular motions about the vertical axis. Hence, once the body horizontal position is determined, all floor reaction forces except for a moment of the floor reaction force about the vertical axis will be uniquely determined.

In the present embodiment, the desired floor reaction force vertical component and the desired ZMP of the normal gait (provisional normal gait) are defined by the floor reaction force vertical component trajectory parameters and the desired ZMP trajectory parameters, respectively, of the normal gait parameters determined in S022 of FIG. 8. Therefore, the floor reaction force dependently determined according to a determined body horizontal position is only the floor reaction force horizontal component.

Supplementarily, in the robot 1 according to the present embodiment, the degree of freedom of each leg 2 is six, so that determining the desired foot position/posture and the desired body position/posture will uniquely determine the position/posture of each portion of each leg 2. The arm motional degree of freedom causing a change in the amount of the angular motion about the vertical axis is used to cancel a spinning force, which will be described hereinafter.

In S314, the body horizontal acceleration is determined by using, for example, the aforesaid expression 04 related to the dynamic model (the inverted pendulum model) in FIG. 7. To be more specific, the vertical position and the horizontal position of the body mass point 24b at current time Tk are determined from the body vertical position at current time Tk, the body horizontal position at time (Tk−ΔTk), and the desired body posture at current time Tk. Alternatively, the body horizontal position at the time Tk may be estimated in an interpolation manner on the basis of the time series of the body horizontal position up to the time (Tk−ΔTk) or the gait state at the time (Tk−ΔTk), and the estimated body horizontal position may be used in place of the body horizontal position at the time (Tk−ΔTk).

Further, the value obtained by subtracting the gravitational force (=mb*g) acting on the body mass point 24b from the floor reaction force vertical component at current time Tk is divided by the mass mb of the body mass point 24b to determine the vertical acceleration of the body mass point 24b at current time Tk.

Then, the vertical position, the horizontal position, and the vertical acceleration of the body mass point 24b, which have been determined as described above, are substituted into zb, Xb, and d2Zb/dt2, respectively, of the aforesaid expression 04, and the horizontal position and the vertical position of the desired ZMP at current time Tk are substituted into Xzmp and Zzmp, respectively, of expression 04. Further, an expression with Mzmp_y of the expression 04 set to zero is solved on d2Xb/dt2, thereby calculating the body mass point horizontal acceleration d2Xb/dt2 at current time Tk. Then, the body mass point horizontal acceleration d2Xb/dt2 is determined as the body horizontal acceleration at current time k.

Alternatively, a more precise dynamic model may be used to exploratorily determine the body horizontal acceleration that zeros the horizontal component of a floor reaction force moment about the desired ZMP.

Subsequently, the gait generator 100 proceeds to S316 to subject the body horizontal acceleration determined in S314 to the second-order integration so as to calculate the body horizontal position at current time Tk. To be more specific, a value obtained by multiplying the body horizontal acceleration by notch time ΔTk is added to the body horizontal velocity at time Tk−ΔTk so as to determine the body horizontal velocity at current time Tk. Further, a value obtained by multiplying the body horizontal velocity by the notch time ΔTk is added to the body horizontal position at the time Tk−ΔTk so as to determine the body horizontal position at current time Tk.

This completes the detailed description of the processing for generating gaits carried out in S306 to S316.

After completing the processing in S208 of FIG. 14, the gait generator 100 proceeds to S210 to convert the terminal body horizontal position/velocity of the generated gait (provisional normal gait) into values observed from the supporting leg coordinate system corresponding to the supporting leg at that instant (the supporting leg coordinate system having the X'" axis and the Y'" axis in FIG. 11 as the two axes in the horizontal direction) and defines the values as (Xe, Vxe) (Xe: Terminal body horizontal position; Vxe: Terminal body horizontal velocity).

Subsequently, the gait generator 100 proceeds to S212 to calculate the difference between the initial body horizontal position/velocity (Xs, Vxs) and the terminal body horizontal position/velocity (Xe, Vxe), as illustrated. The difference (Xs−Xe, Vxs−Vxe) is referred to as the body horizontal position/velocity boundary condition error (errx, errv). The normal gait is a gait that satisfies the boundary condition, so that (Xs, Vxs) and (Xe, Vxe) must agree with each other. Hence, the body horizontal position/velocity boundary condition error (errx, errv) has to be zero or substantially zero. In the present embodiment, (Xs, Vxs) at which the body horizontal position/velocity boundary condition error (errx, errv) becomes substantially zero is exploratorily determined, as described below.

Subsequently, the gait generator 100 proceeds to S214 to determine whether the body horizontal position/velocity boundary condition error (errx, errv) falls within a permissible range appropriately set beforehand (whether both errx and errv fall within the permissible range).

If the determination result in S214 is negative, then the gait generator 100 proceeds to S216. In this S216, a plurality of (two in the present embodiment) initial value candidates (Xs+ΔXs, Vxs), (Xs, Vxs+ΔVxs) is determined in the vicinity of (Xs, Vxs). Here, ΔXs and ΔVxs mean predetermined minute change amounts relative to Xs and Vxs, respectively. Then, taking these initial value candidates as the initial states of the body horizontal position/velocity, the same processing as that in S208 described above is carried out to generate a normal gait (provisional normal gait) by using gait parameters. Further, the terminal body position/velocity of the generated normal gait are converted into values (Xe+ΔXe1, Vxe+ΔVxe1), (Xe+ΔXe2, Vxe+ΔVxe2), which are observed from the supporting leg coordinate system corresponding to the supporting leg at that instant (the supporting leg coordinate system having the X′″ axis and the Y′″ axis in FIG. 11 as the two axes in the horizontal direction). Here, (Xe+ΔXe1, Vxe+ΔVxe1) means the terminal body position/velocity corresponding to (Xs+ΔXs, Vxs), and (Xe+ΔXe2, Vxe+ΔVxe2) means the terminal body position/velocity corresponding to (Xs, Vxs+ΔVxs). In the processing for generating the normal gait (provisional normal gait) in this case, the initial states of the state amounts except for the body horizontal position/velocity may be set to be the same as the case where, for example, the initial value candidates of the body horizontal position/velocity are (Xs, Vxs). Further in S216, the same processing as that in the aforesaid S210 is carried out to determine the difference between each initial value candidate and its corresponding terminal body position/velocity, that is, the body horizontal position/velocity boundary condition errors corresponding to the initial value candidates (Xs+ΔXs, Vxs) and (Xs, Vxs+ΔVxs), respectively.

Subsequently, the gait generator 100 proceeds to S218 to determine the next initial value candidates of (Xs, Vxs) are determined by an exploratory method on the basis of the body horizontal position/velocity boundary condition errors relative to (Xs, Vxs) and the initial value candidates (Xs+ΔXs, Vxs) and (Xs, Vxs+ΔVxs) in the vicinity thereof. As the exploratory technique, a method in which a pseudo Jacobian (sensitivity matrix) is determined and a next candidate is determined by a steepest descent method or the like, or a simplex method may be used. For example, a sensitivity matrix is determined. The sensitivity matrix indicates the degree of change in the body horizontal position/velocity boundary condition error observed when the body horizontal position and the body horizontal velocity are changed from their initial value candidates (Xs, Vxs) by minute amounts on the basis of the body horizontal position/velocity boundary condition errors relative to (Xs, Vxs) and the initial value candidates (Xs+ΔXs, Vxs) and (Xs, Vxs+ΔVxs) in the vicinity thereof. Then, based on the sensitivity matrix, initial value candidates (Xs, Vxs) that reduce the body horizontal position/velocity boundary condition errors are newly determined. After determining the new initial value candidates (Xs, Vxs) of the body horizontal position/velocity as described above, the gait generator 100 returns to S206.

As long as the determination result given in S214 is negative, the gait generator 100 repeats the processing of S206 through S218. If the determination result in S214 turns to be affirmative, then the gait generator 100 leaves the repetition loop (S204) and proceeds to S220. In this case, the provisional normal gait generated immediately before the gait generator 100 leaves the repetition loop of S204 will be obtained as the normal gait that satisfies the boundary condition.

In S220, the initial value candidates of the initial body horizontal position/velocity (Xs, Vxs) arid the initial body vertical position/velocity (Zs, Vzs) in the provisional normal gait lastly generated in S208 of the repetition loop of S204 are determined as the initial body horizontal position/velocity (X0, Vx0) and the initial body vertical position/velocity (Z0, Vz0), respectively, of the normal gait to be determined.

Subsequently, the gait generator 100 proceeds to S222 to calculate the normal gait initial divergent component (the value of the divergent component at the starting time Ts of a normal gait) q0.

Here, in the present embodiment, the value of the divergent component of a gait is defined as described below. In S222, the normal gait initial divergent component q0 is calculated according to the definition.

First, when the aforesaid expression 03 indicating the relationship between the motion of the body mass point 24*b* in the inverted pendulum model in FIG. 7 and a floor reaction force moment (the floor reaction force moment about the origin of the supporting leg coordinate system) is represented by a state equation, the following expression 100 is derived. Here, it is assumed that the relative change amount (the divergence in height of the body 24) of the height (the vertical position) of the body 24 with respect to a mean height when the robot 1 travels is sufficiently small, so that Zb of the second term of the right side of expression 03 agrees with a fixed value h, which is set beforehand as the mean height of the body mass point 24*b*. Here, a floor reaction force moment Mb_y of the aforesaid expression 03 is denoted by Min as an input moment to the inverted pendulum.

$$\frac{d}{dt}XVb = \begin{bmatrix} 0 & 1 \\ \frac{(g+d2Zb/dt2)}{h} & 0 \end{bmatrix} * XVb + \begin{bmatrix} 0 \\ \frac{1}{h*mb} \end{bmatrix} * \text{Min} \quad \text{Expression 100}$$

where $XVb \equiv \begin{bmatrix} Xb \\ Vxb \end{bmatrix}$, $Vxb \equiv dXb/dt$

Rewriting the expression 100 to an expression based on a discrete-time system provides the state equation of expression 102 given below.

$$XVb(k+1) = A(k)*XVb(k) + B(k)*\text{Min}(k) \quad \text{Expression 102}$$

The variables followed by suffixes (k) and (k+1) mean the value at the k-th time and the value at the k+1-th time, respectively, in the discrete-time system. In the following description, the k-th time and the k+1-th time may be denoted simply by time k and time k+1, respectively, in some cases.

As defined in the note related to expression 100, XVb in expression 102 denotes a state variable vector (longitudinal vector) taking the horizontal position Xb of the body mass point 24*b* and the horizontal velocity Vxb, which is the temporal change rate thereof, as the state variables.

Further, A(k) and B(k) in expression 102 denote a secondary square matrix (state transition matrix) and a secondary longitudinal vector, respectively, and the component values thereof are determined as indicated by the following expressions 104a to 104c and 106a to 106c. A symbol $\Delta T$ denotes a notch time of the discrete-time system, and $\omega 0$ denotes the angular frequency value defined by expression 108 of the following note. Further, exp( ) denotes an exponential function of the base of a natural logarithm.

In the case where $g + d2Zb/dt2 > 0$ $$A(k) = \begin{bmatrix} \dfrac{\exp(\omega 0*\Delta T) + \exp(-\omega 0*\Delta T)}{2} & \dfrac{\exp(\omega 0*\Delta T) - \exp(-\omega 0*\Delta T)}{2*\omega 0} \\ \dfrac{\exp(\omega 0*\Delta T) - \exp(-\omega 0*\Delta T)}{2}*\omega 0 & \dfrac{\exp(\omega 0*\Delta T) + \exp(-\omega 0*\Delta T)}{2} \end{bmatrix}$$

Expression 104a $$B(k) = \begin{bmatrix} -1 + \dfrac{\exp(\omega 0*\Delta T) + \exp(-\omega 0*\Delta T)}{2} \\ \dfrac{\exp(\omega 0*\Delta T) - \exp(-\omega 0*\Delta T)}{2}*\omega 0 \end{bmatrix} * \dfrac{1}{\omega 0^2} * \dfrac{1}{h*mb}$$

Expression 106a

In the case where $g + d2Zb/dt2 = 0$ $$A(k) = \begin{bmatrix} 1 & \Delta T \\ 0 & 1 \end{bmatrix}$$

Expression 104b $$B(k) = \begin{bmatrix} \dfrac{(\Delta T)^2}{2} \\ \Delta T \end{bmatrix} * \dfrac{1}{h*mb}$$

Expression 106b

In the case where $g + d2Zb/dt2 < 0$ $$A(k) = \begin{bmatrix} \cos(\omega 0*\Delta T) & \dfrac{\sin(\omega 0*\Delta T)}{\omega 0} \\ -\omega 0*\sin(\omega 0*\Delta T) & \cos(\omega 0*\Delta T) \end{bmatrix}$$

Expression 104c $$B(k) = \begin{bmatrix} -1 + \cos(\omega 0*\Delta T) \\ -\omega 0*\sin(\omega 0*\Delta T) \end{bmatrix} * \dfrac{1}{\omega 0^2} * \dfrac{1}{h*mb}$$

Expression 106c where $\omega 0 \equiv \sqrt{\left|\dfrac{g + d2Zb/dt2}{h}\right|}$ Expression 108

In this case, as is obvious from expressions 104a to 104c, 106a to 106c and expression 108, the component values of $A(k)$ and $B(k)$ are dependent upon the value of the vertical acceleration d2Zb/dt2 (the motional acceleration in the vertical direction d2Zb/dt2) of the body mass point 24b. Hence, the component values of $A(k)$ and $B(k)$ will be the values dependent upon the inertial force in the vertical direction of the body mass point 24b (=−mb*d2Zb/dt2), i.e., the function value of the inertial force. The gravitational force acting on the body mass point 24a has a fixed value. In other words, therefore, the component values of $A(k)$ and $B(k)$ are the function values of the resultant force of the inertial force of the body mass point 24b in the vertical direction and the gravitational force acting on the body mass point 24b or a floor reaction force vertical component balancing the resultant force.

Supplementarily, if a mass mb of the body mass point 24b of the inverted pendulum agrees with the overall mass of the robot 1 as in the present embodiment, then the floor reaction force vertical component that balances the resultant force of the inertial force in the vertical direction of the body mass point 24b and the gravitational force acting on the body mass point 24b agrees with the floor reaction force vertical component (the translational floor reaction force vertical component of a total floor reaction force) acting on the robot 1.

Further, in the running gait illustrated in FIG. 4, $g+d2Zb/dt2>0$ holds in a one-leg supporting period, whereas $g+d2Zb/dt2=0$ holds in a floating period.

In a system represented by the state equation of expression 102 described above, if an initial value XVb(0) of the state variable vector XVb (the value of XVb at time at which k=0 (time 0)) and the time series of the input moment Min (the horizontal component Mb_y of the floor reaction force moment) from time 0 to time k−1 are given, then the value XVb(k) of the state variable vector XVb at arbitrary time k (>0) will be given by the following expression 110.

$$XVb(k) = \phi(k, 0) * XVb(0) + \sum_{i=0}^{k-1} \phi(k, i+1) * B(i) * \text{Min}(i)$$

Expression 110 where $\phi(k, j) \equiv$ $A(k-1) * A(k-2) * \ldots * A(j)$  $(j = 0, 1, \ldots, k)$ Regarding $\phi(k,j)$ defined by the note in expression 110, if j=k, then $\phi(k,j)$=Identity matrix.

Attention will now be paid to the behavior of the inverted pendulum model in the normal gait described above. It is assumed that the initial time Ts of the normal gait is time k=0, the ending time Te of the normal gait (=Ts+Tcyc) is time k=kcyc (provided kcyc≡Tcyc/$\Delta T$), and the state variable vector XVb defined by the motion of the normal gait at the starting time Ts is XVb(0). Further, in the state variable vector XVb at the ending time Te of the normal gait (time k=kcyc), the component dependent on the state variable vector value XVb(0) at the starting time Ts of the normal gait is denoted by XVb(kcyc). At this time, the relationship between XVb(kcyc) and XVb(0) will be represented by the following expression 112 on the basis of the above expression 110.

$XVb(kcyc) = \phi(kcyc, 0) * XVb(0)$

Expression 112 where $\phi(kcyc,0) = A(kcyc-1) * \ldots * A(1) * A(0)$

Further, the two characteristic values of a matrix $\phi(kcyc,\mathbf{0})$ of the right side of expression 112 are denoted by $\lambda 1$ and $\lambda 2$, characteristic vectors (longitudinal vectors) corresponding to the respective characteristic values are denoted by $(a11, a21)^T$ and $(a12, a22)^T$, and a second-order square matrix having these characteristic vectors as a first row and a second row is denoted by $\Gamma cyc$. A matrix obtained by diagonalizing $\phi(kcyc, \mathbf{0})$ by using the matrix $\Gamma cyc$ is denoted by $\Lambda$. In other words, $\Lambda$ is defined by expression 114 given below. Hereinafter, the matrix $\Gamma cyc$ will be referred to as the diagonalizing matrix.

$$\Lambda \equiv \Gamma_{cyc}^{-1} * \phi(k_{cyc}, 0) * \Gamma_{cyc}$$

Expression 114 where $\Lambda \equiv \begin{bmatrix} \lambda 1 & 0 \\ 0 & \lambda 2 \end{bmatrix}$ $\Gamma_{cyc} \equiv \begin{bmatrix} a11 & a12 \\ a21 & a22 \end{bmatrix}$ $\phi(k_{cyc}, 0) * \begin{bmatrix} a11 \\ a21 \end{bmatrix} = \lambda 1 * \begin{bmatrix} a11 \\ a21 \end{bmatrix}$ -continued $$\phi(k_{cyc}, 0) * \begin{bmatrix} a12 \\ a22 \end{bmatrix} = \lambda 2 * \begin{bmatrix} a12 \\ a22 \end{bmatrix}$$

The following expression 116 is derived from the expression 114 and the above expression 112.

$$\Gamma cyc^{-1} * XVb(kcyc) = A * \Gamma cyc^{-1} * XVb(0) \quad \text{Expression 116}$$

The matrix $\phi(kcyc,0)$ to be diagonalized by the diagonalizing matrix $\Gamma cyc$ denotes the product of the state transition matrixes $A(0), A(1), \ldots, A(kcyc-1)$ at each time (more specifically, at each time of notch time $\Delta T$ from time 0 to time kcyc−1) in a period from the starting time (time 0) to the ending time (time kcyc) of one cycle of a normal gait, as indicated by the note to the above expression 112. Hence, the matrix $\phi(kcyc,0)$ depends on the time series of the inertial force of the body mass point 24b in the period of one cycle of the normal gait. Hence, each component value of the diagonalizing matrix $\Gamma cyc$ accordingly also depends on the time series of the inertial force of the body mass point 24b in the period of one cycle of the normal gait.

Here, a vector obtained by linearly converting a state variable vector $XVb(k)$ at arbitrary time k by an inverse matrix $\Gamma cyc^{-1}$ of the diagonalizing matrix $\Gamma cyc$ (hereinafter referred to as the converted state variable vector) is denoted by $(p(k), q(k))^T$. The converted state variable vector $(p(k), q(k))^T$ is defined by expression 118 given below.

$$(p(k), q(k))^T = \Gamma cyc^{-1} * XVb(k) \quad \text{Expression 118}$$

The following expression 120 is derived from the expression 118 and the above expression 116.

$$(p(kcyc), q(kcyc))^T = A * (p(0), q(0))^T \quad \text{Expression 120}$$

In this expression 120, if $\lambda 1 > 1$, then the absolute value of $p(kcyc) >$ the absolute value of the initial value $p(0)$, and if $\lambda 1 \leq 1$, then the absolute value of $p(kcyc) \leq$ the absolute value of the initial value $p(0)$. Similarly, if $\lambda 2 > 1$, then the absolute value of $q(kcyc) >$ the absolute value of the initial value $q(0)$, and if $\lambda 2 \leq 1$, then the absolute value of $q(kcyc) \leq$ the absolute value of the initial value $q(0)$.

Meanwhile, the normal gait in the present embodiment is a gait repeating the one-leg supporting period and the floating period alternately (the running gait in FIG. 4), so that it may be considered that a state in which $g+d2Zb/dt2 \leq 0$ and a state in which $g+d2Zb/dt2 > 0$ are alternately set rather than the state in which $g+d2Zb/dt2 \leq 0$ being always maintained. In such a normal gait, generally, one of the two characteristic values $\lambda 1$ and $\lambda 2$ of $\phi kcyc,0)$ takes a value that is larger than 1, while the other takes a value that is smaller than 1.

Therefore, hereinafter, $\lambda 1 < 1$ and $\lambda 2 > 1$ applies. More specifically, the first component $p(k)$ of the converted state variable vector $(p(k), q(k))^T$ denotes the component corresponding to the characteristic value $\lambda 1$, which is smaller than 1, and the second component $q(k)$ thereof denotes the component corresponding to the characteristic value $\lambda 2$, which is larger than 1. At this time, $p(k)$ has a meaning as the state amount of a motional component having convergent property in a normal gait infinitely repeated, while $q(k)$ has a meaning as the state amount of a motional component having divergent property in the normal gait infinitely repeated.

Hence, in the present embodiment, the second component $q(k)$ of the converted state variable vector $(p(k), q(k))^T$ defined by expression 118 is defined as the aforesaid divergent component. The divergent component $q(k)$ thus defined takes a linearly coupled value of the state variables $Xb(k)$ and $Vxb(k)$. In this case, in the linear coupling, the weighting coefficients by which $Xb(k)$ and $Vxb(k)$ are multiplied are dependent on the time series of the inertial force of the body mass point 24b in the period of one cycle of the normal gait. The first component $p(k)$ of the converted state variable vector $(p(k), q(k))^T$ defined by expression 118 is referred to as the convergent component.

More specifically, the convergent component $p(k)$ and the divergent component $q(k)$ defined by the above expression 118 are the convergent component $p(k)$ and the divergent component $q(k)$, respectively, on a sagittal plane (the convergent component and the divergent component corresponding to the state variable vector $XVb$ having, as its components, the horizontal position $Xb$ and the horizontal velocity $Vxb$ of the body mass point 24b in the X-axis direction). In the same manner, the convergent component and the divergent component on a lateral plane are defined. To be more specific, the convergent component and the divergent component on the lateral plane are defined by an expression in which the components $Xb$ and $Vxb$ of the state variable vector $XVb(k)$ of the right side of expression 118 have been replaced by the horizontal position and the horizontal velocity, respectively, of the body mass point 24b in the Y-axis direction. In this case, the matrix $\Gamma cyc^{-1}$ of expression 118 remains the same in both axial directions, namely, the X-axis direction and the Y-axis direction.

According to the definition of the divergent component q described above, the normal gait initial divergent component q0 is calculated in S222 as described below.

The gait generator 100 calculates the instantaneous value of the inertial force of the body mass point 24b at each time Tk for every notch time $\Delta T$ in the period of one cycle from the starting time Ts to the ending time Ts (each time k from time k=0 to time k=kcyc−1 in terms of the discrete-time system) of the normal gait on the basis of normal wait parameters. In this case, if the mass mb of the body mass point 24b of the inverted pendulum agrees with the overall mass of the robot 1, then the resultant force of the inertial force in the vertical direction of the body mass point 24b and the gravitational force acting on the body mass point 24b in the normal gait balances with a floor reaction force vertical component in the normal gait. In the present embodiment, therefore, the gait generator 100 calculates the instantaneous value of the floor reaction force vertical component at each time in the period of one cycle of the normal gait on the basis of the aforesaid floor reaction force vertical component trajectory parameter of the normal gait parameters. The instantaneous value is the same as the value calculated in S306 of FIG. 15. Then, the gait generator 100 uses the value obtained by dividing each instantaneous value of the calculated floor reaction force vertical component by the mass mb of the body mass point 24b (=the overall mass of the robot 1) as the value of (g+d2Zb/dt2) of the above expression 100 to calculate the state transition matrix A(k) (k=0, 1, ..., kcyc−1) according the above expressions 104a to 104c.

In the running gait illustrated in FIG. 4, the floor reaction force vertical component will not take any negative value. In actuality, therefore, A(k) will be calculated according to either expression 104a or 104b.

Supplementarily, as an alternative, a multi-mass-point model (geometric model), such as the aforesaid 3-mass-point model, may be used to calculate the inertial force in the vertical direction (or the vertical acceleration) of the body 24 of the robot 1 in the normal gait, then the calculated inertial force (or the vertical acceleration) may be used as the inertial force (or the vertical acceleration) of the body mass point 24b to calculate the state transition matrix A(k) at each time (k=0, 1, ..., kcyc−1). For example, the instantaneous value of the inertial force of the body mass point 24b in the normal gait may be calculated as described below by using the aforesaid 3-mass-point model. The instantaneous value of the inertial force in the vertical direction of two leg mass points in the aforesaid 3-mass-point model is calculated on the basis of a foot trajectory parameter of a normal gait, and the instantaneous value of the inertial force in the vertical direction of the overall center of gravity of the robot 1 is calculated on the basis of a floor reaction force vertical component trajectory. Further, the value obtained by subtracting the instantaneous value of the inertial force in the vertical direction of the two leg mass points from the instantaneous value of the inertial force in the vertical direction of the overall center of gravity is calculated as the instantaneous value of the inertial force in the vertical direction of the body mass point 24b. In this case, the resultant force of the inertial force in the vertical direction of the body mass point 24b and the gravitational force acting on the body mass point 24b (or g+d2Zb/dt2) may take a negative value.

After calculating kcyc pieces of A(k) (k=0, 1, . . . , kcyc−1) in the period of one cycle from the starting time Ts to the ending time Ts of the normal gait as described above, the gait generator 100 multiplies the values of A(k) to calculate the matrix φ(kcyc,0)(=A(kcyc−1)* . . . *A(1)*A(0)) of the right side of expression 112.

Further, the gait generator 100 calculates the characteristic values λ1 and λ2 of the matrix φ(kcyc,0) and the characteristic vectors (a11, a21)$^T$ and (a12, a22)$^T$ corresponding thereto, and determines, from the characteristic vectors, the aforesaid diagonalizing matrix Γcyc according to the note to the above expression 114. Then, the gait generator 100 calculates the inverse matrix Γcyc$^{-1}$ of the diagonalizing matrix Γcyc.

Further, the gait generator 100 determines the initial body mass point position/velocity, which is the pair of the horizontal position and horizontal velocity of the body mass point 24b of the inverted pendulum at the starting time Ts of the normal gait, from the initial body horizontal position/velocity (X0, Vx0) of the normal gait determined in S220 and the initial state of the body posture angle of the normal gait.

Then, the gait generator 100 calculates the normal gait initial divergent component q0 according to the above expression 118 from the inverse matrix Γcyc$^{-1}$ determined as described above and the initial body mass point horizontal position/velocity. To be more specific, a component in the X-axis direction (a state amount vector in the X-axis direction) and a component in the Y-axis direction (a state amount vector in the Y-axis direction) of the initial body mass point horizontal position/velocity are respectively multiplied by Γ$^{-1}$ to calculate the initial divergent component q0 in each of the X-axis direction and the Y-axis direction.

After calculating the initial divergent component q0 of the normal gait as described above, the gait generator 100 proceeds to S224 to convert the initial divergent component q0 of the normal gait into a value observed from a current time gait's supporting leg coordinate system, determining the converted value as q0". Further, the gait generator 100 converts the initial body vertical position/velocity (Z0, Vz0) into values observed from the current time gait's supporting leg coordinate system, determining the converted values as (Z0", Vz0").

Supplementarily, the (Z0", Vz0") agree with the body vertical position/velocity at the end of a second turning gait observed from the supporting leg coordinate system (the supporting leg coordinate system having the X"-axis and the Y"-axis as two axes on the horizontal plane in FIG. 11) of the second turning gait. Further, q0" also agrees with the divergent component at the end of the second turning gait observed from the supporting leg coordinate system of the second turning gait. Hence, these properties may be used to calculate (Z0", Vz0") and q0".

This completes the processing in S024 of FIG. 8, namely, the subroutine processing for determining the initial state of the normal gait.

Figure 16:
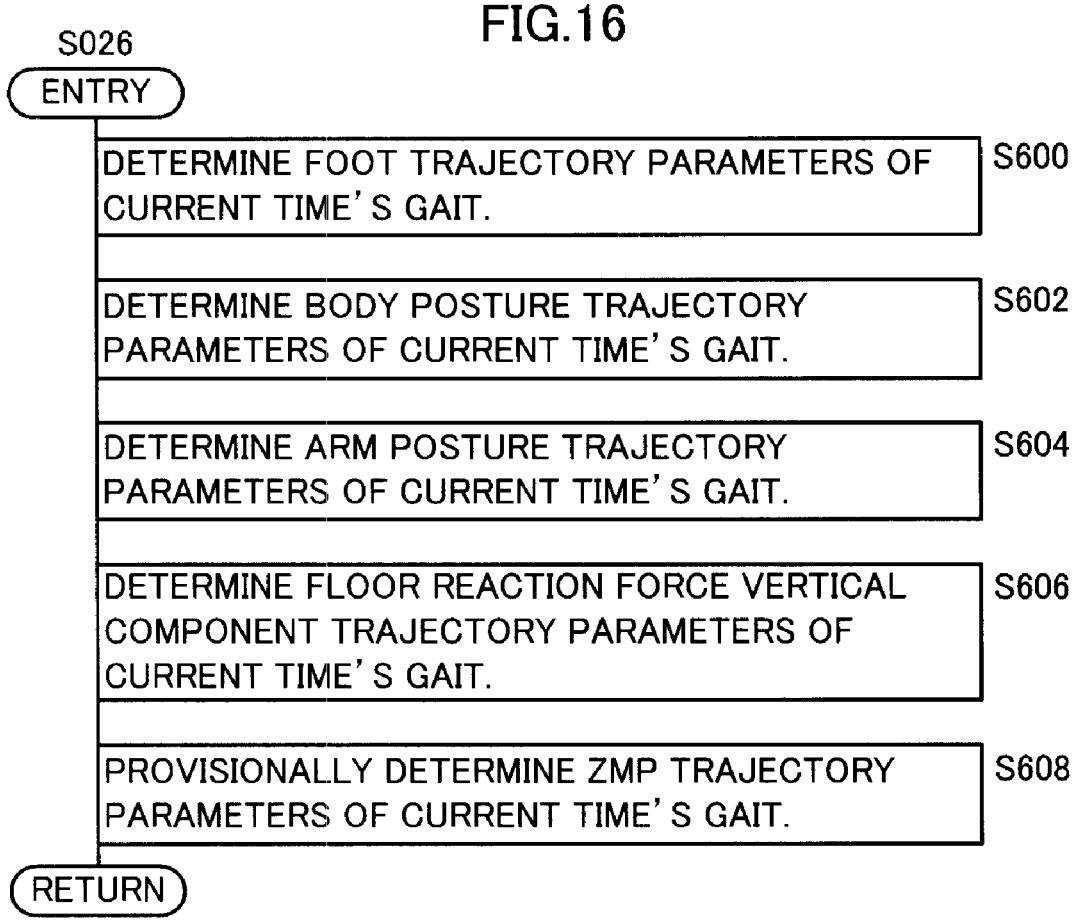
FIG. 16 is a flowchart illustrating the subroutine processing in S026 of FIG. 8.

Subsequently, the gait generator 100 proceeds to S026 of FIG. 8 to determine the gait parameters (some being provisionally determined) of the current time's gait. More specifically, in S026, the processing illustrated by the flowchart of FIG. 16 is carried out.

First, in S600, the gait generator 100 determines the foot trajectory parameter of the current time's gait such that the foot position/posture trajectory of a current time's gait connects to the foot position/posture trajectory of a normal gait.

To be more specific, the initial free leg foot position/posture of the current time's gait (the free leg foot position/posture at the start of the current time's gait) is set to the supporting leg foot position/posture at the end of the last time's gait observed from the current time gait's supporting leg coordinate system (the present free leg foot position/posture).

The initial supporting leg foot position/posture of the current time's gait (the supporting leg foot position/posture at the start of the current time's gait) is set to the free leg foot position/posture at the end of the last time's gait observed from the current time gait's supporting leg coordinate system (the present supporting leg foot position/posture).

Further, the free leg foot position/posture at the end of the current time's gait are determined according to a next time's gait supporting leg coordinate system observed from the current time gait's supporting leg coordinate system (the required values of the expected landing position/posture of the free leg foot 22 of a first step related to the current time's gait). More specifically, the free leg foot position/posture at the end of the current time's gait are determined such that the representative point of the free leg foot 22 agrees with the origin of the next time's gait supporting leg coordinate system observed from the current time gait's supporting leg coordinate system when the foot 22 has been rotated from the free leg foot position/posture at the end of the current time's gait by a predetermined angle in the pitch direction without a slippage until substantially the entire bottom surface of the foot 22 comes in contact with the ground while holding the foot 22 in contact with a floor.

At the end of the current time's gait, the supporting leg foot 22 is off the floor and in the air. To determine the trajectory after the supporting leg foot 22 leaves the floor, first, the position/posture of the supporting leg foot 22 of the current time's gait at the end of the next time's gait, that is, the free leg foot position/posture at the end of the next time's gait are determined. The free leg foot position/posture at the end of the next time's gait are determined according to the next but one time's gait supporting leg coordinate system observed from the current time gait's supporting leg coordinate system (the required values of the expected landing position/posture of the free leg foot 22 of the second step related to the current time's gait).

To be more specific, the free leg foot position/posture at the end of the next time gait's are determined such that the representative point of the foot 22 agrees with the origin of the next but one time's gait supporting leg coordinate system observed from the current time gait's supporting leg coordinate system when the foot 22 has been rotated from the foot position/posture by a predetermined angle in the pitch direction without a slippage until substantially the entire bottom surface of the foot 22 comes in contact with the ground while holding the foot 22 in contact with a floor.

Then, the supporting leg foot position/posture at the end of the current time's gait are determined by generating the foot position/posture trajectory from the supporting leg foot position/posture at the start of the current time's gait determined as described above to the free leg foot position/posture at the end of the next time's gait by the aforesaid finite-duration setting filter up to the end of the current time's gait.

Subsequently, the gait generator 100 proceeds to S602 to determine the body posture trajectory parameters of the current time's gait. The body posture trajectory parameters are determined such that the body posture trajectory defined thereby continuously connects to the body posture trajectory of a normal gait (such that the body posture angle and the angular velocity at the end of the current time's gait agree with the body posture angle and the angular velocity, respectively, at the start of the normal gait). In this case, according to the present embodiment, the body posture defined by the body posture trajectory parameters of the current time's gait is set to the aforesaid reference body posture, which is steadily a fixed posture (the posture in which the body trunk axis of the body 24 is oriented in the vertical direction), as with the body posture of the normal gait.

If the body posture trajectory of the current time's gait is set to continuously connect to the body posture trajectory of the normal gait, then the body posture trajectory may be set to temporally change from the start to the end of the current time's gait.

Subsequently, the gait generator 100 proceeds to S604 to determine the arm posture trajectory parameters of the current time's gait. The arm posture trajectory parameters are determined in the same manner as that for the arm posture trajectory parameters of a normal gait such that the arm posture trajectory of the current time's gait uninterruptedly continues to the arm posture trajectory of the normal gait.

As with the arm posture trajectory parameters of the normal gait, the arm posture trajectory parameters of the current time's gait determined here are parameters (e.g., the parameters defining the relative height of the hand distal end of an arm in relation to the body 24 and the relative center-of-gravity position of the entire arm) other than those related to the angular momentum changes of both arms about the vertical axis (or the body trunk axis of the body 24).

Subsequently, the gait generator 100 proceeds to S606 to determine the floor reaction force vertical component trajectory parameters of the current time's gait such that the floor reaction force vertical component trajectory defined thereby becomes a virtually continuous trajectory, as illustrated in FIG. 5. However, the floor reaction force vertical component trajectory parameters of the current time's gait are determined such that both the overall center-of-gravity vertical position/velocity of the robot 1 and the floor reaction force vertical component trajectory of the current time's gait continuously connect to the aforesaid normal gait.

To be more specific, first, the initial overall center-of-gravity vertical position/velocity of the normal gait observed from the current time gait's supporting leg coordinate system are determined mainly on the basis of the values (Z0", Vz0") obtained by converting the initial body vertical position/velocity of the normal gait lastly determined by the processing in S024 of FIG. 8 (the processing for determining the initial state of the normal gait) into the values observed from the current time gait's supporting leg coordinate system, i.e., (Z0", Vz0") determined in S224 of FIG. 14.

For example, the initial overall center-of-gravity vertical position/velocity of the normal gait are determined using the aforesaid 3-mass-point model (the 3-mass-point model described in relation to the processing in S206). In this case, the positions and velocities of two leg mass points in the 3-mass-point model are determined on the basis of the desired foot position/posture and the temporal change rate (changing velocity) thereof at the start of the normal gait observed from the current time gait's supporting leg coordinate system. Further, the position/velocity of the body mass point in the 3-mass-point model are determined from the aforesaid (Z0", Vz0") and the body posture angle (=reference body posture angle) at the start of the normal gait and the temporal change rate thereof. Then, based on the positions and the velocities of these three mass points, the center-of-gravity positions and velocities of the three mass points are calculated as the initial overall center-of-gravity vertical position/velocity of the normal gait.

A multi-mass-point model having more mass points (e.g., a geometric model having a mass point in each link of the robot 1) may be used to determine the initial overall center-of-gravity vertical position/velocity of the normal gait more accurately. If the mass of a portion excluding the body 24 is sufficiently smaller than the body 24, then the initial overall center-of-gravity vertical position/velocity of the normal gait may be determined from the aforesaid (Z0", Vz0") and the body posture angle at the start of the normal gait (=reference body posture angle) and the temporal change rate thereof.

The initial overall center-of-gravity vertical position/velocity of the normal gait determined as described above are substituted into the terminal overall center-of-gravity vertical position/velocity of the above expression 13 and the following expression 41, and the overall center-of-gravity vertical position and velocity of the instantaneous values of the last time's gait (more specifically, the values indicating the terminal state of the last time's gait observed from the current time gait's supporting leg coordinate system) are substituted into the initial overall center-of-gravity vertical position and velocity of the above expression 13 and the following expression 41, thereby determining the floor reaction force vertical component trajectory parameters of the current time's gait such that the relationship between expression 13 and expression 41 is satisfied. The integral values in expression 13 and expression 41 are to be the integral values obtained during the period from the start to the end of the current time's gait.

Terminal overall center-of-gravity vertical velocity−
Initial overall center-of-gravity vertical velocity=First-order integration of (Floor reaction force vertical component/Mass of the robot)−First-order integration of gravitational acceleration            Expression 41

(where the gravitational acceleration takes a negative value)

More specifically, first, at least two parameters of the floor reaction force vertical component trajectory parameters (e.g., the time of breakpoints) defining the floor reaction force vertical component trajectory illustrated in FIG. 5 are defined as independent unknown variables, and the values of the unknown variables are determined by solving the simultaneous equation formed of expression 13 and expression 41.

As the floor reaction force vertical component trajectory parameters defined as the unknown variables, for example, the height of the trapezoid (the peak value of the floor reaction force vertical component) and the width (the duration of the one-leg supporting period) in the floor reaction force vertical component trajectory illustrated in FIG. 5 may be selected. In this case, the slopes on both sides of the trapezoid in FIG. 5 will take values determined on the basis of a current time's gait cycle or the like, or values of time of breakpoints of the floor reaction force vertical component trajectory except for the time at which a one-leg supporting period is switched to a floating period, the values being determined on the basis of a current time's gait cycle and the like. Supplementarily, if only one unknown variable is selected, then there will be generally no solution that satisfies the simultaneous equation of expression 13 and expression 41.

Supplementarily, in the present embodiment, the floor reaction force vertical component trajectory parameters of the current time's gait determined as described above correspond to the up-and-down-direction inertial force parameters in the present invention. Hence, the processing in S606 implements the means for determining the up-and-down-direction inertial force parameters in the present invention.

Subsequently, the gait generator 100 proceeds to S608 to determine the ZMP trajectory parameters (e.g., the time and positions of breakpoints of a ZMP trajectory) defining the ZMP trajectory such that the ZMP trajectory of the current time's gait will have a high stability allowance and develop no sudden change. For example, the ZMP trajectory parameters are provisionally determined such that the ZMP trajectory has the pattern as illustrated in FIG. 6. The ZMP trajectory parameters of the current time's gait are provisionally determined such that the ZMP trajectory of the current time's gait will uninterruptedly connect to the ZMP trajectory of the aforesaid normal gait (such that the position of the ZMP at the end of the current time's gait agrees with the position of the ZMP at the start of the normal gait).

In this case, in a running gait, the time and positions of breakpoints of the ZMP trajectory in a one-leg supporting period may be set in the same manner as that for setting the ZMP trajectory parameters of the normal gait described above. Further, the ZMP trajectory parameters may be set such that the desired ZMP trajectory in the floating period linearly and continuously changes from the start of a floating period to the position of the ZMP at the start of the normal gait.

The ZMP trajectory parameters of the current time's gait determined in S608 are provisionally determined parameters and are to be therefore corrected as will be described later. Thereafter, the desired ZMP of the current time's gait defined by the provisionally determined ZMP trajectory parameters until the correction is completed will be hereinafter referred to as the provisional desired ZMP. The gait parameters of the current time's gait that include the provisionally determined ZMP trajectory parameters are referred to as the provisional current time's gait parameters.

Referring back to FIG. 8, after carrying out the processing in S026 as described above, the gait generator 100 carries out the processing for correcting the gait parameters (specifically, the ZMP trajectory parameters) of the current time's gait in S028. In this processing, the ZMP trajectory parameters of the gait parameters for causing the body position/posture trajectory of the current time's gait to continue or approach to the normal gait are corrected.

Figure 17:
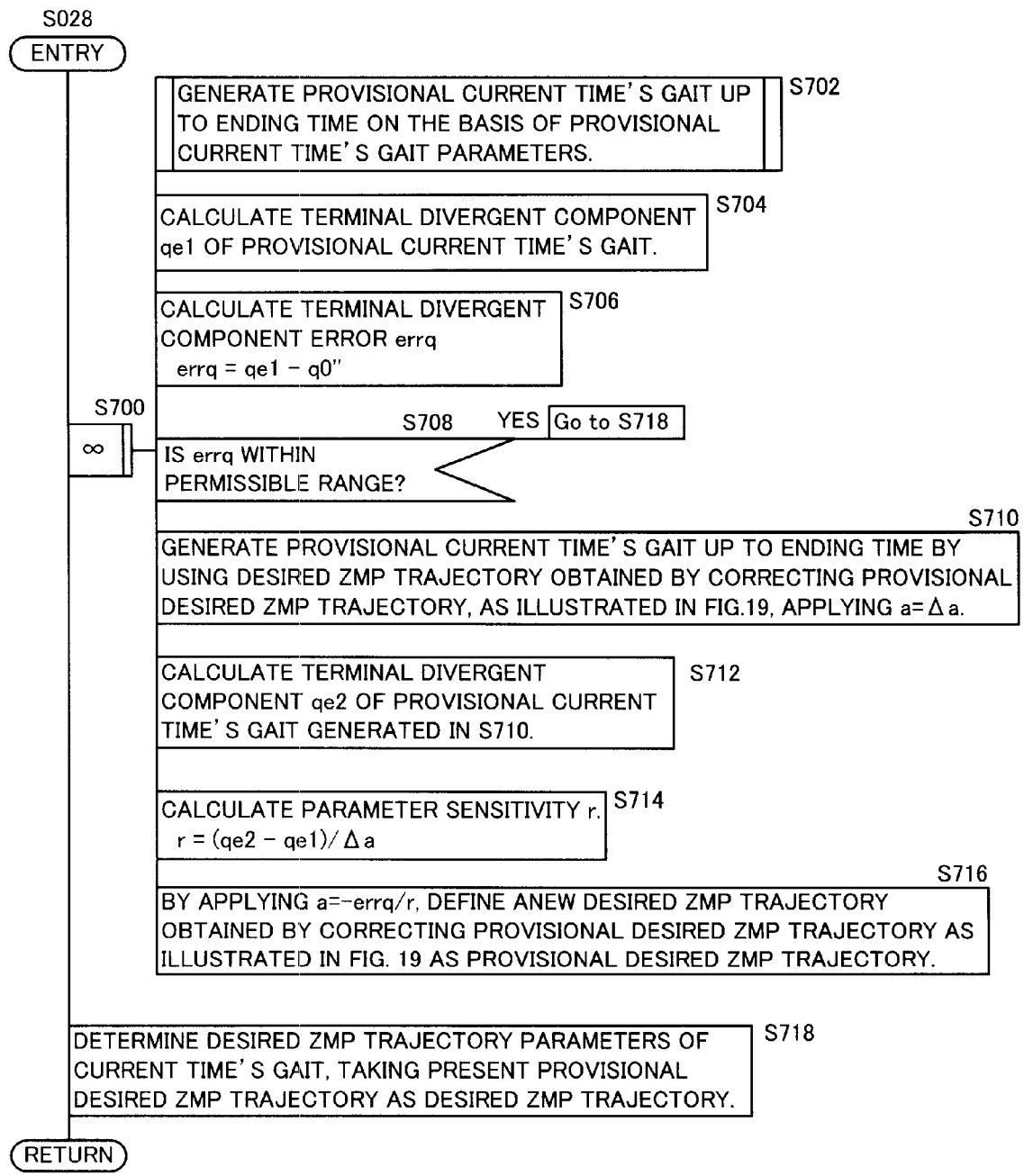
FIG. 17 is a flowchart illustrating the subroutine processing in S028 of FIG. 8.

This processing is carried out as illustrated by the flowchart of FIG. 17.

First, the gait generator 100 proceeds to S702 via S700 and generates a provisional current time's gait until the ending time of the current time's gait on the basis of the provisional current time's gait parameters including the provisionally determined ZMP trajectory parameters.

Figure 18:
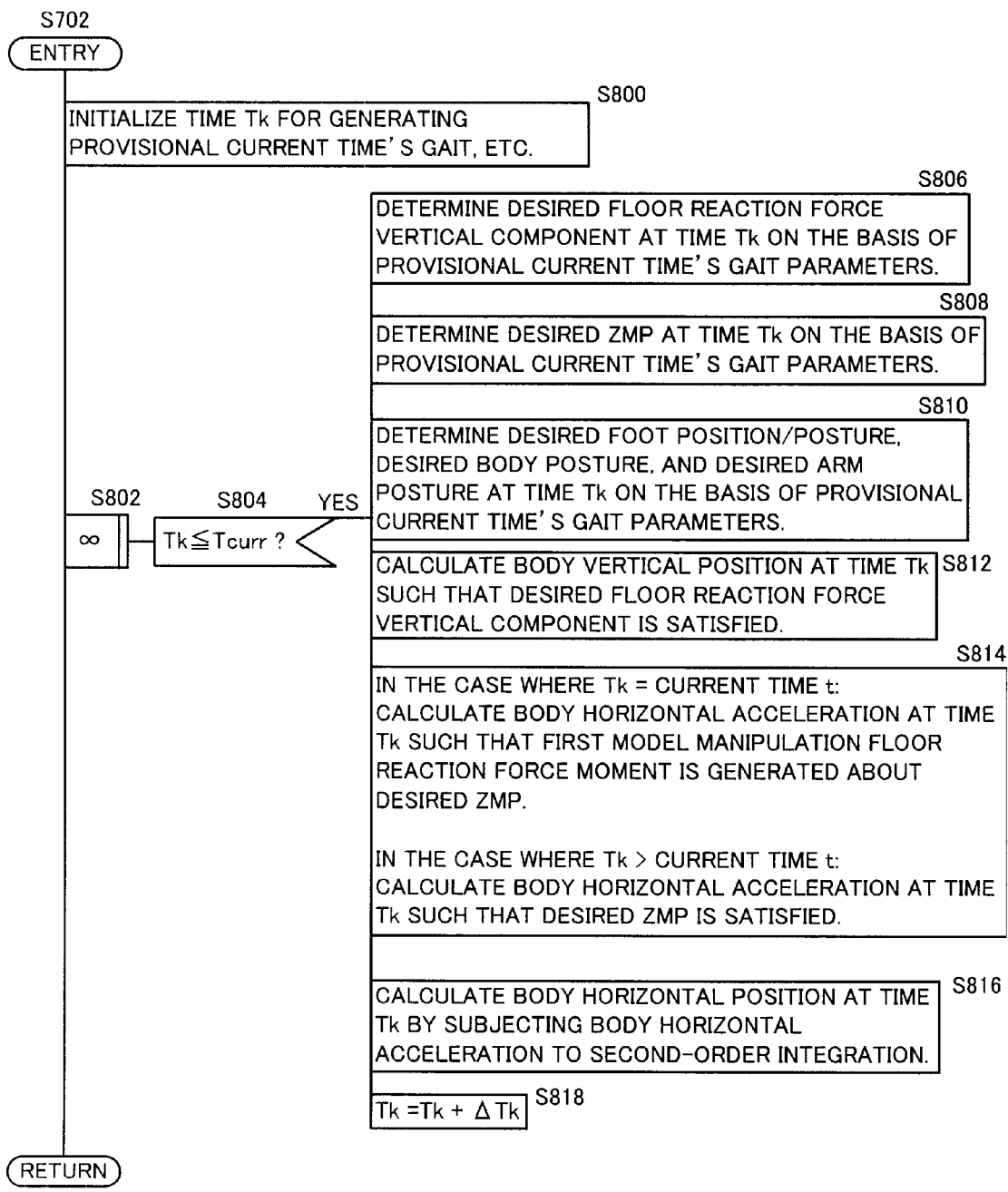
FIG. 18 is a flowchart illustrating the subroutine processing in S702 of FIG. 17.

In S702, the processing illustrated by the flowchart of FIG. 18 is carried out.

First, in S800, the gait generator 100 initializes, for example, the time Tk for generating a provisional current time's gait. To be more specific, the time Tk for generating a provisional current time's gait is initialized to current time t.

Further, the motional state (the motional state observed in a current time gait's supporting leg coordinate system) of a desired gait at time t−Δt, such as the desired body position and desired body velocity, the desired body posture angle and the angular velocity thereof, the desired foot position/posture, the desired arm posture and the like already determined by the gait generator 100 at time t−Δt is set as the initial motional state immediately before the current time t of the provisional current time's gait.

Subsequently, the gait generator 100 proceeds to S804 via S802 to determine whether time Tk (current value) for generating the provisional current time's gait is time before ending time of a current time's gait Tcurr (whether Tk≦Tcurr applies). If the determination result is affirmative, then the gait generator 100 carries out the processing of S806 to S816 (the details thereof will be discussed later) thereby to determine the instantaneous value of the gait at time Tk.

Subsequently, the gait generator 100 proceeds to S818 wherein the gait generator 100 increments the time Tk for generating the provisional current time's gait by predetermined notch time ΔTk, and then repeats the determination in S804. Here, the notch time ΔTk may be set to coincide with, for example, a control cycle Δt. However, the ΔTk may be set to be longer than Δt so as to reduce the calculation volume.

If the determination result in S804 is affirmative, then the processing from S806 to S818 is repeated. If the determination result in S804 turns to be negative, then the processing illustrated in FIG. 18, that is, the processing in S702 of FIG. 17, is terminated. Thus, the generation of the provisional current time's gait from the starting time to the ending time of the current time's gait is completed.

The gait generator 100 carries out the processing for determining the instantaneous values of the provisional current time's gait in the aforesaid S806 to S816 as follows. The instantaneous values of the provisional current time's gait are determined in the same manner as that for determining the instantaneous values of the normal gait (provisional normal gait) in S306 to S316 of FIG. 15.

First, in S806, the gait generator 100 determines the instantaneous value at time Tk of the desired floor reaction force vertical component trajectory illustrated in FIG. 5 on the basis of the provisional current time's gait parameters (more specifically, the floor reaction force vertical component trajectory parameters).

Subsequently, in S808, the gait generator 100 determines the instantaneous value of the desired ZMP trajectory (the provisional desired ZMP trajectory) illustrated in FIG. 6 at time Tk on the basis of the provisional current time's gait parameters (more specifically, the provisionally determined ZMP trajectory parameters).

Subsequently, the gait generator 100 proceeds to S810 to determine the instantaneous values of the desired foot position/posture, the desired body posture, and the desired aim posture at time Tk on the basis of the provisional current time's gait parameters (more specifically, the foot trajectory parameters, the body posture trajectory parameters, and the arm posture trajectory parameters). Regarding the desired arm postures, more specifically, the overall center-of-gravity positions of both arms are determined, whereas the motions of the arms (arm swinging motions) that change the amounts of angular motions about the vertical axis (or the body trunk axis of the body 24) are not yet determined.

Subsequently, the gait generator 100 proceeds to S812 to calculate the body vertical position at time Tk such that the desired floor reaction force vertical component determined in S806 is satisfied (such that the sum of the inertial force of the overall center of gravity of the robot 1 in the vertical direction and the gravitational force is balanced with the desired floor reaction force vertical component). The same calculation method as that used in S312 of FIG. 15 (the processing for calculating the instantaneous value of the body vertical position of the normal gait) may be applied. However, the multi-mass-point model used in S812 may be different from the model used in S312.

Subsequently, the gait generator 100 proceeds to S814 to carry out the processing for determining the body horizontal acceleration of the provisional current time's gait at time Tk.

To be more specific, if time Tk for generating the provisional current time's gait agrees with current time t (the time of the current control cycle of the gait generator 100), then the gait generator 100 determines the body horizontal acceleration of the provisional current time's gait at time Tk such that a model manipulation floor reaction force moment (the value at the current control cycle) supplied from the compensating total floor reaction force moment distributor 110 is generated about the desired ZMP (such that the horizontal component of a moment generated about the desired ZMP by the resultant force of the inertial force of the robot 1 and the gravitational force balances out the model manipulation floor reaction force moment).

In other words, the body horizontal acceleration at time Tk is determined such that the moment generated about the desired ZMP by the resultant force of the inertial force of the robot 1 and the gravitational force agrees with a moment with a sign reversed from the sign of the model manipulation floor reaction force moment.

If time Tk for generating the provisional current time's gait is further in the future than current time t (if Tk>current time t), then the gait generator 100 determines the body horizontal acceleration at time Tk such that the desired ZMP is satisfied (such that the dynamic balance condition that the horizontal component of a moment generated about the desired ZMP due to the resultant force of the inertial force of the robot 1 and the gravitational force is zero is satisfied).

In these cases, the processing for calculating the body horizontal acceleration of the provisional current time's gait at time Tk is carried out using, for example, the dynamic model (the inverted pendulum model) in FIG. 7.

To be more specific, the vertical position and the horizontal position of the body mass point 24b at time Tk are determined from the body vertical position of the provisional current time's gait at time Tk, the body horizontal position at time (Tk−ΔTk), and the desired body posture at time Tk. If time Tk is current time t, then the body horizontal position in the initial motional state set in S800 is used as the body horizontal position at time (Tk−ΔTk).

Supplementarily, the body horizontal position at time Tk may be estimated by interpolation on the basis of the time series of the body horizontal position up to time (Tk−ΔTk) or the gait state at time (Tk−ΔTk), and the estimated body horizontal position may be used in place of the body horizontal position at time (Tk−ΔTk).

Further, the value obtained by subtracting the gravitational force acting on the body mass point 24b (=mb*g) from the floor reaction force vertical component of the provisional current time's gait at time Tk is divided by the mass mb of the body mass point 24b, thereby determining the vertical acceleration of the body mass point 24b at time Tk.

Further, if Tk is equal to current time t, then the body mass point horizontal acceleration d2Xb/dt2 at time Tk is calculated by solving, on d2Xb/dt2, an expression obtained by substituting Zb, Xb and d2Zb/dt2 of the aforesaid expression 04 by the vertical position, the horizontal position, and the vertical acceleration, respectively, of the body mass point 24b determined as described above, substituting Xzmp and Zzmp of the expression 04 by the horizontal position and the vertical position of the desired ZMP at time Tk, and by causing Mzmp_y of the expression 04 to coincide with the model manipulation floor reaction force moment (current value). Then, the body mass point horizontal acceleration d2Xb/dt2 is determined as the body horizontal acceleration at time Tk.

If Tk>current time t, then the body horizontal acceleration at time Tk is calculated by solving an expression, which is obtained by setting Mzmp_y of the expression 04 to zero, on d2Xb/dt2. The processing in this case is the same as that applied to the case where Tk is equal to current time t, except for setting Mzmp_y of the expression 04 to zero.

Alternatively, a more precise dynamic model may be used to exploratorily determine the body horizontal acceleration that causes the horizontal component of a floor reaction force moment about the desired ZMP to coincide with the model manipulation floor reaction force moment or to become zero.

Subsequently, the gait generator 100 proceeds to S814 to determine the body horizontal acceleration at time Tk such that the desired ZMP is satisfied (such that the dynamic balance condition that the horizontal component of a moment generated about the desired ZMP due to the resultant force of the inertial force of the robot 1 and the gravitational force is zero is satisfied). The method for calculating the body horizontal acceleration is the same as that in S314 of FIG. 15, and the body horizontal acceleration is calculated using, for example, the dynamic model (the inverted pendulum model) illustrated in FIG. 7.

Alternatively, a more precise dynamic model may be used to exploratorily determine the body horizontal acceleration that zeros the horizontal component of a floor reaction force moment about the desired ZMP.

Subsequently, the gait generator 100 proceeds to S816 to subject the body horizontal acceleration determined in S814 to the second-order integration so as to calculate the body horizontal position at current time Tk. The calculation method is the same as that used in S316 of FIG. 15.

This completes the detailed description of the processing (the processing for generating provisional current time's gaits) carried out by the gait generator 100 in S702 of FIG. 17.

After executing the processing in S702 as described above, the gait generator 100 carries out the processing in S704.

In S704, the gait generator 100 calculates a terminal divergent component qe1 (a divergent component qe1 at the end of a provisional current time's gait) on the basis of body horizontal position/velocity (Xe, Vxe) at the end of the provisional current time's gait generated in S702.

To be more specific, the gait generator 100 first determines the horizontal position/velocity (the horizontal position and the horizontal velocity) of the body mass point 24b of the inverted pendulum model in FIG. 7 on the basis of (Xe, Vxe) and the body posture (the reference body posture in the present embodiment) at the end of the provisional current time's gait. Then, from the body mass point horizontal position/velocity, the terminal divergent component qe1 of the provisional current time's gait is calculated according to the above expression 118, as with S222 of FIG. 14 described above. In this case, $\Gamma^{-1}$ used to calculate qe1 is the same as that calculated by the processing in S222.

Subsequently, the gait generator 100 proceeds to S706 to calculate a terminal divergent component error errq (=qe1−q0″), which is the difference between the terminal divergent component qe1 of the provisional current time's gait determined as described above and the initial divergent component q0″ determined in S224 of FIG. 14.

Further, the gait generator 100 proceeds to S708 to determine whether the terminal divergent component error errq determined as described above falls within a permissible range (a range in the vicinity of 0), that is, whether errq is zero or almost zero. More specifically, the determination in S708 is carried out on the terminal divergent component error errq in each axial direction of the X-axis direction and the Y-axis direction. If the terminal divergent component errors errq in both the X-axis direction and the Y-axis direction fall within the permissible range, then the determination result in S708 turns to be affirmative. If the terminal divergent component error errq in one of the axial directions does not fall within the permissible range, then the determination result in S708 turns to be negative.

Figure 19:
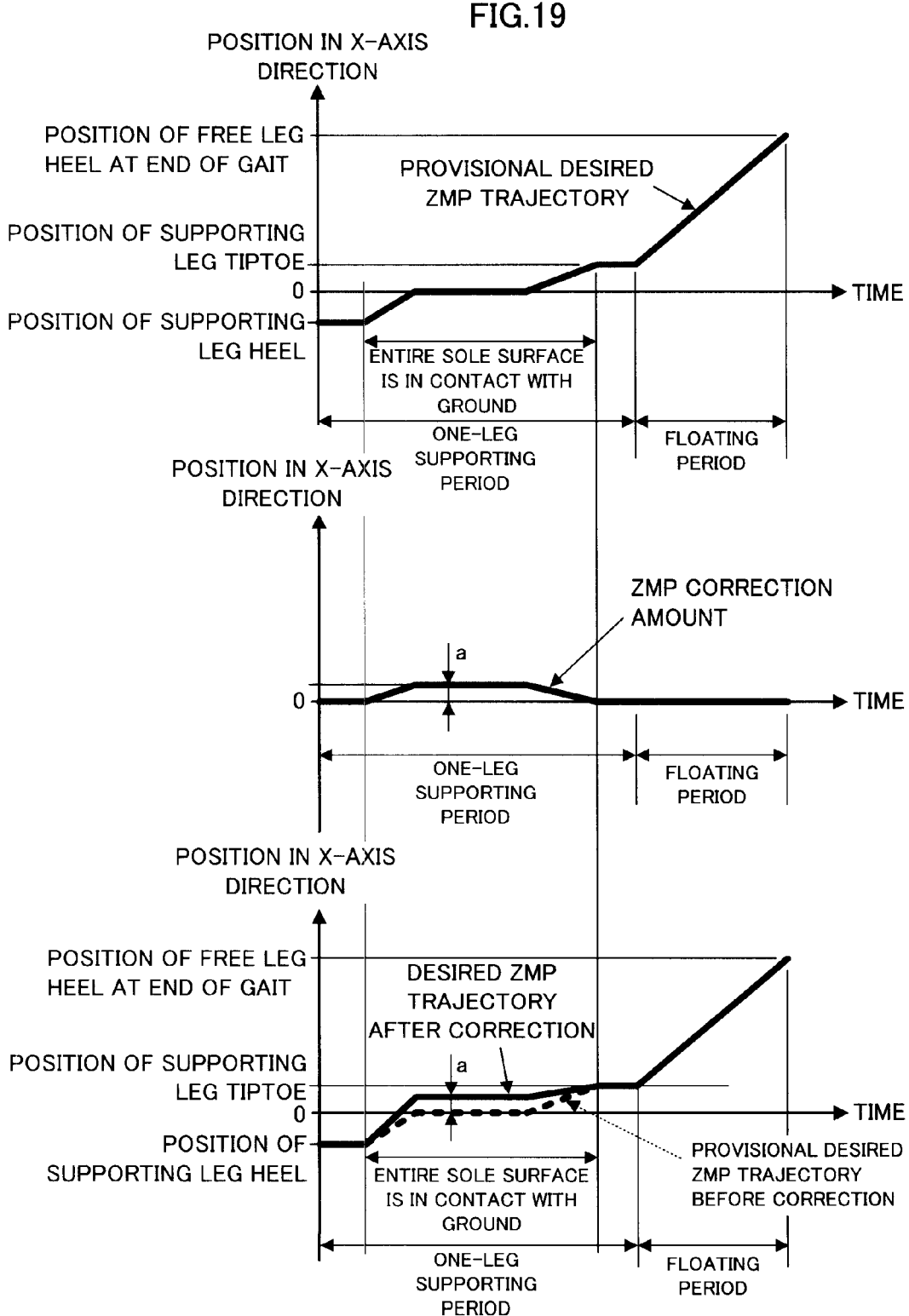
FIG. 19 is a graph for explaining the processing in S710 of FIG. 17.

If the determination result in S708 is negative, the gait generator 100 proceeds to S710 to generate a provisional current time's gait up to ending time, as with the aforesaid S702, by using a desired ZMP trajectory obtained by correcting a present provisional desired ZMP trajectory by a correction amount of a trapezoidal pattern, applying a=Δa (Δa: a predetermined minute amount), as illustrated in FIG. 19. In other words, the gait generator 100 generates a provisional current time's gait anew by using a desired ZMP trajectory obtained by correcting the provisional desired ZMP trajectory used for generating the provisional current time's gait in S702. In this case, the current time's gait parameters other than the desired ZMP are the same as those used in S702.

Here, referring to FIG. 19, the "a" mentioned above denotes the height of the correction amount of the trapezoidal pattern (hereinafter referred to as the ZMP correction amount in some cases) for correcting the provisional desired ZMP trajectory (to be added to the provisional desired ZMP trajectory) in order to cause the terminal divergent component of the provisional current time's gait to coincide with the initial divergent component of the normal gait as much as possible (to consequently converge the body horizontal position/posture trajectory of the current time's gait to the body horizontal position/posture trajectory of the normal gait).

In this case, according to the present embodiment, the provisional desired ZMP trajectory is corrected during the period in which substantially entire bottom surface of the supporting leg foot 22 is in contact with the ground (entire sole surface in contact with the ground period). Hence, the ZMP correction amount is set such that the ZMP correction amount is not zero (≠0) during the entire sole surface in contact with the ground period, while the ZMP correction amount is zero (=0) during a period other than the entire sole surface in contact with the ground period. Further, the time of breakpoints of the ZMP correction amounts of the aforesaid trapezoidal pattern is set according to the time of breakpoints of the provisional desired ZMP trajectory in the entire sole surface in contact with the ground period. In S710, a=Δa (Δa: a predetermined minute amount) applies in order to observe a change in the aforesaid terminal divergent component error errq when a present provisional desired ZMP trajectory has been corrected by a minute amount by the ZMP correction amount of the aforesaid trapezoidal pattern.

Supplementarily, the aforesaid processing in S710 has been described, taking, as an example, the case where the position of the desired ZMP in the X-axis direction is corrected. In actuality, however, the position of the desired ZMP in the Y-axis direction is also corrected. As with the correction of the position in the X-axis direction, the correction of the position in the Y-axis direction is made such that the desired ZMP trajectory during the entire sole surface is in contact with the ground period is changed from the provisional desired ZMP trajectory according to the trapezoidal pattern.

In this case, the aforesaid Δa may be set to the same value in each axial direction or may be set to values that are different from each other.

If correcting the desired ZMP trajectory in one of the axial directions of the X-axis direction and the Y-axis direction exerts no influences or sufficiently small influences on the terminal divergent component in the other axial direction, then the processing from S710 to S716, which will be discussed later, may be carried out in the X-axis direction and the Y-axis direction separately.

After generating the provisional current time's gait in S710 as described above, the gait generator 100 proceeds to S712 to calculate a terminal divergent component qe2 in the provisional current time's gait in the same manner as that in S704 on the basis of the body horizontal position/velocity (Xe2, Vxe2) at the end of the provisional current time's gait determined in S710.

In the present embodiment, Δa has been set to a minute amount of a predetermined value in S710. Alternatively, however, Δa may be variably set such that Δa approaches zero as the terminal divergent component error errq is reduced by repetitive operation described below. In general, however, even when Δa is set to a constant, the terminal divergent component error errq can be set to fall within a permissible range by performing the repetitive calculation a few time.

Subsequently, the gait generator 100 proceeds to S714 and calculates a parameter sensitivity r (the ratio of a change in the terminal divergent component error relative to Δa) according to the expression in the flowchart. More specifically, the gait generator 100 calculates the parameter sensitivity r by dividing the difference between the terminal divergent component qe2 calculated in S712 and the terminal divergent component qe1 calculated in S704 (=qe2−qe1) by Δa. In this case, to be more specific, for example, the component of (qe2−qe1) in the X-axis direction is divided by Δa related to the ZMP correction amount in the X-axis direction thereby to calculate the parameter sensitivity r in the X-axis direction. Further, the component of (qe2−qe1) in the Y-axis direction is divided by Δa related to the ZMP correction amount in the Y-axis direction thereby to calculate the parameter sensitivity r in the Y-axis direction.

Subsequently, the gait generator 100 proceeds to S716 and sets, as the height "a" of the ZMP correction amount of the trapezoidal pattern, the value obtained by reversing the sign of the value determined by dividing the terminal divergent component error errq determined in S706 by the parameter sensitivity r determined in S714, i.e., a=−errq/r, and then determines anew, as the provisional desired ZMP, the desired ZMP obtained by correcting the provisional desired ZMP pattern on the basis of the ZMP correction amount, as illustrated in FIG. 19. In this case, the ZMP correction amount height "a" is calculated separately for the X-axis direction and the Y-axis direction, respectively.

If correcting the desired ZMP trajectory in one of the axial directions, namely, the X-axis direction and the Y-axis direction, exerts influences on the terminal divergent component in the other axial direction, then the influences are preferably taken into account in determining the height "a" of the ZMP correction amount in each axial direction.

Subsequently, the gait generator 100 carries out the processing from S702 again. At this time, as long as the determination result given in S708 is negative, the processing of S702 through S716 described above is repeated. If the determination result in S708 turns to be affirmative, then the gait generator 100 leaves the repetition loop (S700) and proceeds to S718.

By carrying out the loop processing of S702 through S716 described above, the ZMP correction amount (consequently the desired ZMP trajectory of the current time's gait) which allows the terminal divergent component qe1 to agree or almost agree with the initial divergent component q0" of the normal gait is exploratorily determined.

In S718 following the loop processing, the gait generator 100 determines the present provisional desired ZMP trajectory (the provisional desired ZMP trajectory set immediately before leaving the repetition loop in S700) as the final desired ZMP trajectory of the current time's gait, and determines the ZMP trajectory parameters based thereon This terminates the processing in S028 of FIG. 8 (the processing for correcting the current time's gait parameters).

In the present embodiment, the ZMP correction amount has been set to be the trapezoidal pattern. Alternatively, however, other patterns, such as a triangular pattern or a pattern having a continuously changing curvature, may be used.

Referring back to FIG. 8, after correcting the current time's gait parameters in S028 as described above, the gait generator 100 proceeds to S030 to determine floor reaction force moment permissible range parameters that define the permissible range of a floor reaction force moment (more specifically, the horizontal component of a floor reaction force moment) about the desired ZMP at each time from the start to the end of the current time's gait. The permissible range of the floor reaction force moment defined by the floor reaction force moment permissible range parameters is used as will be described later in the feedback manipulated variable calculator 110 and also used in the determination processing in S030, which will be discussed later.

The result obtained by dividing the floor reaction force moment by a floor reaction force vertical component corresponds to the amount of deviation of the ZMP (the central point of a floor reaction force) from a desired ZMP. Hence, the floor reaction force moment permissible range may be converted into a ZMP permissible range (floor reaction force central point permissible range) as the permissible range of the position of a ZMP (the floor reaction force central point), and the parameters defining the ZMP permissible range may be determined.

The floor reaction force moment permissible range determined in S030 means the permissible range of an actual floor reaction force moment about the desired ZMP controlled by the control processing (compliance control) by the aforesaid composite-compliance motion determiner 104 when used in the feedback manipulated variable calculator 110. The floor reaction force moment permissible range will be described below.

The compliance control implemented by the processing carried out by the composite-compliance motion determiner 104 controls the position/posture of the foot 22 such that the floor reaction force moment generated about the desired ZMP will be the desired floor reaction force moment for compliance control. When the compliance control faithfully is implemented as desired, the actual floor reaction force central point will be a point, the position of which is deviated in the horizontal direction from the desired ZMP by a value obtained by dividing the desired floor reaction force moment by a floor reaction force vertical component. The actual floor reaction force central point cannot deviate from a ZMP-existable range indicated by a so-called supporting polygon (in a strict expression, the range in which the actual floor reaction force central point can exist). If the actual floor reaction force central point excessively approaches the boundary of the ZMP-existable range, then problems will be posed. For example, the proper ground contact feeling of the foot 22 deteriorates or the bottom surface of the foot 2 floats.

The floor reaction force moment permissible range is to impart restrictions to the floor reaction force moment for compliance control in order to prevent the aforesaid problems. For this reason, the floor reaction force moment permissible range is preferably determined such that the floor reaction force central point permissible range obtained by dividing the floor reaction force moment permissible range by a floor reaction force vertical component is included in the ZMP-existable range.

More specifically, the floor reaction force central point permissible range (ZMP permissible range) should be determined on the basis of the supporting polygon. In this case, the floor reaction force central point permissible range can be generally set to have a complicated shape. In the present embodiment, however, the floor reaction force central point permissible range is set to, for example, a region of a rectangular shape (a rectangular shape having sides parallel to the X-axis direction and the Y-axis direction) on a floor surface in order to simplify the calculation. In this case, the floor reaction force moment permissible range obtained by converting the floor reaction force central point permissible range into a floor reaction force moment is set independently for a component in the X-axis direction and a component in the Y-axis direction, respectively.

Figure 20:
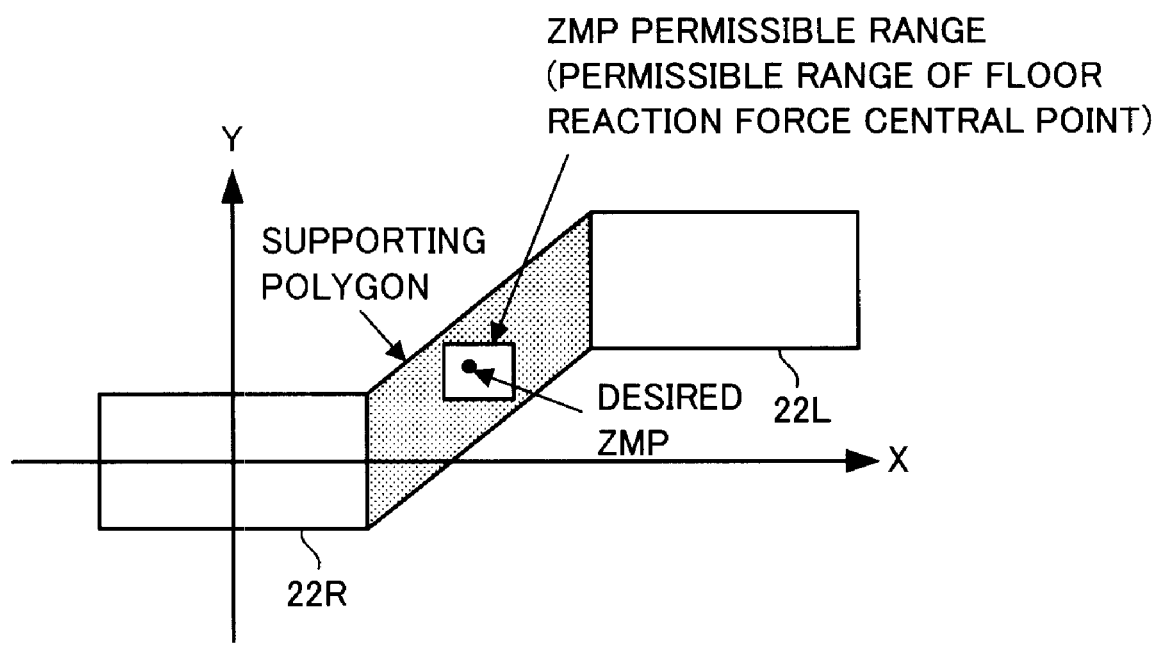
FIG. 20 is a diagram for explaining the processing in S030 of FIG. 8.

For example, if the supporting polygon and the desired ZMP are in the situation illustrated in FIG. 20, then the floor reaction force central point permissible range (ZMP permissible range) is set to be included in the supporting polygon, as illustrated. At the same time, the floor reaction force central point permissible range (ZMP permissible range) is set to include the desired ZMP.

The supporting polygon indicated in the form of a stippled region in FIG. 20 illustrates a supporting polygon of a walking gait (a supplemental description will be given later of the gait generation related to a walking gait) in a two-leg supporting period. This example schematically illustrates a state wherein the tiptoe of the right foot 22R is in contact with the ground, while the heel of the left foot 22L is in contact with the ground.

In the one-leg supporting period of a walking gait or the running gait in FIG. 4, the supporting polygon provides the ground contact surface (the surface of contact with a floor surface) of the supporting leg foot 22. In this case, a floor reaction force central point permissible range is set to include a desired ZMP and also to be included in the supporting polygon or to substantially match the supporting polygon. If the desired ZMP deviates from the supporting polygon or is excessively close to the boundary of the supporting polygon, then, temporarily, for example, an arbitrary region in the supporting polygon that does not include the desired ZMP or a point in the supporting polygon that is different from the desired ZMP (a region having a zero area) is set as the floor reaction force central point permissible range.

Further, in the floating period of the running gait in FIG. 4, the floor reaction force central point permissible range is set to be, for example, the region having zero width in both X-axis direction and the Y-axis direction, the center thereof being the desired ZMP. This means that the floor reaction force central point permissible range is set to the point of the desired ZMP itself, meaning that the region has a zero area.

When setting the floor reaction force central point permissible range as described above, the supporting polygon in the current time's gait is calculated on the basis of the foot position/posture trajectory parameters of the current time's gait parameters determined in S028 (or S026).

In the present embodiment, the range obtained by converting the floor reaction force central point permissible range set as described above to a floor reaction force moment is determined as the standard permissible range of floor reaction force moments. The standard permissible range is a permissible range based on an assumption that the floor in an environment in which the robot 1 travels is a standard floor (e.g., a floor having a flat surface with its frictional coefficient and hardness meeting predetermined requirements).

Further, according to the present embodiment, the gait generator 100 determines floor reaction force moment permissible range parameters by correcting, as necessary, the standard permissible range of floor reaction force moments according to received floor geometry information.

To be more specific, in the case where the floor recognized from the received floor geometry information is not a floor with a flat surface, and the floor makes it difficult to change the expected landing position/posture of the free leg foot 22 in a current time's gait or a next time's gait from the position/posture specified by required parameters (e.g., a floor formed of scattered paving stones or the like), and if the actual posture of the robot 1 deviates from a desired posture, then the deviation of the posture of the actual robot 1 is preferably restrained by the desired floor reaction force moment for the compliance control, i.e., by holding the foot 22 of the actual robot 1, as much as possible. In this case, therefore, the gait generator 100 determines the floor reaction force moment permissible range parameters such that the floor reaction force moment permissible range is expanded further than the standard permissible range within an extent that the floor reaction force central point permissible range corresponding to the floor reaction force moment permissible range does not deviate from the aforesaid supporting polygon.

Further, in the case where, for example, the robot 1 is to go up or down a staircase, the free leg foot 22 is usually landed such that a portion near the heel or a portion near a tiptoe of the free leg foot 22 of the robot 1 extends beyond a step surface of the staircase. In this case, the area of the supporting polygon is smaller than that when the robot 1 travels on a standard floor. Hence, if the floor recognized on the basis of received floor geometry information (the floor on which the robot 1 is about to travel) is a staircase, then the gait generator 100 determines the floor reaction force moment permissible range parameters such that the floor reaction force moment permissible range is narrower than the standard permissible range.

Further, it for the example, the hardness of the floor recognized on the basis of received floor geometry information is less than that of a standard floor, then it is difficult in the actual robot 1 to set a large desired floor reaction force moment for compliance control to be generated about a desired ZMP. In this case, therefore, the gait generator 100 determines the floor reaction force moment permissible range parameters such that the floor reaction force moment permissible range is narrower than the standard permissible range.

Thus, in S030, the floor reaction force moment permissible range or a floor reaction force central point permissible range corresponding thereto is determined such that it depends not only on a desired ZMP trajectory and a supporting polygon specified by foot position/posture trajectory parameters but also on a floor geometry, including the properties of a floor.

In the present embodiment, the standard permissible range of a floor reaction force moment has been corrected, as appropriate, according to a floor geometry. Alternatively, however, the floor reaction force central point permissible range set on the basis of a desired ZMP trajectory and a supporting polygon may be corrected according to a floor geometry, and the corrected floor reaction force central point permissible range may be converted to a floor reaction force moment permissible range.

After determining the floor reaction force central point permissible range in S030 as described above, the gait generator 100 proceeds to S031 to determine whether the desired ZMP trajectory specified by the ZMP trajectory parameters determined in S028 is a proper trajectory. In this case, according to the present embodiment, the gait generator 100 determines whether the desired ZMP trajectory is a proper trajectory by determining whether each instantaneous value (the instantaneous value at each predetermined notch time) of the desired ZMP trajectory specified by the ZMP trajectory parameters of a current time's gait exists in the floor reaction force central point permissible range corresponding to the floor reaction force moment permissible range determined in the aforesaid S030.

More specifically, the gait generator 100 determines the floor reaction force central point permissible range corresponding to each instantaneous value of the desired ZMP on the basis of the floor reaction force moment permissible range.

The gait generator 100 then determines that the desired ZMP trajectory specified by the ZMP trajectory parameters of the current time's gait is a proper trajectory if the desired ZMP at each time of the current time's gait exists in the floor reaction force central point permissible range at that time. If the desired ZMP at any time of the current time's gait deviates from the floor reaction force central point permissible range at that time, then the gait generator 100 determines that the desired ZMP trajectory specified by the ZMP trajectory parameters of the current time's gait is not a proper trajectory. The gait generator 100 assumes that each instantaneous value of the desired ZMP in a floating period in which both legs 2 and 2 of the robot 1 are not in contact with the ground always falls in the floor reaction force central point permissible range.

If the determination result in S031 is negative (if the desired ZMP trajectory is not a proper trajectory), then the gait generator 100 carries out the processing from S020 again. In this case, in S020, the gait generator 100, for example, changes the expected landing position/posture of the free leg foot 22 of the current time's gait (consequently, the position/posture in the next time's gait supporting leg coordinate system) to position/posture shifted from current values (i.e., the expected landing position/posture determined by the processing in S020 at a control cycle immediately preceding the current control cycle). To be more accurate, the aforesaid expected landing position/posture to be changed means at least one of the expected landing position and the expected landing posture.

In this case, the change amount or amounts of the expected landing position/posture are determined by the aforesaid determination processing in S031 on the basis of the direction of deviation or the deviation amount of the desired ZMP deviating from the floor reaction force central point permissible range. The change amount or amounts are basically determined such that the desired ZMP will be included or will be easily included in a supporting polygon defined by the updated expected landing position/posture.

Alternatively, the expected landing position/posture of the free leg foot 22 of the next time's gait (consequently, the position/posture in the next but one time's gait supporting leg coordinate system) may be changed in addition to the expected landing position/posture of the free leg foot 22 of the current time's gait. Furthermore, the expected landing time of the free leg foot 22 may be changed whenever the expected landing position/posture of the free leg foot 22 of the current time's gait or the next time's gait are changed.

Thus, after carrying out the processing in S020 again, the gait generator 100 carries out again the processing from S022 and after in the manner described above. In other words, the processing from S020 to S028 is repeated until the determination result in S030 changes to be affirmative.

Supplementarily, the floor reaction force central point permissible range used in the determination processing in S031 does not have to be the same as the floor reaction force central point permissible range corresponding to the floor reaction force moment permissible range determined in S030 (specifically, the permissible range used in the processing by the feedback manipulated variable calculator 110, which will be discussed later). For example, the floor reaction force central point permissible range used in the determination processing in S031 may be a range having a different area or boundary configuration from the area or boundary configuration of the floor reaction force central point permissible range corresponding to the floor reaction force moment permissible range determined in S030 (specifically, the permissible range used in the processing by the feedback manipulated variable calculator 110, which will be discussed later).

Referring back to FIG. 8, if the determination result in S031 is affirmative or if the determination result in S016 is negative, the gait generator 100 proceeds to S032 to determine current time's gait instantaneous values (the instantaneous values of the desired foot position/posture or the like of the current time's gait at a present control cycle). In this S032, the current time's gait instantaneous values are determined such that the model manipulation floor reaction force moment determined as previously described by a posture stabilization control calculator 112 is generated about a desired ZMP.

Figure 21:
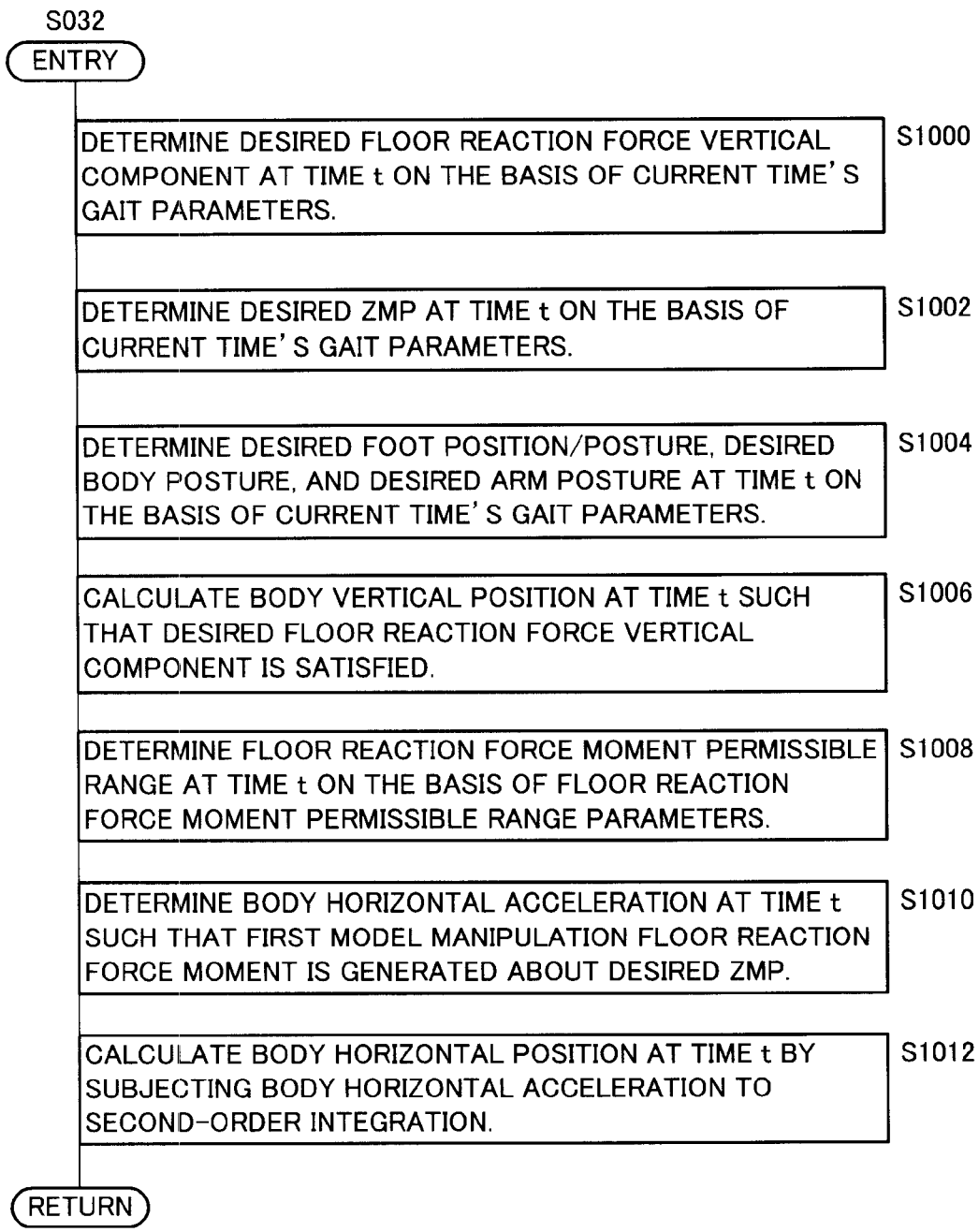
FIG. 21 is a flowchart illustrating the subroutine processing in S032 of FIG. 8.

To be specific, gait instantaneous values are determined as illustrated by the flowchart of FIG. 21. The gait generator 100 first carries out the processing from S1000 to S1006 in the same manner as that for the processing from S806 to S812 of FIG. 18 (or from S306 to S312 of FIG. 15) thereby to calculate the instantaneous values of the desired floor reaction force vertical component, the desired ZMP, the desired foot position/posture, the desired body posture, the desired arm posture, and the desired body vertical position at current time t (the present control cycle) of a current time's gait.

These instantaneous values are calculated in the same manner as that of the processing from S806 to S812 of FIG. 18 (or from S306 to S312 of FIG. 15) except that the current time's gait parameters that have been lastly corrected in S028 of FIG. 8 are used as the gait parameters.

Subsequently, the gait generator 100 proceeds to S1008 to determine the instantaneous values of the floor reaction force moment permissible range at the current time t of the current time's gait on the basis of the floor reaction force moment permissible range parameters determined in S030 of FIG. 8. The instantaneous values of the floor reaction force moment permissible range are output from the gait generator 100 to the feedback manipulated variable calculator 110 illustrated in FIG. 3, which will be described in detail hereinafter.

The feedback manipulated variable calculator 110 uses the received instantaneous values of the floor reaction force moment permissible range and the like to determine the total model manipulation floor reaction force moment and the desired floor reaction force moment for compliance control. Further, the determined total model manipulation floor reaction force moment is input to the total model manipulation floor reaction force moment distributor 118. The distributor 118 determines a first model manipulation floor reaction force moment and a second model manipulation floor reaction force moment. Then, the determined first model manipulation floor reaction force moment is sampled by the gait generator 100 (captured by the gait generator 100) at the control cycle of the gait generator 100.

Subsequently, the gait generator 100 proceeds to S1010 to determine the body horizontal acceleration at the current time t of the current time's gait such that the first model manipulation floor reaction force moment (a latest value) supplied from the total model manipulation floor reaction force moment distributor 118 is generated about the desired ZMP (such that the horizontal component of the moment generated about the desired ZMP by the resultant force of the inertial force of the robot 1 and the gravitational force is balanced with the first model manipulation floor reaction force moment).

In other words, the body horizontal acceleration at the current time t of the current time's gait is determined such that the moment generated about the desired ZMP by the resultant force of the inertial force of the robot 1 and the gravitational force agrees with the first model manipulation floor reaction force moment with its sign reversed.

In this case, the body horizontal acceleration of the current time's gait is calculated in the same manner as that of the processing in S814 of FIG. 18 by using, for example, the dynamic model (the inverted pendulum model) in FIG. 7.

To be more specific, at the current time t of the current time's gait, the vertical position and the horizontal position of the body mass point 24*b* at the current time t are determined on the basis of the body vertical position, the body horizontal position at time (t−Δt), and the desired body posture at the current time t. Alternatively, the body horizontal position at the time t may be estimated in an interpolation manner on the basis of the time series of the body horizontal position up to the time (t−Δt) or the gait state at the time (t−Δ), and the estimated body horizontal position may be used in place of the body horizontal position at the time (t−Δt).

Further, the value obtained by subtracting the gravitational force (=mb*g) acting on the body mass point 24*b* from the floor reaction force vertical component at the current time t of the current time's gait is divided by the mass mb of the body mass point 24*b* to determine the vertical acceleration of the body mass point 24*b* at the current time t.

Then, the vertical position, the horizontal position, and the vertical acceleration of the body mass point 24*b*, which have been determined as described above, are substituted into Zb, Xb, and d2Zb/dt2, respectively, of the above expression 04, and the horizontal position and the vertical position of the desired ZMP at the current time t are substituted into Xzmp and Zzmp, respectively, of expression 04. Further, an expression with Mzmp_y of the expression 04 coinciding with the first model manipulation floor reaction force moment is solved on d2Xb/dt2, thereby calculating the body mass point horizontal acceleration d2Xb/dt2 at the current time t. Then, the body mass point horizontal acceleration d2Xb/dt2 is determined as the body horizontal acceleration at the current time t.

Alternatively, a more precise dynamic model may be used to exploratorily determine the body horizontal acceleration that causes the horizontal component of a floor reaction force moment about the desired ZMP to coincide with the first model manipulation floor reaction force moment.

Subsequently, the gait generator 100 proceeds to S1012 to subject the body horizontal acceleration determined in S1010 as described above to the second-order integration so as to calculate the body horizontal position at the current time t.

The calculating method is the same as that used in S316 of FIG. 15 (or S816 of FIG. 18). This completes the processing in S032 of FIG. 8.

Subsequently, the gait generator 100 proceeds to S034 to determine arm motions for cancelling a spin force (to zero or substantially zero the vertical component of the floor reaction force moment generated about the desired ZMP due to the motions of portions except for arms of the robot 1). To be more specific, the floor reaction force moment vertical component trajectory at the desired ZMP in the case where the arms are not swumg (strictly speaking, each instantaneous value with a reversed sign of the vertical component trajectory of the moment acting on the desired ZMP due to the resultant force of the gravitational force and the inertial force of the robot when a gait is generated without arm swings) is determined.

In other words, the instantaneous value of the vertical component of the floor reaction force moment about the desired ZMP that balances with the instantaneous value of the motion (not including arm swinging motion) of the current time's gait generated by the processing in S032 is determined. Then, the instantaneous value of the floor reaction force moment vertical component is divided by an equivalent inertial moment of an arm swinging motion so as to determine an angular acceleration of an arm swinging motion necessary to cancel the spin force. If an arm swing is excessively large, then the instantaneous value of the floor reaction force moment vertical component may be divided by a value that is larger than the equivalent inertial moment.

Subsequently, the gait generator 100 subjects the angular acceleration to the second-order integration, then sets the angle obtained by passing the integration result through a low-cut filter for preventing the integration value from becoming excessive as the arm swing motion angle. However, in the arm swing motion, the right and left arms are longitudinally swung in opposite directions to avoid causing changes in the positions of the centers of gravity of both arms. Alternatively, an arm swing motion for cancelling the spin force may be generated also in the normal gait and the arm swing motion in the current time's gait may be determined such that the connection thereof to the one in the normal gait is ensured.

Subsequently, the gait generator 100 proceeds to S036 to add the control cycle Δt to the time t and carries out the processing from S014 again.

Thus, the instantaneous values of the current time's gait are generated in a time series manner.

In this case, according to the present embodiment, the trajectory (time series) of the motion of the current time's gait is determined such that the desired floor reaction force vertical component trajectory defined by the desired floor reaction force vertical component trajectory parameters (the parameters determined in S606 of FIG. 16) is satisfied (such that the total sum of the vertical inertial force of the overall center of gravity of the robot 1 and the gravitational force acting on the overall center of gravity balances out a desired floor reaction force vertical component) and that the first model manipulation floor reaction force moment is additionally generated about the desired ZMP in the dynamic model for generating gaits (the inverted pendulum model in the present embodiment) illustrated in FIG. 7.

In addition, the trajectory of the motion of the current time's gait is determined such that the trajectory will converge (or gradually approach) to the motion trajectory of a normal gait, which is a cyclic gait. More specifically, the trajectory of the motion of the current time's gait is determined such that the divergent component at the end of the current time's gait meets the divergent component at the beginning of a normal gait.

The processing by the feedback manipulated variable calculator 110, the total model manipulation floor reaction force moment distributor 118, and the perturbation model calculator 120 will now be explained in more detail.

First, the processing carried out by the perturbation model calculator 120 will be described. The perturbation model calculator 120 in the present embodiment uses a dynamic model that expresses the relationship between the perturbation motion of the horizontal position of the body 24 of the robot 1 and the perturbation of a floor reaction force moment about a desired ZMP (perturbation dynamic model) to carry out the processing for calculating the body horizontal position perturbation amount. The perturbation dynamic model in the present embodiment is represented by an inverted pendulum model similar to the dynamic model for generating gaits illustrated in FIG. 7.

Figure 22:
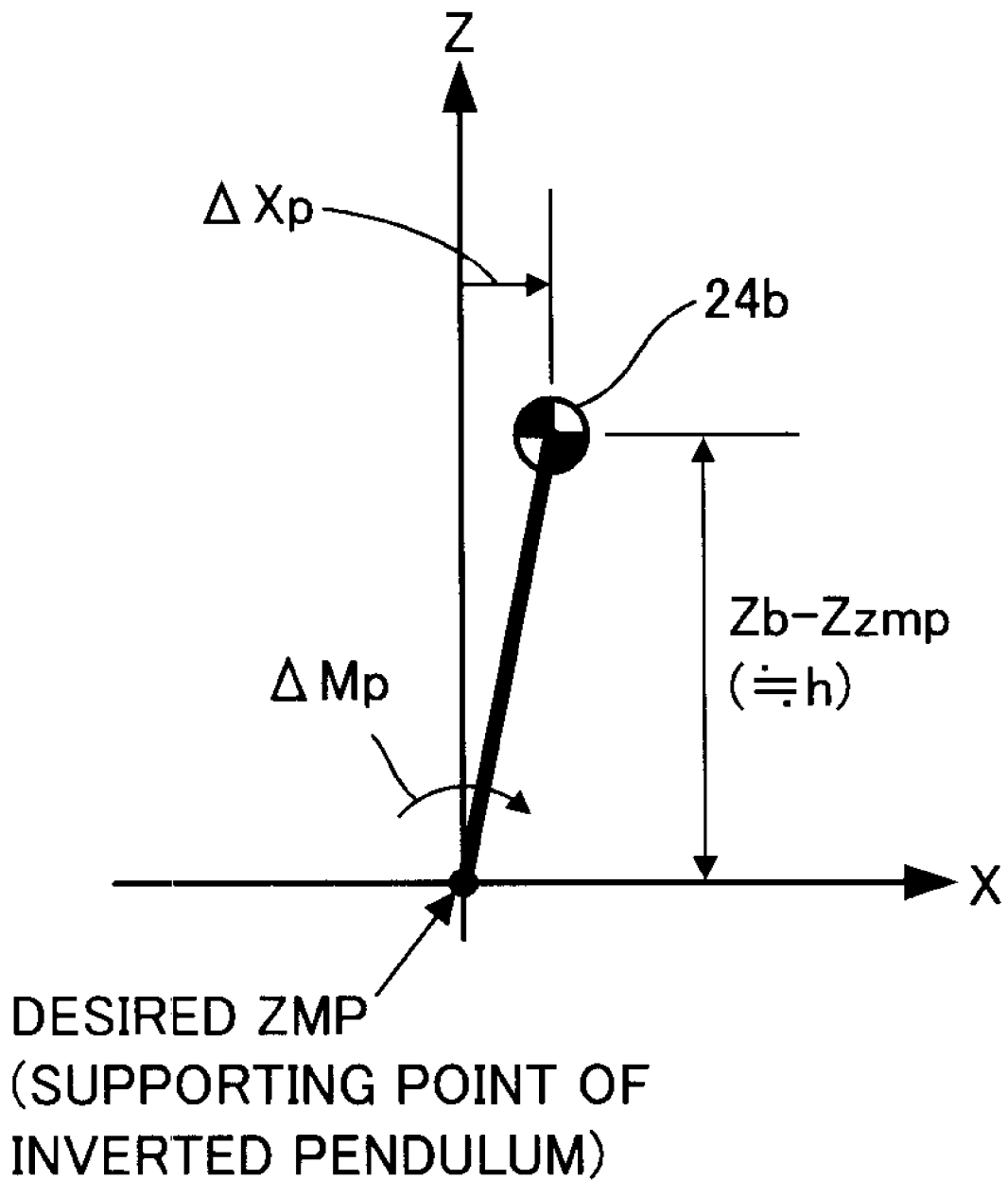
FIG. 22 is a graph visually illustrating a perturbation dynamic model used by a perturbation model calculator shown in FIG. 3.

Referring to FIG. 22, in a perturbation dynamic model used by the perturbation model calculator 120, the amount of deviation ΔXp of the body mass point 24b, which acts as the mass point of the inverted pendulum swinging with a desired ZMP as the supporting point thereof, in the horizontal direction from the position right above the desired ZMP (upper position in the vertical direction) corresponds to the perturbation amount in the horizontal position of the body 24. Further, the relationship between ΔXp and a perturbation floor reaction force moment ΔMp as the perturbation amount of the horizontal component of the floor reaction force moment about the supporting point (the desired ZMP) of the inverted pendulum is represented by, for example, expression 60 given below.

$$\Delta Mp = -mb^*\Delta Xp^*(g+d2Zb/dt2) + mb^*h^*(d2\Delta Xp/dt2) \quad \text{Expression 60}$$

The above expression 60 has replaced Mzmp_y, (Xb-Xzmp) of expression 04 related to the dynamic model for generating gaits by ΔMp and ΔXp, respectively, and also substituted (Zb-Zzmp) of the right side of expression 04 by a constant value h denoting the mean height of the body mass point 24b. To be more specific, ΔMp of expression 60 denotes a vector amount formed of a component about the X-axis and a component about the Y-axis. Similarly, ΔXp denotes a vector amount formed of a component in the X-axis direction and a component in the Y-axis direction.

Further, the perturbation model calculator 120 determines the body horizontal position perturbation amount according to expression 60, assuming that ΔXp of expression 60 corresponds to the body horizontal position perturbation amount to be output and the second model manipulation floor reaction force moment input from the total model manipulation floor reaction force moment distributor 118 corresponds to ΔMp of expression 60.

To be more specific, the perturbation model calculator 120 uses the time series of the second model manipulation floor reaction force moment, which is sequentially received, as the time series of ΔMp to sequentially calculate ΔXp that satisfies the dynamic relationship of expression 60. In this case, the instantaneous value of (g+d2Zb/dt2) of the right side of expression 60 (or the instantaneous value of mb*(g+d2Zb/dt2)) necessary for calculating ΔXp is calculated on the basis of the floor reaction force vertical component trajectory parameters (the latest floor reaction force vertical component trajectory parameters) of the current time's gait determined in S606 of FIG. 16 by the gait generator 100. The calculation method is the same as that for calculating the value of (g+d2Zb/dt2) during the processing in S220 of FIG. 14 described above.

Subsequently, the perturbation model calculator 120 outputs the calculated ΔXp as the body horizontal position perturbation amount to the body position/posture corrector 122. Incidentally, the ΔXp is initialized to zero at the timing when the determination result in S016 of FIG. 8 is switched to be affirmative (at the aforesaid gait changeover), i.e., the timing when the generation of a new current time's gait by the gait generator 100 is begun.

This completes the detailed explanation of the processing carried out by the perturbation model calculator 120.

The processing by the feedback manipulated variable calculator 110 will now be described. Referring to FIG. 3, as described above, the feedback manipulated variable calculator 110 receives the actually measured value of an actual body posture angle, a corrected desired body posture angle, and the state amount of the perturbation dynamic model (the state amount of the perturbation model) used by the perturbation model calculator 120. According to the present embodiment, the perturbation model state amount input to the feedback manipulated variable calculator 110 is the body horizontal position perturbation amount ΔXp itself sequentially calculated by the perturbation model calculator 120.

Further, the feedback manipulated variable calculator 110 includes the posture stabilization control calculator 112, which calculates an actual posture compensating total floor reaction force moment as the feedback manipulated variable having the function for converging the aforesaid body posture angle error, which indicates the difference between the actually measured value of the actual body posture angle and a corrected desired body posture angle, to zero according to a predetermined feedback control law, the model stabilization control calculator 114 which calculates a model state compensating total floor reaction force moment as the feedback manipulated variable having the function for converging the model state amount error, which indicates the difference between the perturbation model state amount ΔXp and a predetermined desired value therefore, to zero according to a predetermined feedback control law, and a compensating total floor reaction force moment distributor 116, which determines the aforesaid desired floor reaction force moment for compliance control and the total model manipulation floor reaction force moment from the actual posture compensating total floor reaction force moment and the model state compensating total floor reaction force moment, respectively.

The aforesaid actual posture compensating total floor reaction force moment indicates the required value of the floor reaction force moment to be additionally applied about a desired ZMP to the actual robot 1 in order to converge the body posture angle error to zero. The model state compensating total floor reaction force moment indicates the required value of the floor reaction force moment to be additionally applied about the desired ZMP to the robot on the perturbation dynamic model in order to converge the model state amount error to zero.

According to the present embodiment, the desired value of the perturbation 1(model state amount ΔXp is zero. Hence, the model state amount error agrees with the perturbation model state amount ΔXp.

Supplementarily, each of the actual posture compensating total floor reaction force moment and the model state compensating total floor reaction force moment is specifically formed of a component in the roll direction (about the X-axis) and a component in the pitch direction (about the Y-axis). En the following description, the actual posture compensating total floor reaction force moment and the model state compensating total floor reaction force moment will be denoted by reference characters Mdmd and Mmdl, respectively. Further, the component of Mdmd in the roll direction (about the X-axis) and the component thereof in the pitch direction (about the Y-axis) will be denoted by Mdmdx and Mdmdy, respectively. Similarly, the component of Mmdl in the roll direction (about the X-axis) and the component thereof in the pitch direction (about the Y-axis) will be denoted by Mmdlx and Mmdly, respectively.

The processing by the posture stabilization control calculator 112 is carried out as described below. The posture stabilization control calculator 112 first calculates the body posture angle error Δθ from the actually measured value of the actual body posture angle and the corrected desired body posture angle, which has been received. Then, the posture stabilization control calculator 112 converts the body posture angle error Δθ into a positional error ΔX of the horizontal position of the body mass point 24b of the inverted pendulum model illustrated in FIG. 7 relative to the reference position (the horizontal position of the body mass point 24b corresponding to a desired body position/posture in the case where the body posture angle error Δθ is zero). More specifically, the body posture angle error Δθ is converted into the positional error ΔX as the perturbation amount of the horizontal position of the body mass point 24b according to the following expression 62. In expression 62, "h" denotes the constant value indicative of the mean height of the body mass point 24b.

$$\Delta X = h^* \Delta \theta \qquad \text{Expression 62}$$

ΔX is formed of a component in the X-axis direction and a component in the Y-axis direction. The component in the X-axis direction takes a value proportional to a value of the component of Δθ in the direction about the Y-axis, while the component in the Y-axis direction takes a value proportional to a value of the component of Δθ in the direction about the X-axis.

Further, the posture stabilization control calculator 112 calculates a velocity error ΔVx denoting the temporal change rate (in a differential value) of the positional error ΔX calculated as described above. The velocity error ΔVx may be determined by multiplying the difference between the actually measured value of the angular velocity of a body posture angle of the actual robot 1 (or the temporal change rate of the actually measured value of the body posture angle) and a corrected desired body posture angle by 2(1 the aforesaid constant value h.

Subsequently, the posture stabilization control calculator 112 calculates the actual posture compensating total floor reaction force moment Mdmd to converge ΔX to zero (so as to converge Δθ to zero) by carrying out the arithmetic processing of, for example, PD law (proportional-differential law) as a feedback control law.

More specifically, the posture stabilization control calculator 112 calculates Mdmd according to the following expression 64 from the positional error ΔX and the velocity error ΔVx calculated as described above.

$$Mdmd = Kx^* \Delta X + Kv^* \Delta Vx \qquad \text{Expression 64}$$

The reference characters Kx and Kv in the above expression 64 denote a proportional gain and a differential gain, respectively. In the present embodiment, the values of Kx and Kv are predetermined values, which are set beforehand.

In this case, more specifically, the component Mdmdy of Mdmd about the Y-axis is calculated according to expression 64 on the basis of the components of ΔX and ΔVx in the X-axis direction. Similarly, the component Mdmdx of Mdmd about the X-axis is calculated according to expression 64 on the basis of the components of ΔX and ΔVx in the Y-axis direction.

The values of Kx and Kv of expression 64 may be variably set, as necessary, according to a motional state of the robot 1. For example, one or both of the values of Kx and Kv may be variably determined according to the inertial force of the body mass point 24b in the vertical direction at current time defined by the floor reaction force vertical component trajectory parameters of the current time's gait determined in S606 of FIG. 16 by the gait generator 100, or according to the time series of the inertial force of the body mass point 24b in the vertical direction. This compensates for the influences of the inertial force in the vertical direction caused by a motion of the robot 1, thus making it possible to calculate the value of Mdmd that allows the body posture angle error Δθ to smoothly converge to zero.

The above has described in detail the processing carried out by the posture stabilization control calculator 112.

Incidentally, Mdmd may alternatively be calculated, for example, according to the PD law from the body posture angle error Δθ and the angular velocity error of the body posture angle, which is the temporal change rate thereof Further, the processing by the model stabilization control calculator 114 is carried out as follows. The model stabilization control calculator 114 first calculates the temporal change rate ΔVp(=dΔXp/dt) of the received model state amount error ΔXp. Then, as with the posture stabilization control calculator 112, the model stabilization control calculator 114 calculates the model state compensating total floor reaction force moment Mmdl by, for example, the arithmetic processing based on the PD law used as the feedback control law such that ΔXp converges to zero.

More specifically, the model stabilization control calculator 114 calculates Mmdl according to the following expression 66 from the received model state amount error ΔXp and the temporal change rate ΔVp thereof.

$$Mmdl = Ka * \Delta Xp + Kb * \Delta Vp \quad \text{Expression 66}$$

The reference characters Ka and Kb in the above expression 66 denote a proportional gain and a differential gain, respectively. The values of Ka and Kb in the present embodiment are predetermined values set beforehand.

In this case, more specifically, the component Mmdly of Mmdl about the Y-axis is calculated according to expression 66 on the basis of the components of ΔXp and ΔVp in the X-axis direction. Similarly, the component Mmdlx of Mmdl about the X-axis is calculated according to expression 66 on the basis of the components of ΔXp and ΔVp in the Y-axis direction.

As supplementarily explained in relation to Kx and Kv in the aforesaid expression 64, the values of Ka and Kb in expression 66 may variably set according to the motional state of the robot 1 (e.g., the motional state of the body 24 in the vertical direction).

This completes the detailed explanation of the processing carried out by the posture stabilization control calculator 112.

Then, the compensating total floor reaction force moment distributor 116 of the feedback manipulative variable calculator 110 determines the desired floor reaction force moment for compliance control and the total model manipulation floor reaction force moment from the actual posture compensating total floor reaction force moment Mdmd and the model state compensating total floor reaction force moment Mmdl, which have been calculated as described above, by carrying out the processing described below.

Figure 23:
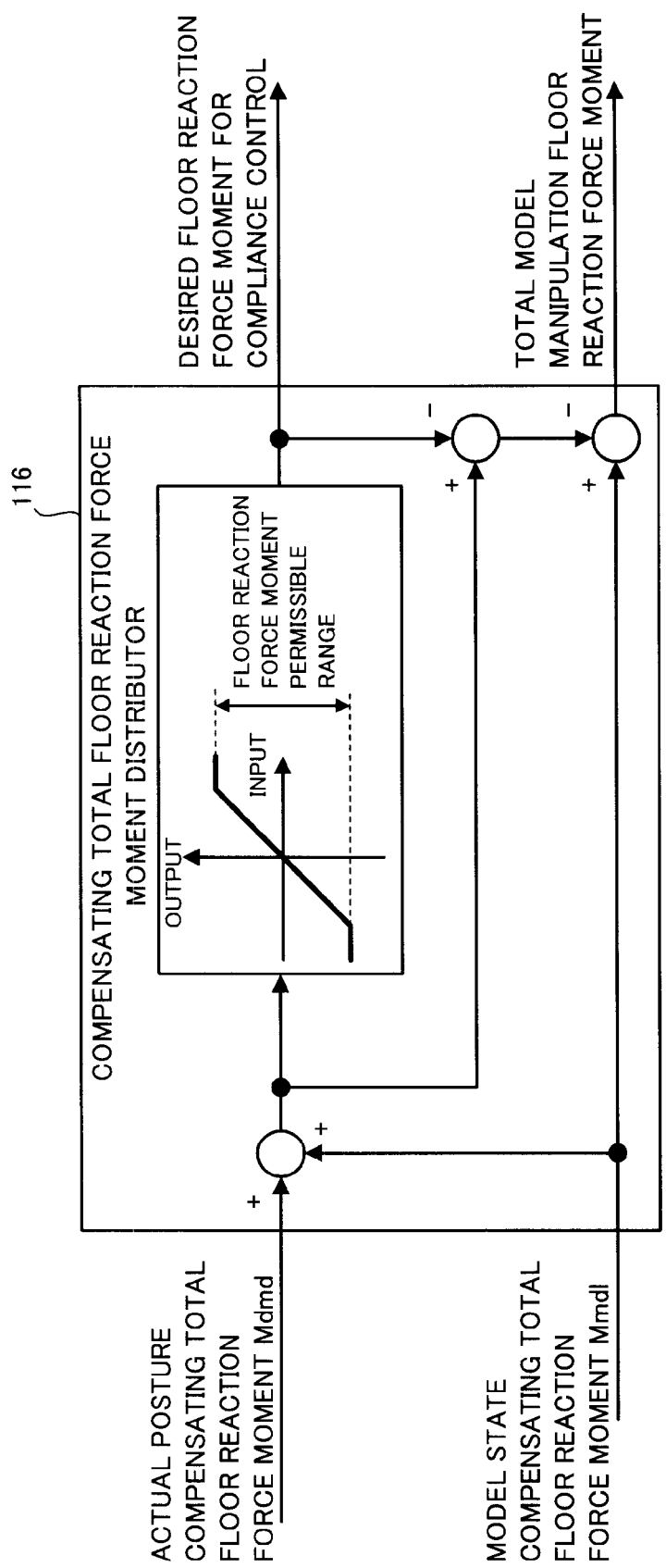
FIG. 23 is a block diagram illustrating the processing by a compensating total floor reaction force moment distributor shown in FIG. 3.

The compensating total floor reaction force moment distributor 116 determines the component in the roll direction (about the X-axis) and the component in the pitch direction (about the Y-axis) of each of the desired floor reaction force moment for compliance control and the total model manipulation floor reaction force moment by carrying out the processing illustrated in the block diagram of FIG. 23.

More specifically, the floor reaction force moment for compliance control and the model manipulation floor reaction force moment are determined according to expressions 68a, 68b, and 68c given below. In expressions 68a to 68c, Mdmd denotes each of the components (Mdmdx or Mdmdy) in the roll direction (about the X-axis) and the pitch direction (about the Y-axis). The same applies to Mmdl in expressions 68a to 68c. The floor reaction force moment permissible range means the floor reaction force moment permissible range of each of the components in the roll direction (about the X-axis) and the pitch direction (about the Y-axis). The floor reaction force moment permissible range indicates the value (the latest value) calculated by the gait generator 100 in S1008 in FIG. 21.

In the case where Mdmd+Mmdl>Upper limit value of floor reaction force moment permissible range:

Floor reaction force moment for compliance control=Upper limit value of floor reaction force moment permissible range Total model manipulation floor reaction force moment=Mmdl−(Mdmd+Mmdl−Upper limit value of floor reaction force moment permissible range)=−(Mdmd−Upper limit value of floor reaction force moment permissible range)    Expression 68a In the case where Mdmd+Mmdl<Lower limit value of floor reaction force moment permissible range:

Floor reaction force moment for compliance control=Lower limit value of floor reaction force moment permissible range Model manipulation floor reaction force moment=Mmdl−(Mdmd+Mmdl−Lower limit value of floor reaction force=moment permission range)=−(Mdmd−Lower limit value of floor reaction force moment permissible range)    Expression 68b In the case where Lower limit value of floor reaction force moment permissible range Mdmd+Mmdl≦Upper limit value of floor reaction force moment permissible range:

Floor reaction force moment for compliance control=Mdmd+Mmdl Model manipulation floor reaction force moment=Mmdl    Expression 68c In the above expressions 68a to 68c, Mdmd+Mmdl (more specifically Mdmdx+Mmdlx or Mdmdy+Mmdly) itself has been compared with the floor reaction force moment permissible range. Essentially, however, the moment obtained by adding Mdmd−Mmdl to the reference instantaneous value of a floor reaction force moment about a desired ZMP should be compared with the floor reaction force moment permissible range according to the above expressions 68a to 68c. The reference instantaneous value indicates the moment about a desired ZMP of a desired total floor reaction force generated by the gait generator 100 in the case where it is assumed that both the body posture angle error Δθ and the model state amount error ΔXp are steadily maintained at zero.

In this case, according to the present embodiment, the reference instantaneous value of a floor reaction force moment about the desired ZMP is steadily zero for both components in the roll direction (about the X-axis) and in the pitch direction (about the Y-axis). Hence, the result obtained by adding Mdmd+Mmdl to the reference instantaneous value is equivalent to Mdmd+Mmdl. For this reason, in the aforesaid expressions 68a to 68c. Mdmd+Mmdl (more specifically, Mdmdx+Mmdlx or Mdmdy+Mmdly) is directly compared with a floor reaction force moment permissible range.

Supplementarily, as an alternative, the gait generator 100 may output the floor reaction force moment permissible range parameters determined by the gait generator 100 in S030 of FIG. 8 to the compensating total floor reaction force moment distributor 116. Then, in the distributor 116, the instantaneous value of the floor reaction force moment permissible range may be determined sequentially (at the control cycle of the distributor 116) on the basis of the floor reaction force moment permissible range parameters.

The above has explained in detail the processing by the compensating total floor reaction force moment distributor 116.

If the result of Mdmd+Mmdl (Mdmdx+Mmdlx or Mdmdy+Mmdly) on each component in the roll direction (about the X-axis) and the pitch direction (about the Y-axis) obtained by the arithmetic processing carried out by the compensating total floor reaction force moment distributor 116 described above falls within a floor reaction force moment permissible range, then Mdmd+Mmdl is directly determined as a desired floor reaction force moment for compliance control. Further, Mmdl is determined as a total model manipulation floor reaction force moment.

If the result of Mdmd+Mmdl on each of the components in the roll direction (about the X-axis) and the pitch direction (about the Y-axis) deviates from the floor reaction force moment permissible range, then the boundary value of either the upper limit value or the lower limit value of the floor reaction force moment permissible range, whichever is closer to the result of Mdmd+Mmdl is determined as the desired floor reaction force moment for compliance control. Further, the sum of the moment, which is obtained by reversing the sign of the amount of the deviation of Mdmd+Mmdl from the floor reaction force moment permissible range (=Mdmd+Mmdl−Boundary value of the floor reaction force moment permissible range), and Mmdl is determined as the total model manipulation floor reaction force moment.

Consequently, therefore, on each component in the roll direction (about the X-axis) and the pitch direction (about the Y-axis), the floor reaction force moment for compliance control and the total model manipulation floor reaction force moment are determined such that the difference between the floor reaction force moment for compliance control and the total model manipulation floor reaction force moment agrees with the actual posture compensating total floor reaction force moment Mdmd independently of the model state compensating total floor reaction force moment, as indicated by expression 70 given below.

Desired floor reaction force moment for compliance control−Model manipulation floor reaction force moment=Mdmd           Expression 70

In other words, the floor reaction force moment for compliance control and the total model manipulation floor reaction force moment are determined such that the difference between the floor reaction force moment for compliance control and the total model manipulation floor reaction force moment functions to cause the body posture angle error $\Delta\theta$ to converge to zero.

In this case, if the floor reaction force moment permissible range has an allowance for Mdmd (if Mdmd falls within the permissible range), then all or a part of Mmdl will be additionally included in the floor reaction force moment for compliance control and the total model manipulation floor reaction force moment as the constituent components thereof within a range wherein the desired floor reaction force moment for compliance control falls within the floor reaction force moment permissible range.

The processing by the total model manipulation floor reaction force moment distributor 118 will now be described.

In the processing for generating a desired gait by the gait generator 100, the trajectory of a desired motion of a current time's gait is determined such that the trajectory will converge (gradually approach) to a motion trajectory of a normal gait in the future. To generate such a desired motion, the ZMP trajectory parameters of the current time's gait are corrected as necessary. Further, if the instantaneous value of a desired ZMP defined by the ZMP trajectory parameters after a correction deviates from a predetermined permissible range, then the expected landing position/posture of the free leg foot 22 of the current time's gait or the expected landing position/posture of the free leg foot 22 of the next time's gait are corrected as necessary.

The gait generator 100 is required to carry out the processing at each control cycle so that the control cycle (the arithmetic processing cycle) $\Delta t$ of the gait generator 100 has to be set to longer time to ensure a certain allowance.

Meanwhile, in the case where, for example, the robot 1 travels at a relatively high traveling speed, the body posture angle error $\Delta\theta$ of the robot 1 easily develops a quick change accordingly. This causes a high frequency component of a cycle shorter than the control cycle $\Delta t$ of the gait generator 100 to be easily included in the body posture angle error $\Delta\theta$. If such a high frequency component is included in the body posture angle error $\Delta\theta$, then it is difficult to reflect the high frequency component on the processing for generating a gait by the gait generator 100 (the processing in S032 of FIG. 8 in the present embodiment). This makes it difficult for the gait generator 100 to sequentially generate an instantaneous value of a desired gait that allows the body posture angle error $\Delta\theta$ containing the high frequency component to smoothly converge to zero.

To avoid the aforesaid problem, according to the present embodiment, the processing carried out by the perturbation model calculator 120 and other functions of the control unit 26 illustrated by the block diagram of FIG. 8 excluding the gait generator 100 is carried out at a control cycle (an arithmetic processing cycle) shorter than that of the gait generator 100. The time series of the instantaneous value of the motion of a desired gait that makes it possible to converge a relatively gentle change (a low frequency component) in the body posture angle error $\Delta\theta$ to zero is determined by the processing for generating a gait carried out by the gait generator 100. Further, the body horizontal position perturbation amount $\Delta Xp$ is determined by using the perturbation dynamic model as the motional correction amount (the correction amount of a desired motion generated by the gait generator 100) for converging the relatively quick change (the high frequency component) in $\Delta\theta$ to zero.

In order to carry out the gait generation processing by the gait generator 100 and the processing for determining the body horizontal position perturbation amount $\Delta Xp$ as described above, according to the present embodiment, the total model manipulation floor reaction force moment distributor 118 divides the total model manipulation floor reaction force moment sequentially received from the compensating total floor reaction force moment distributor 116 of the feedback manipulated variable calculator 110 into a low frequency component and a high frequency component. Then, out of the low frequency component and the high frequency component, the feedback manipulated variable calculator 110 outputs the low frequency component as a first model manipulation floor reaction force moment to be fed back to the dynamic model (the dynamic model illustrated in FIG. 7) of the gait generator 100, and outputs the high frequency component as a second model manipulation floor reaction force moment to be fed back to the perturbation dynamic model (the perturbation dynamic model illustrated in FIG. 22) of the perturbation model calculator 120.

Figure 24:
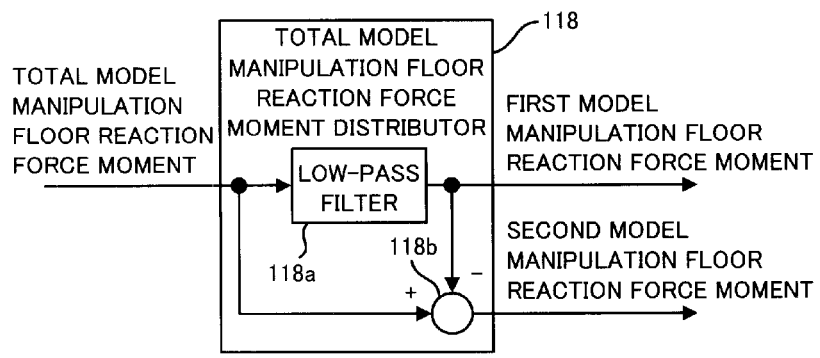
FIG. 24 is a block diagram illustrating the processing by a total model manipulation floor reaction force moment distributor shown in FIG. 3.

To be more specific, the aforesaid processing by the total model manipulation floor reaction force moment distributor 118 is implemented by the processing illustrated by the block diagram of FIG. 24.

The total model manipulation floor reaction force moment distributor 118 inputs the total model manipulation floor reaction force moment to a low-pass filter (high-cut filter) 118a, which is a filter having a low-pass characteristic, and determines an output of the low-pass filter 118a (i.e., the low frequency component of the total model manipulation floor reaction force moment) as the first model manipulation floor reaction force moment. The frequency characteristic of the low-pass filter 118a is set so as to allow the passage of a low frequency component having a cycle that is longer than the control cycle Δt of the gait generator 100.

Further, the total model manipulation floor reaction force moment distributor 118 subtracts the output of the low-pass filter 118a from the total model manipulation floor reaction force moment in a calculator 118b, and outputs the value obtained by the) calculation by the calculator 118b (i.e., the high frequency component obtained by removing the low frequency component from the total model manipulation floor reaction force moment) as the second model manipulation floor reaction force moment.

The above has explained in detail the processing carried out by the total model manipulation floor reaction force moment distributor 118.

Thus, the processing carried out by the total model manipulation floor reaction force moment distributor 118 determines the first model manipulation floor reaction force moment as a feedback manipulated variable that changes with higher sensitivity to a change in the low frequency component than to a change in the high frequency component out of the low frequency component and the high frequency component of the total model manipulation floor reaction force moment. Meanwhile, the second model manipulation floor reaction force moment is determined as a feedback manipulated variable that changes with higher sensitivity to a change in the high frequency component than to a change in the low frequency component out of the low frequency component and the high frequency component of the total model manipulation floor reaction force moment.

Supplementarily, the total model manipulation floor reaction force moment distributor 118 may be provided with a high-pass filter (low-cut filter), which is a filter of a high-pass characteristic, in addition to the low-pass filter 118a or in place of the low-pass filter 118a. Further, the total model manipulation floor reaction force moment may be input to the high-pass filter and the output of the high-pass filter may be obtained as the second model manipulation floor reaction force moment. In this case, if a high-pass filter is provided in place of the low-pass filter 118a, then the result obtained by subtracting the output of the high-pass filter from the total model manipulation floor reaction force moment (i.e., the low frequency component obtained by removing the high frequency component from the total model manipulation floor reaction force moment) may be determined as the first model manipulation floor reaction force moment.

The first model manipulation floor reaction force moment and the second model manipulation floor reaction force moment may include a part of the high frequency component and a part of the low frequency component, respectively, of the total model manipulation floor reaction force moment. More specifically, the first model manipulation floor reaction force moment may include a part of the high frequency component of the total model manipulation floor reaction force moment at a proportion that is smaller than that in the second model manipulation floor reaction force moment. Similarly, the second model manipulation floor reaction force moment may include a part of the low frequency component of the total model manipulation floor reaction force moment at a proportion that is smaller than that in the first model manipulation floor reaction force moment.

For instance, after dividing the total model manipulation floor reaction force moment into the low frequency component and the high frequency component, the first model manipulation floor reaction force moment or the second model manipulation floor reaction force moment may be determined by linearly coupling the low frequency component and the high frequency component with different weighting factors applied thereto (in other words, by calculating the weighted average of the low frequency component and the high frequency component).

According to the present embodiment described above, a desired motion obtained by replacing the body position/posture of the motion of a desired gait sequentially generated and output by the gait generator 100 by the aforesaid corrected desired body position/posture (hereinafter referred to as the corrected desired motion) is generated such that the total model manipulation floor reaction force moment is additionally produced about a desired ZMP on the dynamic model of the robot 1 (the dynamic model for generating gaits in FIG. 7 and the perturbation dynamic model in FIG. 22), while being controlled such that the total model manipulation floor reaction force moment will not be added to the floor reaction force of the actual robot 1.

Hence, there will be dynamic imbalance (or unbalance) between the corrected desired motion and the floor reaction force by the total model manipulation floor reaction force moment. This is equivalent to applying a floor reaction force having a sign reversed from that of the total model manipulation floor reaction force moment to the actual robot 1 about the desired ZMP from the viewpoint of the effect for converging the body posture angle error Δθ to zero.

In other words, the actual posture of the body 24 of the actual robot 1 can be converged to a desired posture (the body posture of the corrected desired body position/posture) and consequently the entire posture of the actual robot 1 can be stabilized by determining the total model manipulation floor reaction force moment as appropriate.

In this case, the sum of the moment with its sign reversed from that of the total model manipulation floor reaction force moment and the desired floor reaction force moment for compliance control provides a total restoring force (additional external force) for converging the body posture angle error Δθ to zero. In other words, the difference between the desired floor reaction force moment for compliance control and the model manipulation floor reaction force moment provides the total restoring force.

The total model manipulation floor reaction force moment can take any value, ignoring a ZMP-existable range, thus allowing an extremely high posture restoring force to be generated.

The total model manipulation floor reaction force moment is divided into the low frequency component and the high frequency component. Further, the low frequency component is fed back as the first model manipulation floor reaction force moment to the dynamic model of the gait generator 100 for generating gaits, while the high frequency component is fed back as the second model manipulation floor reaction force moment to the perturbation dynamic model used by the perturbation model calculator 120 to generate a correction amount of the body position/posture (body horizontal position perturbation amount).

In this case, the first model manipulation floor reaction force moment fed back to the gait generator 100 is in a low frequency zone, so that even when the control cycle of the gait generator 100 is set to a relatively long cycle, the first model manipulation floor reaction force moment can be properly reflected on gait generation in generating a desired gait. This means that it is possible for the gait generator 100 to generate the motion of a desired gait that allows the body posture angle error $\Delta\theta$, which exhibits a relatively gentle change, to smoothly approach to zero.

Moreover, since the control cycle of the gait generator 100 can be set to a longer cycle, processing with a relatively high arithmetic load, such as the processing for exploratorily determining normal gait parameters (e.g., the initial divergent component of a normal gait) or current time's gait parameters (e.g., the ZMP trajectory parameters of a current time's gait), can be implemented within one control cycle. This enables the gait generator 100 to determine a desired motion that makes it possible to secure, with high reliability, extended stability (continuity) of the motion of the robot 1.

In the present embodiment, the dynamic model for generating gaits in the gait generator 100 has used a relatively simple dynamic model (the inverted pendulum model). Alternatively, however, a more complicated dynamic model that permits higher dynamic accuracy to be secured (a dynamic model with higher non-linearity) may be used, since the control cycle of the gait generator 100 can be set to a longer cycle.

Meanwhile, the second model manipulation floor reaction force moment fed back to the perturbation model calculator 120 is in a high frequency zone. The perturbation model calculator 120 is required simply to be capable of calculating only a partial correction amount (the body horizontal position perturbation amount in the present embodiment) to be added to the motion of a desired gait (a desired motion providing a basic framework) output by the gait generator 100. Therefore, for the dynamic calculation by the perturbation model calculator 120, a simple perturbation dynamic model with high linearity may be used. As a result, even if the control cycle (arithmetic processing cycle) of the perturbation model calculator 120 or a functional unit, such as the total model manipulation floor reaction force moment distributor 118, which generates an input to the calculator 120 is set to a relatively short cycle, the processing by the perturbation model calculator 120 can be smoothly carried out within the control cycle.

Thus, even if the second model manipulation floor reaction force moment fed back to the perturbation model calculator 120 is in a high frequency zone, the second model manipulation floor reaction force moment can be properly reflected on the perturbation dynamic model of the perturbation model calculator 120 to generate a body horizontal position perturbation amount, which indicates the correction amount of the motion of a desired gait. In other words, it is possible for the perturbation model calculator 120 to generate a correction amount (the body horizontal position perturbation amount) of a motion of a desired gait that allows the body posture angle error $\Delta\theta$, which exhibits a relatively quick change, to smoothly approach to zero.

Further, according to the present embodiment, the aforesaid corrected desired motion is determined by making a correction on the basis of the motion of the desired gait generated by the gait generator 100 and the body horizontal position perturbation amount generated by the perturbation model calculator 120 as described above. Basically, the motion of the actual robot 1 is controlled so as to cause the motion of the actual robot 1 to follow the corrected desired motion.

As a result, the motion of the actual robot 1 can be controlled while sequentially determining a corrected desired motion that allows the body posture angle error $\Delta\theta$ to smoothly approach to zero independently of the frequency components of the total model manipulation floor reaction force moment having the function for bringing the body posture angle error $\Delta\theta$ close to zero.

Here, a supplementary description will be given of the relationship of correspondence between the present embodiment described above and the present invention.

In the present embodiment, the first motion determining unit in the present invention is implemented by the processing by the gait generator 100 (the processing illustrated by the flowchart of FIG. 8). In this case, the motion of a desired gait (desired foot position/posture, desired body position/posture, and a desired arm posture) sequentially output by the gait generator 100, i.e., the instantaneous values of the motion of a desired gait determined in 5032 of FIG. 8 correspond to the instantaneous values of the first motion in the present invention. The dynamic model illustrated in FIG. 7 (the inverted pendulum model in the present embodiment) corresponds to the first dynamic model in the present invention. Further, the first model manipulation floor reaction force moment used in the processing in S1010 of FIG. 21 corresponds to the first model external force manipulated variable in the present invention, and generating the first model manipulation floor reaction force moment about a desired ZMP with respect to the robot on the dynamic model illustrated in FIG. 7 corresponds to applying an additional external force to the robot.

Further, steps S020 to S031 carried out by the gait generator 100 at each control cycle implement the unit which variably determines leg motion parameters and ZMP trajectory parameters. In this case, the foot trajectory parameter and the ZMP trajectory parameter of a current time's gait parameters in the present embodiment correspond to the leg motion parameters and the ZMP trajectory parameters, respectively, in the present invention.

The processing by the perturbation model calculator 120 implements the second motion determining unit in the present invention. In this case, the perturbation dynamic model (the inverted pendulum model in the present embodiment) illustrated in FIG. 22 corresponds to the second dynamic model in the present invention. The body horizontal position perturbation amount sequentially output by the perturbation model calculator 120 corresponds to the instantaneous value of the second motion in the present invention. The second model manipulation floor reaction force moment corresponds to the second model external force manipulated variable in the present invention. Further, generating the second model manipulation floor reaction force moment about a desired ZMP with respect to the robot on the perturbation dynamic model illustrated in FIG. 22 corresponds to applying an additional external force to the robot in the present invention.

Further, the body position/posture corrector 122 corresponds the desired motion determining unit in the present invention. In the motion of a desired gait output by the gait generator 100, the aforesaid corrected desired motion, which has replaced desired body position/posture by corrected desired body position/posture (i.e., the set of desired foot position/posture, corrected desired body position/posture, and a desired arm posture), corresponds to the desired motion in the present invention.

The processing by the composite-compliance motion determiner 104, the robot geometric model 102, and the joint displacement controller 108 implement the motion control unit in the present invention. The motion control unit has a compliance function implemented by the processing carried out by the composite-compliance motion determiner 104.

Further, the processing carried out by the feedback manipulated variable calculator 110 implements the feedback manipulated variable determining unit in the present invention. In this case, the body posture angle error $\Delta\theta$ corresponds to the posture state amount error in the present invention. The total model manipulation floor reaction force moment corresponds to the basic manipulated variable for model in the present invention, and the desired floor reaction force moment for compliance control corresponds to the actual robot external force manipulated variable. Further, generating a desired floor reaction force moment for compliance control about a desired ZMP in the actual robot 1 corresponds to applying an additional external force to the robot 1.

The processing by the total model manipulation floor reaction force moment distributor 118 implements the model external force manipulated variable determining unit in the present invention. Further, the low-pass filter 118a provided in the total model manipulation floor reaction force moment distributor 118 corresponds to the filter having a low-pass characteristic in the present invention.

[Second Embodiment]

Figure 25:
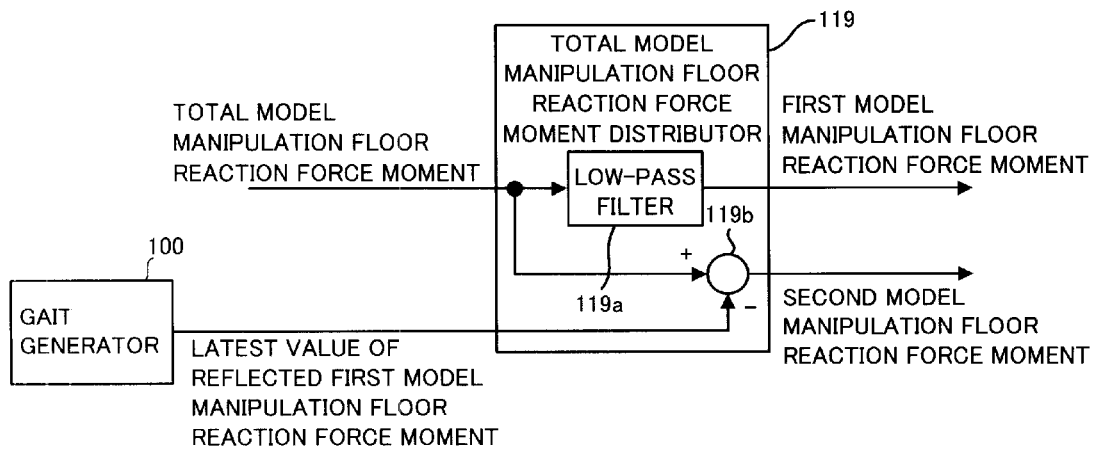
FIG. 25 is a block diagram illustrating the processing by a total model manipulation floor reaction force moment distributor in a second embodiment.

Referring now to FIG. 25, a second embodiment of the present invention will be described. The present embodiment differs from the first embodiment only partially in the processing carried out by a control unit 26. Hence, in the description of the present embodiment, for the constituent units or functional units that are equivalent to those in the first embodiment, the same reference numerals as those used in the first embodiment will be used, and detailed explanation thereof will be omitted.

The gait generator 100 described in the first embodiment uses an instantaneous value sampled at the control cycle (arithmetic processing cycle) $\Delta t$ of the gait generator 100 out of the time series of the first model manipulation floor reaction force moment output from the total model manipulation floor reaction force moment distributor 118, and carries out the processing for determining the instantaneous value of a current time's gait (the processing in S032 of FIG. 8). Hence, a change in the first model manipulation floor reaction force moment in a period of two consecutive control cycles of the gait generator 100 will not be reflected on the processing carried out by the gait generator 100 to determine the instantaneous value of the current time's gait.

In the present embodiment, therefore, a change in the first model manipulation floor reaction force moment during the period of two consecutive control cycles of the gait generator 100 is reflected on a perturbation dynamic model of a perturbation model calculator 120.

To be more specific., in the present embodiment, the control unit 26 has a total model manipulation floor reaction force moment distributor 119, which carries out the processing illustrated by the block diagram of FIG. 25, in place of the total model manipulation floor reaction force moment distributor 118 described in the first embodiment. The total model manipulation floor reaction force moment distributor 119 receives a total model manipulation floor reaction force moment from the feedback manipulated variable calculator 110 and also a latest value of the time series of the first model manipulation floor reaction force moment already used to determine the instantaneous value of a current time's gait during the processing in S032 of FIG. 8 by the gait generator 100 (hereinafter referred to as the latest value of the reflected first model manipulation floor reaction force moment) from the gait generator 100.

More specifically, the gait generator 100 stores and retains, as the latest value of the reflected first model manipulation floor reaction force moment, the latest value in the time series of the first model manipulation floor reaction force moment used to determine the instantaneous value of the current time's gait output at the present point until the instantaneous value of a current time's gait to be output is updated at each control cycle. Then, the gait generator 100 outputs the latest value of the reflected first model manipulation floor reaction force moment, which has been stored and retained, to the total model manipulation floor reaction force moment distributor 118. Hence, each time the instantaneous value of the current time's gait output from the gait generator 100 is updated, the latest value of the reflected first model manipulation floor reaction force moment is updated accordingly.

Alternatively, the latest value of the reflected first model manipulation floor reaction force moment may be stored and retained beforehand by a storage device separate from the gait generator 100 at a cycle synchronized with the control cycle of the gait generator 100, and the latest value of the reflected first model manipulation floor reaction force moment may be input to the total floor reaction force moment distributor 119 from the storage device.

In the present embodiment, the total model manipulation floor reaction force moment distributor 119 determines the first model manipulation floor reaction force moment, which is to be fed back to the gait generator 100, by the same processing as that in the first embodiment. More specifically, the total model manipulation floor reaction force moment distributor 119 inputs the total model manipulation floor reaction force moment to a low-pass filter 119a (high-cut filter) and determines an output from the low-pass filter 119a as the first model manipulation floor reaction force moment. The frequency pass characteristic of the low-pass filter 119a may be the same as that of the low-pass filter 118a in the first embodiment.

Meanwhile, the total model manipulation floor reaction force moment distributor 119 determines a second model manipulation floor reaction force moment, which is to be fed back to a perturbation model calculator 120, in a different way from that in the first embodiment. The total model manipulation floor reaction force moment distributor 119 carries out, by a calculator 119b, the processing for subtracting the received latest value of the reflected first model manipulation floor reaction force moment from the received total model manipulation floor reaction force moment, and then determines the value obtained from the calculation as the second model manipulation floor reaction force moment.

The above has described the processing carried out by the total model (manipulation floor reaction force moment distributor 119 in the present embodiment.

Supplementarily, the processing for determining the second model manipulation floor reaction force moment by the total model manipulation floor reaction force moment distributor 119 described above is equivalent to the processing for determining the second model manipulation floor reaction force moment by adding the difference between an output of the low-pass filter 119a and the latest value of the reflected first model manipulation floor reaction force moment to the result obtained by subtracting the output of the low-pass filter 119a from the total model manipulation floor reaction force moment (i.e., the high frequency component of the total model manipulation floor reaction force moment), as indicated by expression 72 given below.

Second model manipulation floor reaction force moment=(Total model manipulation floor reaction force moment−Output of the low-pass filter)+(Output of the low-pass filter−Latest value of reflected first model manipulation floor reaction force moment)      Expression 72

Thus, according to the present embodiment, a result obtained by superimposing a change in the first model manipulation floor reaction force moment during the period of two consecutive control cycles of the gait generator 100 (more specifically, the difference between the value of a low frequency component of the total model manipulation floor reaction force moment at current time and the latest value of the reflected first model manipulation floor reaction force moment) over a high frequency component of the total model manipulation floor reaction force moment (corresponding to the second model manipulation floor reaction force moment determined by the total model manipulation floor reaction force moment distributor 118 in the first embodiment) is determined as the second model manipulation floor reaction force moment.

The present embodiment is the same as the first embodiment except for the aspect described above.

Supplementarily, as an alternative, the total model manipulation floor reaction force moment may be input to a high-pass filter (low-cut filter), and the value obtained by subtracting the latest value of a reflected first model manipulation floor reaction force moment from the latest value of the low frequency component of the total model manipulation floor reaction force moment may be added to an output of the high-pass filter (a high frequency component), thereby determining the second model manipulation floor reaction force moment. In this case, the low-pass filter 119a may be omitted, and the first model manipulation floor reaction force moment as the low frequency component of the total model manipulation floor reaction force moment may be determined by subtracting an output of the high-pass filter from the total model manipulation floor reaction force moment.

According to the present embodiment described above, a change in the first model manipulation floor reaction force moment during the period of two consecutive control cycles of the gait generator 100 can be superimposed on the second model manipulation floor reaction force moment when fed back to the perturbation model calculator 120. Therefore, the aforesaid change in the first model manipulation floor reaction force moment, which will not be reflected on the gait generation processing carried out by the gait generator 100, can be reflected on the body horizontal position perturbation amount calculated by the perturbation model calculator 120 (the correction amount of the motion of a desired gait output by the gait generator 100).

As a result, the motion of the actual robot 1 can be controlled while sequentially determining a corrected desired motion that allows the body posture angle error Δθ to further smoothly approach to zero independently of the frequency components of the total model manipulation floor reaction force moment.

The relationship of correspondence between the present embodiment and the present invention is the same as that of the first embodiment.

[Third Embodiment]

Figure 26:
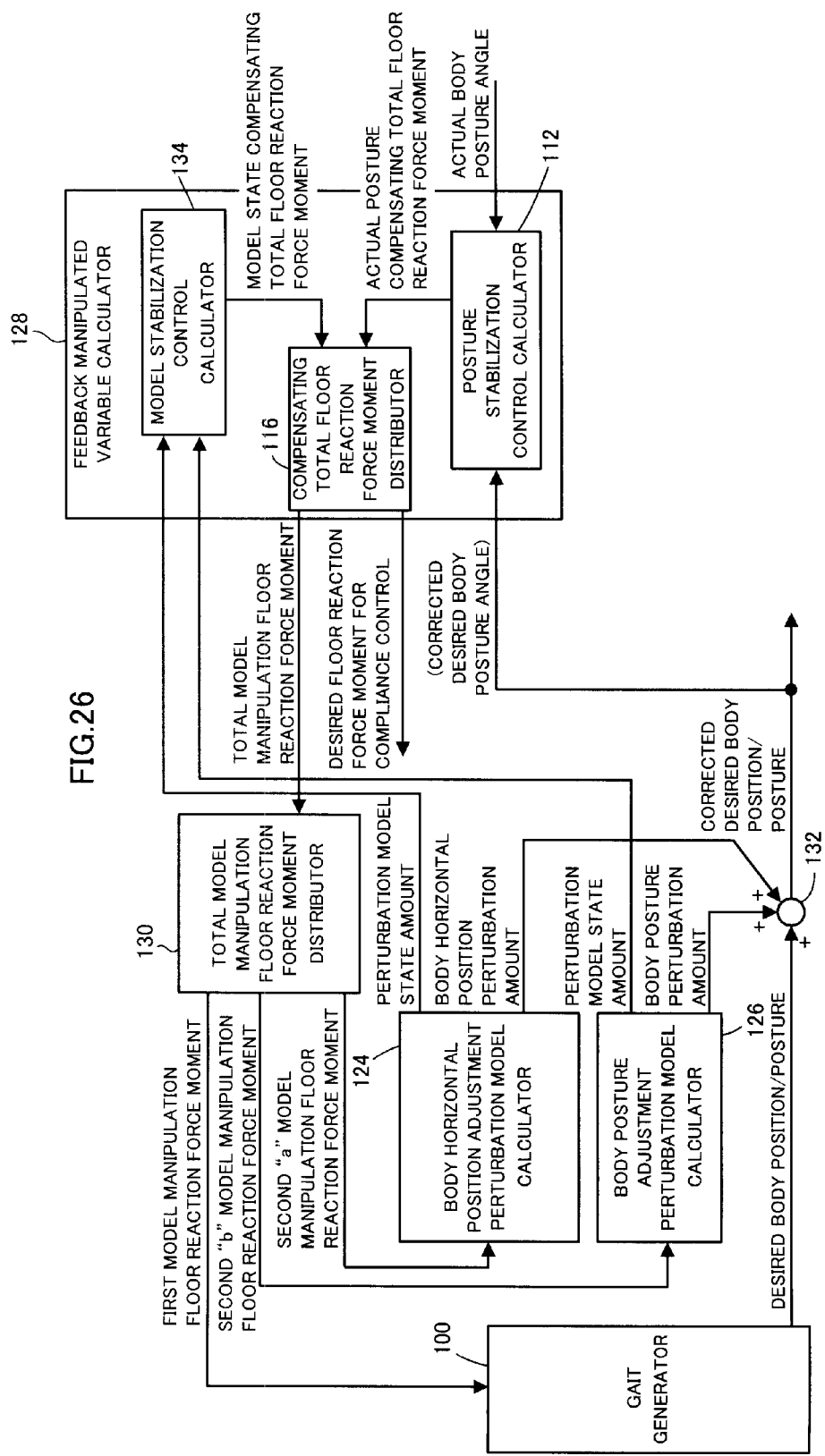
FIG. 26 is a block diagram illustrating the functional construction of an essential section of a control unit in a third embodiment.
Figure 27:
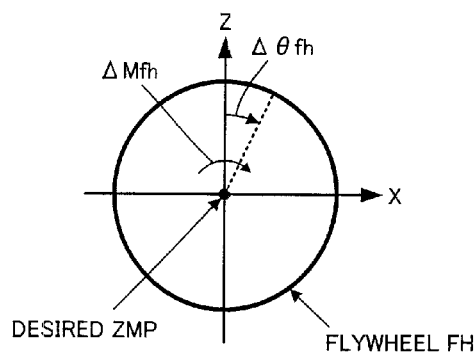
FIG. 27 is a diagram visually illustrating a perturbation dynamic model used by a body posture adjusting perturbation model calculator shown in FIG. 26.
Figure 28:
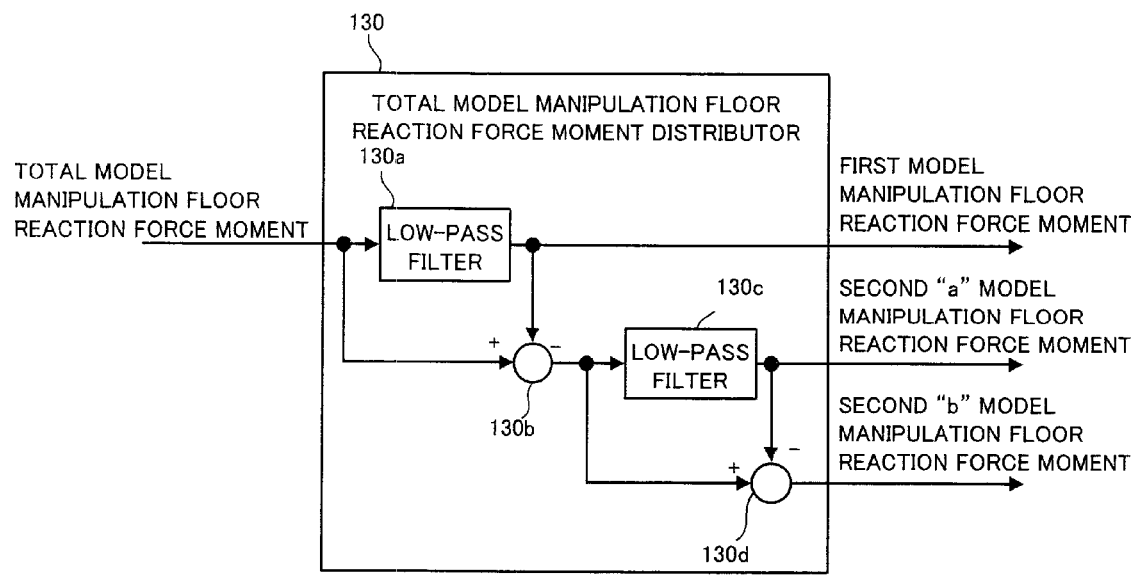
FIG. 28 is a block diagram illustrating the processing by a total model manipulation floor reaction force moment distributor shown in FIG. 26.

Referring now to FIG. 26 to FIG. 28, a third embodiment of the present invention will be described. The present embodiment differs from the first embodiment only partially in the processing carried out by a control unit 26. Hence, in the description of the present embodiment, for the constituent units or functional units that are equivalent to those in the first embodiment, the same reference numerals as those used in the first embodiment will be used, and detailed explanation thereof will be omitted.

In the first embodiment, the second model manipulation floor reaction force moment as the high frequency component of the total model manipulation floor reaction force moment has been fed back to the inverted-pendulum type perturbation dynamic model (the dynamic model in FIG. 22), and the body horizontal position perturbation amount indicative of the correction amount of a desired body position/posture has been calculated by the perturbation model calculator 120 such that the second model manipulation floor reaction force moment is generated on the perturbation dynamic model by the perturbation of the body horizontal position of the body position/posture of the robot 1.

In comparison with the first embodiment, according to the present embodiment, the body position/posture perturbation amounts (more specifically, the pair of a body horizontal position perturbation amount and a body posture perturbation amount) indicative of the correction amounts of desired body position/posture are determined such that the second model manipulation floor reaction force moment is generated on a perturbation dynamic model by a perturbation motion combining the perturbation of a body horizontal position and the perturbation of a body posture angle. In this case, according to the present embodiment, the perturbation amount of the body horizontal position and the perturbation amount of the body posture constituting the perturbation amounts of the body position/posture are determined by using separate perturbation dynamic models. Then, the desired body position/posture generated by the gait generator 100 are corrected on the basis of the body position/posture perturbation amounts, thus sequentially calculating corrected desired body position/posture (instantaneous values).

The control unit 26 in the present embodiment has the functional construction illustrated in FIG. 26 to calculate the perturbation amounts of the body position/posture as described above. For the purpose of convenience, FIG. 26 shows only a major functional section of the control unit 26 in the present embodiment. Further, FIG. 26 omits illustrating the actual robot 1, the robot geometric model 102, the composite-compliance motion determiner 104, the desired floor reaction force distributor 106, and the joint displacement controller 108 shown in FIG. 3 in relation to the first embodiment. These omitted elements are the same as those in the first embodiment.

First, a schematic description will be given. In the preset embodiment, the control unit 26 has, in place of the perturbation model calculator 120 described in the first embodiment, a body horizontal position adjustment perturbation model calculator 124 and a body posture adjustment perturbation model calculator 126, which sequentially calculate the body horizontal position perturbation amount and the body posture perturbation amount of the aforesaid body position/posture perturbation amounts by using separate perturbation dynamic models.

Further, the control unit 26 has a feedback manipulated variable calculator 128, a total model manipulation floor reaction force moment distributor 130, and a body position/posture corrector 132 in place of the feedback manipulated variable calculator 110, the total model manipulation floor reaction force moment distributor 118, and the body position/posture corrector 122 in the first embodiment.

According to the present embodiment, the feedback manipulated variable calculator 128 determines a total model manipulation floor reaction force moment and a desired floor reaction force moment for compliance control as a feedback manipulated variable having a function for converging the body posture angle error $\Delta\theta$ (the difference between the actually measured value of an actual body posture angle of the robot 1 and a corrected desired body posture angle) to zero and a function for converging a model state amount error, which indicates the difference between the state amount of a perturbation dynamic model (perturbation model state amount) to be discussed later, which is used by the body horizontal position adjustment perturbation model calculator 124 and the body posture adjustment perturbation model calculator 126, respectively, and a desired value corresponding to each thereof, to zero.

In this case, the total model manipulation floor reaction force moment in the present embodiment is a feedback manipulated variable for all of the dynamic model of the gait generator 100 for generating gaits and the perturbation dynamic model of each of the body horizontal position adjustment perturbation model calculator 124 and the body posture adjustment perturbation model calculator 126.

The desired floor reaction force moment for compliance control is a feedback manipulated variable for the actual robot 1, as with the first embodiment.

Further, in the present embodiment, the total model manipulation floor reaction force moment distributor 130 sequentially determines a first model manipulation floor reaction force moment of the total model manipulation floor reaction force moment received from the feedback manipulated variable calculator 128, the first model manipulation floor reaction force moment serving as a manipulated variable component to be fed back to the gait generator 100. The total model manipulation floor reaction force moment distributor 130 also sequentially determines a second "a" model manipulation floor reaction force moment serving as a manipulated variable component to be fed back to the body horizontal position adjustment perturbation model calculator 124, and a second "b" model manipulation floor reaction force moment serving as a manipulated variable component to be fed back to the body posture adjustment perturbation model calculator 126.

In this case, as with the first embodiment, the first model manipulation floor reaction force moment is a low frequency component of the total model manipulation floor reaction force moment. Further, the second "a" model manipulation floor reaction force moment and the second "b" model manipulation floor reaction force moment have been separated from a high frequency component obtained by removing the first model manipulation floor reaction force moment from the total model manipulation floor reaction force moment.

Further, the body horizontal position adjustment perturbation model calculator 124 uses the time series of the second "a" model manipulation floor reaction force moment received from the total model manipulation floor reaction force moment distributor 130 to sequentially calculate the body horizontal position perturbation amount (instantaneous value). The body posture adjustment perturbation model calculator 126 uses the time series of the second "a" model manipulation floor reaction force moment received from the total model manipulation floor reaction force moment distributor 130 to sequentially calculate the body posture perturbation amount (instantaneous value).

The body horizontal position perturbation amount, the body posture perturbation amount, and the desired body position/posture output from the gait generator 100 are sequentially input to the body position/posture corrector 132. The body position/posture corrector 132 calculates corrected desired body position/posture by correcting the desired body position/posture received from the gait generator 100 on the basis of the body horizontal position perturbation amount and the body posture perturbation amount received from the body horizontal position adjustment perturbation model calculator 124 and the body posture adjustment perturbation model calculator 126, respectively.

More specifically, the body position/posture corrector 132 combines or adds the body horizontal position perturbation amount to the body horizontal position of the desired body position/posture received from the gait generator 100 thereby to determine the body horizontal position of the corrected desired body position/posture. The body position/posture corrector 132 combines or adds the body posture perturbation amount to the body posture angle of the desired body position/posture received from the gait generator 100 thereby to determine the body posture angle of the corrected desired body position/posture. The body vertical position of the corrected desired body position/posture is set to agree with the body vertical position of the desired body position/posture received from the gait generator 100.

The present embodiment is the same as the first embodiment except for the aspect of the processing by the body horizontal position adjustment perturbation model calculator 124, the body posture adjustment perturbation model calculator 126, the feedback manipulated variable calculator 128, the total model manipulation floor reaction force moment distributor 130, and the body position/posture corrector 132.

As with the first embodiment, the processing by the functional units other than the gait generator 100 of the control unit 26 is carried out at a control cycle (arithmetic processing cycle) that is shorter than that of the gait generator 100.

The following will explain in more detail the processing carried out by the body horizontal position adjustment perturbation model calculator 124, the body posture adjustment perturbation model calculator 126, the feedback manipulated variable calculator 128, and the total model manipulation floor reaction force moment distributor 130 in the present embodiment.

First, regarding the processing by the body horizontal position adjustment perturbation model calculator 124 and the body posture adjustment perturbation model calculator 126, the perturbation dynamic model used for the processing by the body horizontal position adjustment perturbation model calculator 124 is the same as the perturbation dynamic model used for the processing by the perturbation model calculator 120 in the first embodiment (the inverted pendulum model illustrated in FIG. 22, the dynamics thereof being denoted by expression 60 given above).

Further, the body horizontal position adjustment perturbation model calculator 124 uses the time series of the second "a" model manipulation floor reaction force moment sequentially determined by the total model manipulation floor reaction force moment distributor 130, which will be discussed later, as the time series of $\Delta Mp$ of the aforesaid expression 60, and carries out the same arithmetic processing as that by the perturbation model calculator 120 in the first embodiment thereby to sequentially calculate $\Delta Xp$ satisfying the dynamic relationship of expression 60 as the body horizontal position perturbation amount.

Meanwhile, the perturbation dynamic model used by the body posture adjustment perturbation model calculator 126 is a dynamic model that expresses the relationship between the perturbation motion of the body posture angle of the robot 1 and the perturbation of a floor reaction force moment about a desired ZMP. The perturbation dynamic model in the present embodiment is a model expressing motions in the form of behaviors of a flywheel illustrated in FIG. 27.

More specifically, in the perturbation dynamic model, the perturbation amount of the body posture angle of the robot 1 (to be more specific, the perturbation amount in each of the direction about the X-axis and the direction about the Y-axis) corresponds to the perturbation amount of a rotational angle $\Delta\theta fh$ of a flywheel FH having an inertia (inertial moment), and a perturbation moment $\Delta Mfh$ generated by the perturbation of the rotational angle $\Delta\theta th$ of the flywheel FH corresponds to the perturbation amount of the horizontal component of a floor reaction force moment about a desired ZMP. Further, the relationship between $\Delta\theta fh$ and $\Delta Mfh$ is represented by expression 74 given below.

$$\Delta Mfh = J^*(d2\Delta\theta fh/dt2) \qquad \text{Expression 74}$$

Here, J denotes a set value of the inertia of the flywheel FH. To be more specific, each of $\Delta Mfh$ and $\Delta\theta fh$ in expression 74 denotes a vector quantity formed of a component about the X-axis and a component about the Y-axis. In this case, the set values of the inertia J corresponding to the component about the X-axis and the component about the Y-axis, respectively, may be set to values that are different from each other.

Further, the body posture adjustment perturbation model calculator 126 determines the body posture perturbation amount according to expression 74, assuming that $\Delta\theta th$ in expression 74 corresponds to the body posture perturbation amount to be output and the second "b" model manipulation floor reaction force moment received from the total model manipulation floor reaction force moment distributor 130 corresponds to $\Delta Mfh$ expression 74.

To be more specific, the body posture adjustment perturbation model calculator 126 uses the time series of the second "b" model manipulation floor reaction force moment sequentially input as the time series of $\Delta Mfh$ to sequentially calculate $\Delta\theta fh$ that satisfies the dynamic relationship of expression 74. Then, the body posture adjustment perturbation model calculator 126 outputs the calculated $\Delta\theta fh$ as the body posture perturbation amount to the body position/posture corrector 122. Incidentally, $\Delta\theta fh$ is initialized to zero at the timing when the determination result in S016 of FIG. 8 switches to be affirmative (at the aforesaid changeover of a gait), i.e., at the timing when the generation of a new current time's gait by the gait generator 100 begins.

This completes the detailed explanation of the processing by the body horizontal position adjustment perturbation model calculator 124 and the body posture adjustment perturbation model calculator 126.

A description will now be given of the feedback manipulated variable calculator 128. The feedback manipulated variable calculator 128 includes a model stabilization control calculator 134, a posture stabilization control calculator 112, and a compensating total floor reaction force moment distributor 116. In this case, the processing carried out by the posture stabilization control calculator 112 and the compensating total floor reaction force moment distributor 116 is the same as that explained in the first embodiment, so that the explanation of the processing will not be repeated.

Meanwhile, the processing carried out by the model stabilization control calculator 134 is different from that in the first embodiment. To be more specific, the model stabilization control calculator 134 receives the state amounts of the perturbation dynamic models (perturbation model state amounts) of the body horizontal position adjustment perturbation model calculator 124 and the body posture adjustment perturbation model calculator 126. In this case, the perturbation model state amount input from the body horizontal position adjustment perturbation model calculator 124 is the body horizontal position perturbation amount $\Delta xp$ itself sequentially calculated by the perturbation model calculator 124. Further, the perturbation model state amount input from the body posture adjustment perturbation model calculator 126 is the body posture perturbation amount $\Delta\theta fh$ itself sequentially calculated by the perturbation model calculator 126.

The model stabilization control calculator 134 calculates, according to a predetermined feedback control law, a model state compensating total floor reaction force moment as the feedback manipulated variable having a function for converging the difference between the received perturbation model state amount $\Delta Xp$ and a predetermined desired value for the state amount $\Delta Xp$ (model state amount error) to zero and a function for converging the difference between the received perturbation model state amount $\Delta\theta fh$ and a predetermined desired value for the state amount $\Delta\theta fh$ (model state amount error) to zero. In this case, the desired values for the perturbation model state amounts $\Delta Xp$ and $\Delta\theta fh$ are both zero. Hence, the perturbation model state amounts $\Delta Xp$ and $\Delta\theta fh$ directly turn into the aforesaid model state amount errors.

To be more specific, the model stabilization control calculator 134 calculates the model state compensating total floor reaction force moment as described below. The model stabilization control calculator 134 calculates temporal change rates $\Delta Vp$ ($=d\Delta Xp/dt$) and $\Delta\omega fh$ ($=d\Delta\theta fh/dt$) of received model state amounts $\Delta Xp$ and $\Delta\theta fh$ (=model state amount errors). Then, the model stabilization control calculator 134 carries out arithmetic processing according to, for example, the PD law as a feedback control law thereby to calculate a first manipulated variable component Mmdl1 having a function for converging $\Delta Xp$ to zero and a second manipulated variable component Mmdl2 having a function for converging $\Delta\theta$ fh to zero, respectively, as the components of the model state compensating total floor reaction force moment Mmdl. The first manipulated variable component Mmdl1 and the second manipulated variable component Mmdl2 are manipulated variable components in the dimension of floor reaction force moment, and each of them is formed of a component in the pitch direction (direction about the Y-axis) and a component in the roll direction (direction about the X-axis).

More specifically, the model stabilization control calculator 134 calculates Mmdl1 according to expression 76 given below from the received model state amount error $\Delta Xp$ and the temporal change rate $\Delta Vp$ thereof. Further, the model stabilization control calculator 134 calculates Mmdl2 according to expression 78 given below from the received model state amount error $\Delta\theta fh$ and the temporal change rate $\Delta\omega fh$ thereof.

$$Mmdl1 = Ka^*\Delta Xp + Kb^*\Delta Vp \qquad \text{Expression 76}$$

$$Mmdl2 = Kc^*\Delta\theta fh + Kd^*\Delta\omega fh \qquad \text{Expression 78}$$

In the above expression 76, Ka and Kb denote a proportional gain and a differential gain, respectively. In expression 78, Kc and Kd denote proportional gains. The values of these Ka, Kb, Kc and Kd in the present embodiment take predetermined values set beforehand.

In this case, to be more specific, a component of Mmdl1 about the Y-axis, which is denoted by Mmdl1y, is calculated according to expression 76 on the basis of the components of $\Delta Xp$ and $\Delta Vp$ in the X-axis direction. A component of Mmdl1 about the X-axis, which is denoted by Mdmdx, is calculated according to expression 76 on the basis of the components of $\Delta Xp$ and $\Delta Vp$ in the Y-axis direction. A component of Mmdl2 about the Y-axis, which is denoted by Mmdl2y, is calculated according to expression 78 on the basis of the components of $\Delta\theta$fh and $\Delta\omega$fh in the Y-axis direction. A component of Mmdl2 about the X-axis, which is denoted by Mdmdx, is calculated according to expression 78 on the basis of the components of $\Delta\theta$fh and $\Delta\omega$fh in the direction about the X-axis.

Supplementarily, the right side of expression 76 is the same as the right side of the expression (the aforesaid expression 66) for calculating the model state compensating total floor reaction force moment Mmdl according to the PD law in the first embodiment. As with the case where the description has been given in relation to the aforesaid expression 66 in the first embodiment, the values of Ka and Kb in expression 76 may be variably set according to the motional state of the robot 1 (e.g., the inertial force of the robot 1 in the vertical direction). Similarly, the values of Kc and Kd in expression 78 may be variably set according to the motional state of the robot 1.

Further, the model stabilization control calculator 134 in the present embodiment combines or adds the first manipulated variable component Mmdl1 and the second manipulated variable component Mmdl2 calculated as described above thereby to calculate a model state compensating total floor reaction force moment. More specifically, the model stabilization control calculator 134 calculates the model state compensating total floor reaction force moment according to the following expression 80.

Model state compensating total floor reaction force moment=*Mmdl1+Mdml2*                         Expression 80

The above has explained in detail the processing by the model stabilization control calculator 134. This processing calculates the model state compensating total floor reaction force moment as the feedback manipulated variable having the function for causing the perturbation model state amount $\Delta$Xp of the body horizontal position adjustment perturbation model calculator 124 and the perturbation model state amount $\Delta\theta$fh of the body posture adjustment perturbation model calculator 126 to approach to zero.

In the present embodiment, the feedback manipulated variable calculator 128 sequentially determines the total model manipulation floor reaction force moment and the desired floor reaction force moment for compliance control by the processing carried out by the compensating total floor reaction force moment distributor 116 (the processing illustrated by the block diagram of FIG. 23) explained in the first embodiment on the basis of the model state compensating total floor reaction force moment calculated by the model stabilization control calculator 134 as described above and the actual posture compensating total floor reaction force moment calculated as described above by the posture stabilization control calculator 112.

A description will now be given of the total model manipulation floor reaction force moment distributor 130. The total model manipulation floor reaction force moment distributor 130 sequentially determines the first model manipulation floor reaction force moment, the second "a" model manipulation floor reaction force moment, and the second "b" model manipulation floor reaction force moment by carrying out the processing illustrated by the block diagram of FIG. 28.

In this case, the first model manipulation floor reaction force moment is determined by the same processing as that in the first embodiment. More specifically, the total model manipulation floor reaction force moment distributor 130 supplies a total model manipulation floor reaction force moment input from the feedback manipulated variable calculator 128 to a low-pass filter 130a (high-cut filter), and determines an output of the low-pass filter 130a as the first model manipulation floor reaction force moment. The frequency pass characteristic of the low-pass filter 130a may be the same as that of the low-pass filter 118a in the first embodiment.

Further, the total model manipulation floor reaction force moment distributor 130 carries out the processing for subtracting the output of the low-pass filter 130a from the received total model manipulation floor reaction force moment by a calculator 130b thereby to obtain a high frequency component of the total model manipulation floor reaction force moment (corresponding to the second model manipulation floor reaction force moment in the first embodiment).

Further, the total model manipulation floor reaction force moment distributor 130 supplies the output (high frequency component) of the calculator 130b to a low-pass filter 130c (high-cut filter), and determines an output of the low-pass filter 130c as one of the second "a" model manipulation floor reaction force moment and the second "b" model manipulation floor reaction force moment, e.g., as the second "a" model manipulation floor reaction force moment.

Here, the low-pass filter 130c is a filter which has a frequency pass characteristic that permits the passage of a frequency component adjacent to a range that is higher than the range of the low-pass filter 130a (i.e., a frequency pass characteristic in which the cut-off frequency on the high frequency side is higher than that of the low-pass filter 130a).

Further, the total model manipulation floor reaction force moment distributor 130 carries out the processing for subtracting an output of the low-pass filter 130c (i.e., the second "a" model manipulation floor reaction force moment) from an output of the calculator 130b by a calculator 130d, then determines an output of the calculator 130d as the second "b" model manipulation floor reaction force moment.

Thus, according to the present embodiment, the floor reaction force moments are determined such that the frequency range of the second "a" model manipulation floor reaction force moment is higher than the frequency range of the first model manipulation floor reaction force moment and the frequency range of the second "b" model manipulation floor reaction force moment is higher than the frequency range of the second "a" model manipulation floor reaction force moment.

The above has described the processing by the total model manipulation floor reaction force moment distributor 130 in the present embodiment.

Supplementarily, regarding the processing by the total model manipulation floor reaction force moment distributor 130, as an alternative, for example, a total model manipulation floor reaction force moment may be input to a band-pass filter, and an output of the band-pass filter may be obtained as the second "a" model manipulation floor reaction force moment. Further alternatively, a total model manipulation floor reaction force moment (or an output of the calculator 130b) may be input to a high-pass filter (low-cut filter) and an output of the high-pass filter may be obtained as the second "b" model manipulation floor reaction force moment.

The order of generating the first model manipulation floor reaction force moment, the second "a" model manipulation floor reaction force moment and the second model manipulation floor reaction force moment may be different from the order illustrated by the block diagram of FIG. 28. For example, the second "a" model manipulation floor reaction force moment and the second "b" model manipulation floor reaction force moment may be generated from the total model manipulation floor reaction force moment by using a high-pass filter or a band-pass filter, and then the first model manipulation floor reaction force moment may be determined by subtracting the generated second "a" model manipulation floor reaction force moment and second "b" model manipulation floor reaction force moment from the total model manipulation floor reaction force moment.

Further alternatively, for example, the result obtained by subtracting the latest value of the reflected first model manipulation floor reaction force moment, which has been described in the second embodiment, from the total model manipulation floor reaction force moment (i.e., the second model manipulation floor reaction force moment in the second embodiment) may be used in place of the output of the calculator 130b of FIG. 28, thereby generating the second "a" model manipulation floor reaction force moment and the second model manipulation floor reaction force moment. In other words, the component on the low frequency side and the component on the high frequency side in the second model manipulation floor reaction force moment generated as explained in the second embodiment may be determined as the second "a" model manipulation floor reaction force moment and the second "b" model manipulation floor reaction force moment, respectively.

According to the present embodiment described above, the high frequency component obtained by removing the low frequency component (the first model manipulation floor reaction force moment) from the total model manipulation floor reaction force moment is further divided into two different moments, namely, the second "a" model manipulation floor reaction force moment on the low frequency side and the second "b" model manipulation floor reaction force moment on the high frequency side. Then, the second "a" model manipulation floor reaction force moment on the low frequency side and the second "b" model manipulation floor reaction force moment on the high frequency side are fed back to the body position adjustment perturbation model calculator 124 and the body posture adjustment perturbation model calculator 126, respectively, and the body horizontal position perturbation amount and the body posture perturbation amount are calculated on the basis of the aforesaid moments that have been fed back.

Thus, the function intended by the high frequency component of the total model manipulation floor reaction force moment (the function for bringing a relatively quick change in the body posture angle Δθ close to zero) is divided into the body horizontal position perturbation amount and the body posture perturbation amount for the two different types of perturbation motions.

Here, the perturbation of the body horizontal position is a perturbation motion which generates an inertial force of the body 24 in the horizontal direction (i.e., the inertial force of the overall center of gravity of the robot 1 in the horizontal direction), so that a frictional force between a foot 22 and a floor surface is required. As the inertial force in the horizontal direction increases, the required frictional force increases accordingly.

Meanwhile, the perturbation of the body posture does not cause a change in the horizontal position of the overall center of gravity of the robot 1 or makes it possible to restrain such a change to a sufficiently minute level. Hence, the perturbation of the body posture is not influenced by or hardly susceptible to the frictional force between a foot 22 and a floor surface.

Thus, according to the present embodiment, the function intended by the high frequency component of the total model manipulation floor reaction force moment is divided into the body horizontal position perturbation amount and the body posture perturbation amount as described above. The present embodiment, therefore, is capable of generating a corrected desired motion (a motion obtained by correcting the motion of a desired gait output by the gait generator 100 on the basis of a body horizontal position perturbation amount and a body posture perturbation amount) that makes it possible to restrain an excessive frictional force from being produced between a foot 22 of the robot 1 and a floor surface or to restrain an excessive change in the body posture from taking place.

Here, the relationship of correspondence between the present embodiment and the present invention will be supplementarily described. The processing by the body horizontal position adjustment perturbation model calculator 124 and the processing by the body posture adjustment perturbation model calculator 126 implement the second motion determining unit in the present invention. In this case, the second dynamic model in the present invention is implemented by the perturbation dynamic model illustrated in FIG. 22 (the inverted pendulum model in the present embodiment) and the perturbation dynamic model illustrated in FIG. 27 (the model expressed by means of the behaviors of the flywheel FH). Further, the pair of the body horizontal position perturbation amount and the body posture perturbation amount sequentially output by the perturbation model calculators 124 and 126, respectively, corresponds to the instantaneous value of the second motion in the present invention.

Further, the pair of the second "a" model manipulation floor reaction force moment and the second model manipulation floor reaction force moment corresponds to the second model external force manipulated variable in the present invention. Generating the second "a" model manipulation floor reaction force moment about a desired ZMP with respect to the robot on the perturbation dynamic model illustrated in FIG. 22 and generating the second "b" model manipulation floor reaction force moment about a desired ZMP with respect to the robot on the perturbation dynamic model illustrated in FIG. 27 correspond to applying an additional external force to the robot.

The relationship of correspondence between the present embodiment and the present invention except for the aspects described above is the same as that of the first embodiment.

Supplementarily, in the present embodiment, the second "a" model manipulation floor reaction force moment and the second "b" model manipulation floor reaction force moment have been fed back to the body horizontal position adjustment perturbation model calculator 124 and the body posture adjustment perturbation model calculator 126, respectively. Conversely, the second "a" model manipulation floor reaction force moment may be fed back to the body posture adjustment perturbation model calculator 126 and the second "b" model manipulation floor reaction force moment may be fed back to the body horizontal position adjustment perturbation model calculates 124.

Further, in the present embodiment, the high frequency component of the total model manipulation floor reaction force moment has been separated into a component on the low frequency side and a component on the high frequency side, and then these two types of components have been generated as the second "a" model manipulation floor reaction force moment and the second "b" model manipulation floor reaction force moment. However, as a simpler alternative, for example, a predetermined percentage of the entire high frequency component of the total model manipulation floor reaction force moment, which is obtained by multiplying the high frequency component by a magnification ratio α ($0<\alpha<1$), may be determined as the second "a" model manipulation floor reaction force moment, and the rest, which is obtained by multiplying the high frequency component by a magnification ratio (1-α), may be determined as the second "b" model manipulation floor reaction force moment.

[Fourth Embodiment]

Figure 29:
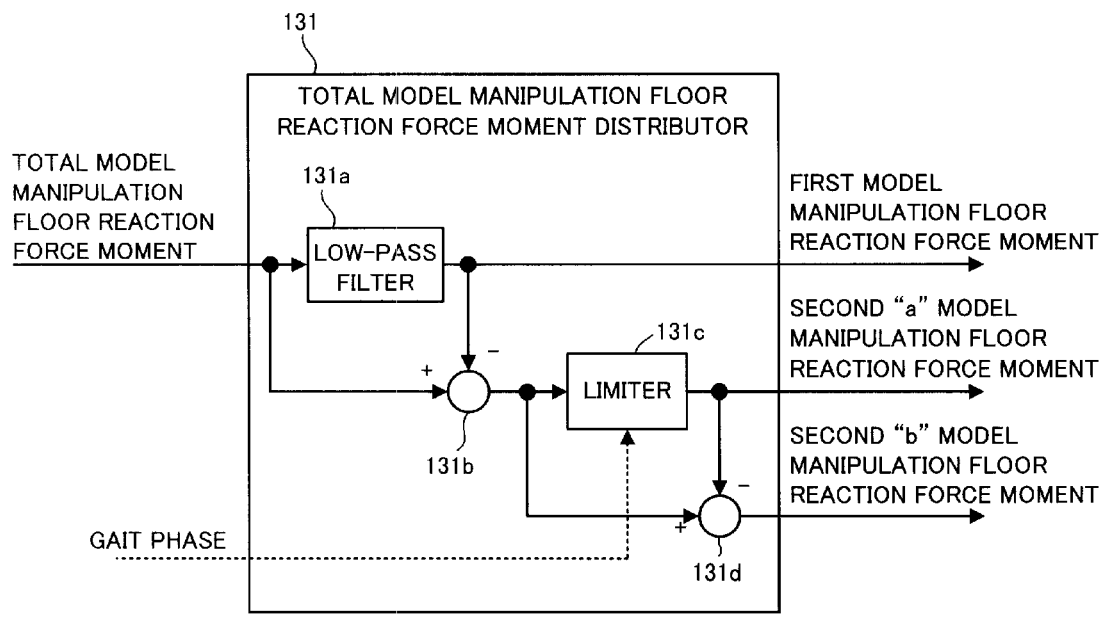
FIG. 29 is a block diagram illustrating the processing by a total model manipulation floor reaction force moment distributor in a fourth embodiment.
Figure 30:
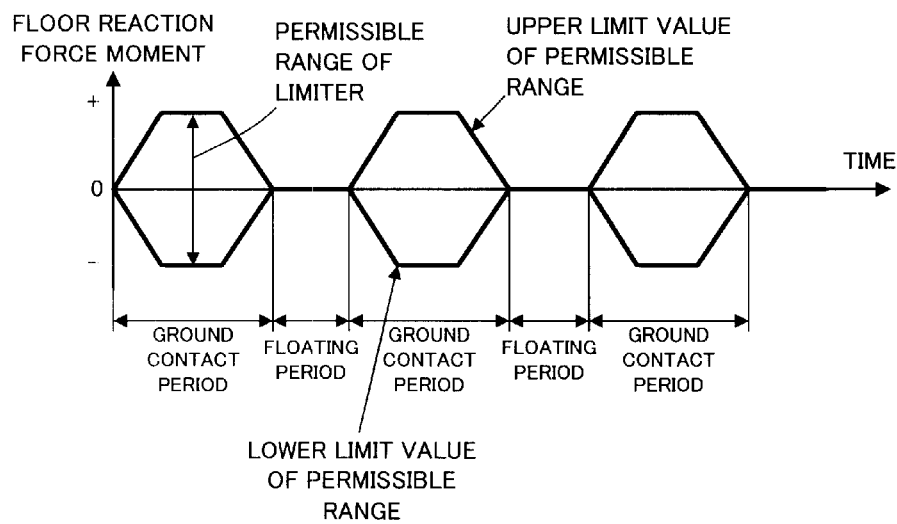
FIG. 30 is a graph illustrating temporal changes of a permissible range set by a limiter shown in FIG. 29.

Referring now to FIG. 29 and FIG. 30, a fourth embodiment of the present invention will be described. The present embodiment differs from the aforesaid third embodiment only in the processing carried out by the total model manipulation floor reaction force moment distributor. Hence, the constituent units or functional units except for the total model manipulation floor reaction force moment distributor will be assigned the like reference numerals as those used in the third embodiment, and detailed explanation thereof will be omitted.

Referring to FIG. 29, a total model manipulation floor reaction force moment distributor 131 in the present embodiment determines a first model manipulation floor reaction force moment, a first "a" model manipulation floor reaction force moment, and a first "b" model manipulation floor reaction force moment from a total model manipulation floor reaction force moment and outputs the determined moments, and outputs the determined moments, as with the third embodiment.

In this case, the total model manipulation floor reaction force moment distributor 131 determines the first model manipulation floor reaction force moment by the same processing as that in the third embodiment. More specifically, the total model manipulation floor reaction force moment distributor 131 inputs a received total model manipulation floor reaction force moment to a low-pass filter 131a (high-cut filter) and determines an output of the low-pass filter 131a as the first model manipulation floor reaction force moment. The frequency pass characteristic of the low-pass filter 131a may be the same as that of the low-pass filter 130a in the third embodiment.

Further, as with the third embodiment, the total model manipulation floor reaction force moment distributor 131 carries out, by a calculator 131b, the processing for subtracting the output of the low-pass filter 131a from the received total model manipulation floor reaction force moment, thereby obtaining a high frequency component of the total model manipulation floor reaction force moment.

In the present embodiment, a second "a" model manipulation floor reaction force moment and a second model manipulation floor reaction force moment are generated from the high frequency component by a different method from that in the third embodiment.

To be more specific, the total model manipulation floor reaction force moment distributor 131 inputs an output (high frequency component) of the calculator 131b to a limiter 131c, and determines an output of the limiter 131c as the second "a" model manipulation floor reaction force moment.

The limiter 131c sequentially and variably sets the permissible range of the second "a" model manipulation floor reaction force moment and outputs the second "a" model manipulation floor reaction force moment limited to the permissible range.

In this case, the limiter 131c receives, from a gait generator 100, gait timing information, which indicates the timing of a gait related to the instantaneous value of a desired gait (current time's gait) generated at current time by the gait generator 100. More specifically, the gait timing information indicates the timing of an instantaneous value of the desired gait generated at the current time by the gait generator 100 in either a ground contact period, in which the foot 22 of one of the legs 2 is in contact with the ground, or a floating period, in which both feet 22 and 22 of both legs 2 and 2 are off the ground or a floor. The gait timing information can be generated on the basis of, for example, the time information in the gait generator 100 and the floor reaction force vertical component trajectory defined by floor reaction force vertical component trajectory parameters of current time's gait parameters.

Then, based on the gait timing information, the limiter 131c sets a permissible range for the second "a" model manipulation floor reaction force moment by using, for example, the pattern illustrated in FIG. 30. The permissible range is set such that the permissible range is zero in a floating period wherein no frictional force can be produced between a foot 22 and a floor surface, but has a certain width in a ground contact period wherein the frictional force can be produced.

In the illustrated example, the upper limit value and the lower limit value of the permissible range change in a trapezoidal pattern. The permissible range is set such that the width of the permissible range starts to increase immediately after the ground contact period begins, then the width of the permissible range starts to decrease immediately before the ground contact period ends. Hence, in a situation wherein the frictional force that can be produced between the foot 22 in contact with the ground and a floor surface tends to decrease, such as immediately after or immediately before the ground contact period begins, the limiter 131c sets the permissible range to a relatively narrow range.

The limiter 131c compares an input value (high frequency component) from the calculator 131b with the permissible range while sequentially setting the permissible range as described above. If an input value from the calculator 131 b falls within a set permissible range, then the limiter 131c directly outputs the input value as the second "a" model manipulation floor reaction force moment. If an input value from the calculator 131b deviates from a set permissible range, then the limiter 131c outputs, as the second "a" model manipulation floor reaction force moment, either the upper limit value or the lower limit value of the permissible range, whichever boundary value is closer to the input value.

The total model manipulation floor reaction force moment distributor 131 carries out the processing for subtracting an output of the limiter 131 c (i.e., the second "b" model manipulation floor reaction force moment) from an output of the calculator 131b (high frequency component) by a calculator 131d, and determines an output of the calculator 131d as the second model manipulation floor reaction force moment.

Thus, if an output of the calculator 131b, i.e., the high frequency component of the total model manipulation floor reaction force moment, falls within a permissible range set by the limiter 131c, or if the body horizontal position can be perturbed (the horizontal acceleration of the body 24 can be generated) by a frictional force between a foot 22 of the robot 1 and a floor surface thereby to additionally generate a floor reaction force moment of the high frequency component about a desired ZMP, then the high frequency component is directly determined as the second "a" model manipulation floor reaction force moment and the second model manipulation floor reaction force moment is set to be zero.

If a high frequency component of the total model manipulation floor reaction force moment deviates from a permissible range set by the limiter 131c, then only the floor reaction force moment of the high frequency component that can be additionally applied about the desired ZMP by the perturbation of the body horizontal position is determined as the second "a" model manipulation floor reaction force moment. The rest of the high frequency component of the total model manipulation floor reaction force moment is determined as the second "b" model manipulation floor reaction force moment.

In this case, especially in the floating period, the permissible range set by the limiter 131c is zero, so that the entire high frequency component of the total model manipulation floor reaction force moment is determined as the second "b" model manipulation floor reaction force moment, while the second "a" model manipulation floor reaction force moment is set to zero.

This completes the detailed description of the processing carried out by the total model manipulation floor reaction force moment distributor 131 in the present embodiment.

According to the present embodiment described above, in the floating period wherein no frictional force can be produced between the robot 1 and a floor surface, the entire high frequency component of the total model manipulation floor reaction force moment is determined as the second "b" model manipulation floor reaction force moment, while the second "a" model manipulation floor reaction force moment is set to zero. Further, in the ground contact period wherein the permissible range set by the limiter 131c is relatively wide except for immediately after the ground contact period begins or immediately before the ground contact period ends (when the frictional force that can be produced between a foot 22 in contact with the ground and a floor surface is small). In general, therefore, a major portion of the high frequency component of the total model manipulation floor reaction force moment is distributed to the second "a" model manipulation floor reaction force moment and the remaining portion is distributed to the second "b" model manipulation floor reaction force moment.

Thus, the function intended by the high frequency component of the total model manipulation floor reaction force moment (the function for bringing a relatively quick change in the body posture angle Δθ close to zero) is accomplished by correcting the motion of a desired gait mainly on the basis of a body horizontal position perturbation amount in the ground contact period wherein the frictional force between a foot 22 of the robot 1 and a floor surface cart be secured. Further, the function is implemented by correcting the motion of a desired gait on the basis of a body posture perturbation amount in the floating period wherein no frictional force can be produced between the robot 1 and a floor surface.

As a result, in both the ground contact period and the floating period, a corrected desired motion that allows a relatively quick change in the body posture angle Δθ to properly approach to zero can be generated.

The relationship of correspondence between the present embodiment and the present invention is the same as that in the third embodiment.

Supplementarily, in the fourth embodiment or the third embodiment described above, the perturbation dynamic model for adjusting the body horizontal position and the perturbation dynamic model for adjusting the body posture have been separately configured. Alternatively, however, a single perturbation dynamic model integrating the two perturbation dynamic models (a perturbation dynamic model in which the perturbation of the body horizontal position and the perturbation of the body posture influence each other) may be configured.

The high frequency component of the total model manipulation floor reaction force moment (more specifically, the second model manipulation floor reaction force moment in, for example, the first embodiment or the second embodiment) may be input to the integrated perturbation dynamic model to generate a pair of the body horizontal position perturbation amount and the body posture perturbation amount.

[Fifth Embodiment]

Figure 31:
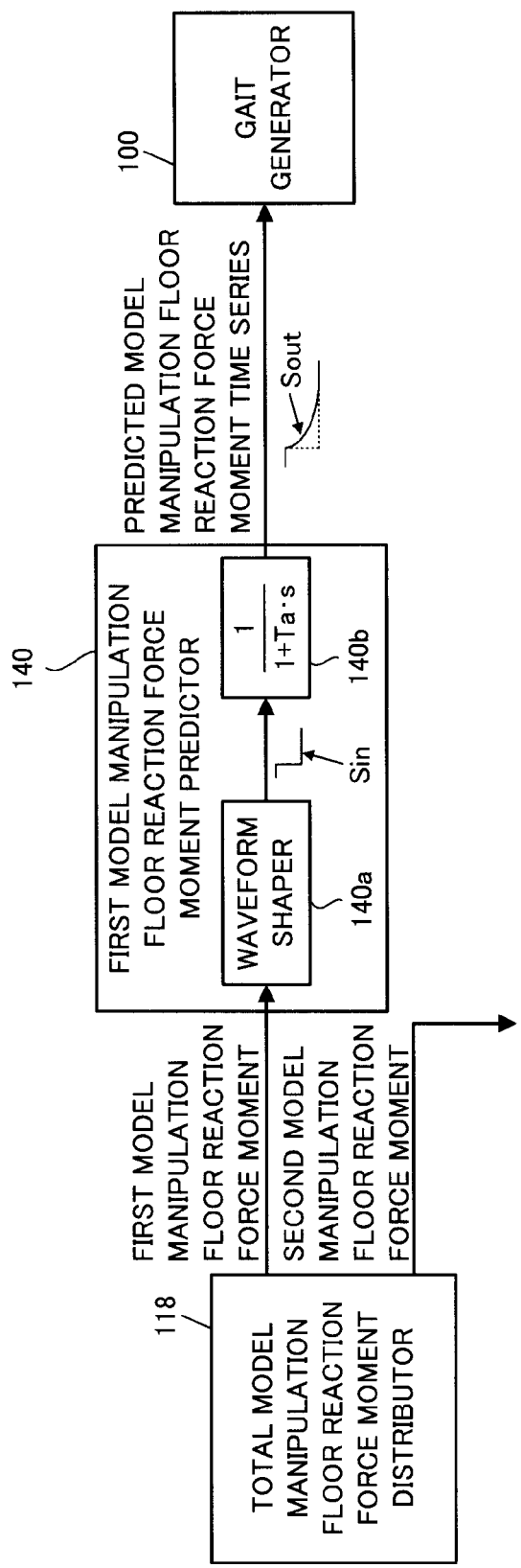
FIG. 31 is a block diagram illustrating the functional construction of an essential section of a control unit in a fifth embodiment.
Figure 32:
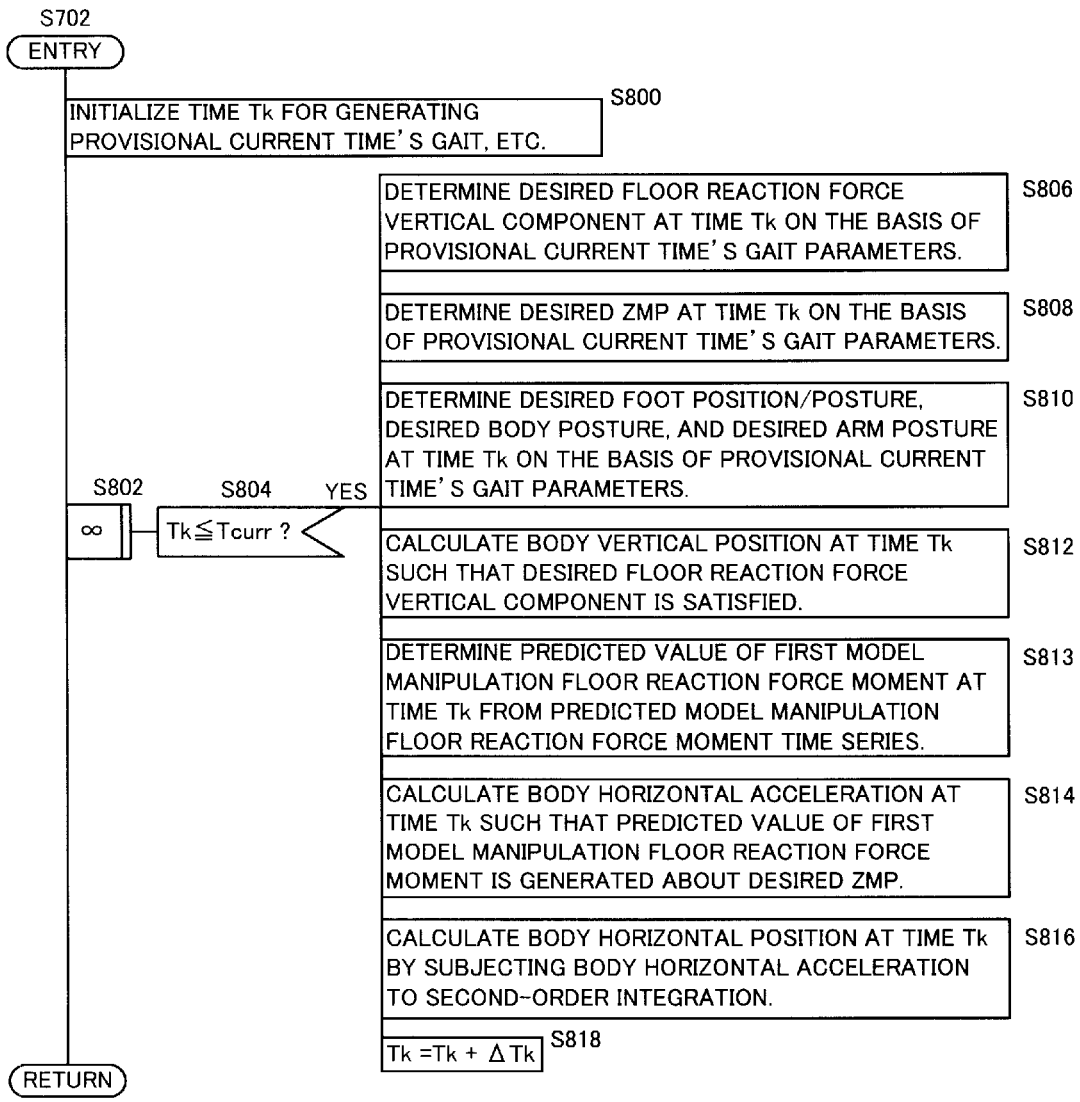
FIG. 32 is a flowchart illustrating the subroutine processing in S702 of FIG. 17 in a fifth embodiment.

Referring now to FIG. 31 and FIG. 32, a fifth embodiment of the present invention will be described. The present embodiment differs from the first embodiment only partially in the processing carried out by a control unit 26. Hence, in the description of the present embodiment, like constituent units or functional units as those in the first embodiment will be assigned the like reference numerals as those used in the first embodiment, and detailed explanation thereof will be omitted.

Referring to FIG. 31, according to the present embodiment, the control unit 26 is further provided with a first model manipulation floor reaction force moment predictor 140. A first model manipulation floor reaction force moment is sequentially input to the first model manipulation floor reaction force moment predictor 140 from a total model manipulation floor reaction force moment distributor 118.

For the purpose of convenience, FIG. 31 illustrates only essential functional elements of the control unit 26 in the present embodiment, not showing the actual robot 1, the robot geometric model 102, the composite compliance motion determiner 104, the desired floor reaction force distributor 106, the joint displacement controller 108, the feedback manipulated variable calculator 110, the perturbation model calculator 120, and the body position/posture corrector 122 illustrated in FIG. 3 in relation to the first embodiment.

In the present embodiment, the arithmetic processing cycle (control cycle) of the first model manipulation floor reaction force moment predictor 140 is the same as the arithmetic processing cycle of the functional elements, including the total model manipulation floor reaction force moment distributor 118, other than a gait generator 100 of the control unit 26. However, the arithmetic processing cycle (control cycle) of the first model manipulation floor reaction force moment predictor 140 may be the same as the control cycle of the gait generator 100.

The first model manipulation floor reaction force moment predictor 140 predicts the time series of a first model manipulation floor reaction force moment output by the total model manipulation floor reaction force moment distributor 118 after current time, and generates and outputs the predicted time series (hereinafter referred to as the predicted model manipulation floor reaction force moment time series).

In the present embodiment, an output of the first model manipulation floor reaction force moment predictor 140 is supplied to the gait generator 100 and used in the gait generation processing by the gait generator 100 (more specifically, the processing in S028 of FIG. 8). The output (the predicted model manipulation floor reaction force moment time series) of the first model manipulation floor reaction force moment predictor 140 includes a value of the first model manipulation floor reaction force moment input to the first model manipulation floor reaction force moment predictor 140 from the total model manipulation floor reaction force moment distributor 118 by current time.

The following will describe the processing by the first model manipulation floor reaction force moment predictor 140 and the processing by the gait generator 100 which uses an output of the predictor 140.

The first model manipulation floor reaction force moment predictor 140 in the present embodiment generates the predicted model manipulation floor reaction force moment time series, regarding that the first model manipulation floor reaction force moment after current time will, for example, attenuate according to a first-order lag characteristic of a predetermined time constant Ta from a value at current time.

To be more specific, the first model manipulation floor reaction force moment predictor 140 has a waveform shaper 140a and a first-order lag filter 140b (a first-order lag filter having a time constant Ta), the transfer function of which is expressed by 1/(1+Ta·s). The waveform shaper 140a generates a waveform Sin to be input to the filter 140b from the value of the first model manipulation floor reaction force moment at current time. As illustrated in the figure, the waveform Sin is a stepped input waveform in which the value after the current time changes in steps from the value at the current time to zero.

Then, the first model manipulation floor reaction force moment predictor 140 inputs the waveform Sin from the waveform shaper 140a to the filter 140b. At this time, an output waveform Sout of the filter 140b is a waveform which attenuates according to the first-order lag characteristic from the value of the first model manipulation floor reaction force moment at the current time, as illustrated in the figure, and this waveform data is generated as the predicted model manipulation floor reaction force moment time series.

This completes the detailed explanation of the processing by the first model manipulation floor reaction force moment predictor 140.

In the present embodiment, as described above, the first model manipulation floor reaction force moment after the current time has been predicted, regarding that the first model manipulation floor reaction force moment after the current time will simply attenuate from a value at the current time according to the first-order lag characteristic. Alternatively, however, the first model manipulation floor reaction force moment time series after the current time may be predicted on the basis of, for example, the history of the time series of the first model manipulation floor reaction force moment before the current time.

The predicted model manipulation floor reaction force moment time series generated as described above is used by the gait generator 100 as follows.

In the present embodiment, the gait generator 100 uses the predicted model manipulation floor reaction force moment time series in the processing in S028 carried out at each control cycle. More specifically, the predicted model manipulation floor reaction force moment time series is used in the processing in S702 of FIG. 17 (the processing for generating a provisional current time's gait) carried out during the processing in S028.

To be more specific, according to the present embodiment, in S702 of FIG. 17, the gait generator 100 generates a provisional current time's gait by carrying out the processing illustrated in FIG. 32 in place of the processing illustrated in FIG. 18.

In this processing, the processing of S806 to S818 is repeated through S800 to S804, thus generating the time series of instantaneous values of the provisional current time's gait. In this case, the processing in S800 to S804 and the processing in S806 to S812 are the same as those in the first embodiment.

In the present embodiment, the gait generator 100 carries out the processing in S812 and then S813 in the repetition loop of the processing from S806 to S818. In this step of S813, the gait generator 100 determines the predicted value of the first model manipulation floor reaction force moment at time Tk on the basis of the predicted model manipulation floor reaction force moment time series received by the current time (the current control cycle of the gait generator 100) from the first model manipulation floor reaction force moment predictor 140 (the predicted value of the first model manipulation floor reaction force moment at time when the time duration Tk has elapsed from the initial time of the predicted model manipulation floor reaction force moment time series that has been received).

Then, the gait generator 100 proceeds to S814 to determine the body horizontal acceleration at time Tk such that the predicted value of the first model manipulation floor reaction force moment determined in S813 is generated about a desired ZMP (such that the horizontal component of a moment generated about a desired ZMP by the resultant force of the inertial force of the robot 1 and the gravitational force balances the predicted value of the first model manipulation floor reaction force moment). The method for calculating the body horizontal acceleration in S814 is the same as that in S1010 of FIG. 21 explained in the first embodiment.

Subsequently, the gait generator 100 carries out the same processing as that in the first embodiment from S814 to S818.

In the present embodiment, a provisional current time's gait is generated from the start to the end thereof by repeating the processing of S806 to S818 described above. In this case, the processing of S813 and S814 is carried out to generate the provisional current time's gait, assuming that the predicted value of the first model manipulation floor reaction force moment indicated by the predicted model manipulation floor reaction force moment time series is fed back to the gait generator 100 at each time from the beginning to the end of the provisional current time's gait.

The present embodiment is the same as the first embodiment except for the aspects described above. In the present embodiment, the value (instantaneous value) of the first model manipulation floor reaction force moment used to determine a current time's gait instantaneous value in S032 of FIG. 8 is the value at the initial time of the aforesaid predicted model manipulation floor reaction force moment time series, i.e., the value of the first model manipulation floor reaction force moment output by the model manipulation floor reaction force moment distributor 118 at current time.

According to the present embodiment described above, at each control cycle of the gait generator 100, a provisional current time's gait is generated, assuming that the time series of the first model manipulation floor reaction force moment sequentially fed back to the gait generator 100 (the first model manipulation floor reaction force moment output by the model manipulation floor reaction force moment distributor 118) in the future after the current time will coincide with the time series of the predicted model manipulation floor reaction force moment as the predicted value. Further, desired ZMP trajectory parameters are corrected as necessary such that the terminal divergent component of the provisional current time's gait meets the initial divergent component of a normal gait, thus determining a current time's gait parameters that include the desired ZMP trajectory parameters.

Hence, the current time's gait parameters are determined such that the current time's gait connects to the normal gait (such that a future gait will converge to the normal gait) on the aforesaid assumption related to the first model manipulation floor reaction force moment fed back to the gait generator 100.

Thus, it is possible to restrain the time series of instantaneous values of a current time's gait actually output by the gait generator 100 (the time series of the instantaneous values determined in S032 of FIG. 18) from deviating from the time series of the instantaneous value of the current time's gait at which the determined current time's gait parameters aim (a preferred time series), thereby permitting improved agreement between the time series. This in turn makes it possible to generate a desired motion of a gait that allows continuance of the motion of the robot 1 to be secured with yet higher reliability.

Here, a supplementary description will be given of the relationship of correspondence between the present embodiment and the present invention. The processing by the first model manipulation floor reaction force moment predictor 140 implements the model external force manipulated variable predicting unit in the present invention. In this case, the predicted model manipulation floor reaction force moment time series corresponds to the time series of the future predicted values of the first model external force manipulated variable in the present invention.

The processing in S022 of FIG. 8 carried out by the gait generator 100 implements the future target determining unit in the present invention. In this case, the motion of the normal gait corresponds to a reference motion as a future target (convergence target), and the gait parameters of the normal gait correspond to reference parameters.

Further, a foot trajectory parameter and a ZMP trajectory parameter of current time's gait parameters correspond to the arithmetic parameters in the present invention.

The relationship of correspondence between the present embodiment and the present invention except for that described above is the same as that in the first embodiment.

Supplementarily, in the present embodiment, the processing carried out by the first model manipulation floor reaction force moment predictor 140 to generate the predicted model manipulation floor reaction force moment time series has been separate from the processing by the gait generator 100. Alternatively, however, the predicted model manipulation floor reaction force moment time series may be generated in the processing by the gait generator 100 (e.g., between S018 and S028 of FIG. 8).

[Modifications]

Some modifications of the aforesaid embodiments will be described.

Figure 33:
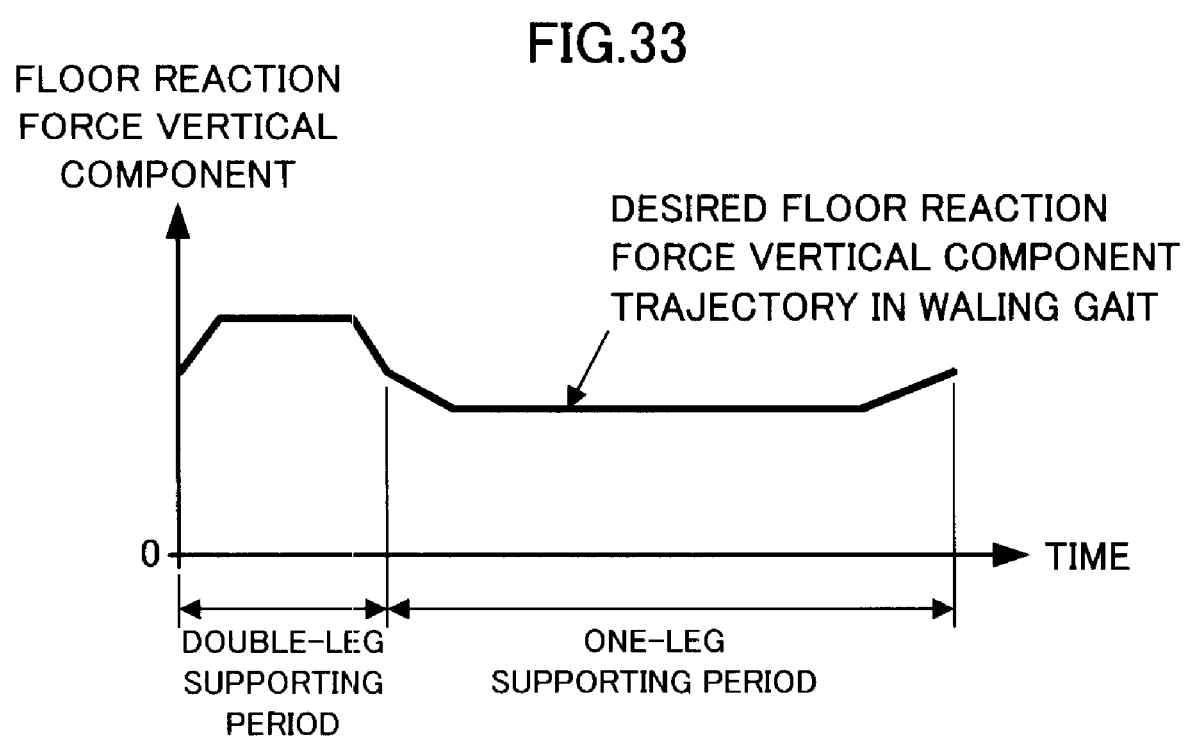
FIG. 33 is a graph illustrating a desired floor reaction force vertical component trajectory of a walking gait of the robot shown in FIG. 1.

In the embodiments described above, a desired gait for the robot 1 to perform running has been taken as an example. Instead, a desired gait for the robot 1 to perform walking may be generated. In this case, for example, as a floor reaction force vertical component trajectory (a trajectory for one step), a trajectory set in a line pattern illustrated in, for example, FIG. 33, may be used to generate a desired gait by the same method as that in the aforesaid embodiments. In the example of FIG. 33, the floor reaction force vertical component trajectory is set to shape like a trapezoid which bulges in the direction in which the floor reaction force vertical component increases (bulges upward) in a two-leg supporting period, while it is set to shape like a trapezoid which bulges in the direction in which the floor reaction force moment vertical component decreases (bulges downward) in a one-leg supporting period.

However, the floor reaction force vertical component trajectory in a desired gait for the robot 1 to walk may be a trajectory in which the value of the floor reaction force vertical component is maintained substantially constant.

In the embodiments described above, for the purpose of making the description easy to understand, the gait generator 100 uses the relatively simple dynamic model illustrated in FIG. 7 to generate desired gaits. Alternatively, however, a complicated dynamic model with high dynamic accuracy may be used to generate a desired gait. For example, a desired gait may be generated by using a dynamic model (a dynamic model provided with a flywheel and a plurality of mass points) presented in an embodiment in, for example, Japanese Patent No. 4246638, by the applicant of the present application. Further alternatively, a desired gait may be generated by using a multi-mass-point model having a mass point in each link of the robot 1.

When generating a desired gait by using these dynamic models, the desired gait may be generated with a requirement that a permissible range restricting the frictional force between a foot 22 of the robot 1 and a floor surface is variably set according to the phase of a gait or a floor condition so as to cause the frictional force produced on the basis of the inertial force of the robot 1 falls within the permissible range. As a method for generating such a desired gait, the method, for example, proposed by the applicant of the present application in an embodiment in the aforesaid Japanese Patent No. 4246638 may be adopted.

Further, in the embodiments described above, the manipulated variables in the dimension of a floor reaction force moment about a desired ZMP have been used as the model basic manipulated variable, the first model external force manipulated variable, the second model external force manipulated variable, and the actual robot external force manipulated variable in the present invention. Alternatively, however, other types of manipulated variables, such as the correction amount of a desired ZMP, which permit the manipulation of the body posture angle error $\Delta\theta$, may be used.

Further, according to the embodiments described above, in the gait generation processing by the gait generator 100, current time's gait parameters, including ZMP trajectory parameters, have been determined, using the motion of a normal gait, which is a cyclic motion, as a future target (convergence target). Alternatively, however, a target other than the motion of a normal gait may be set. For example, the desired position and the desired velocity of the center of gravity of the robot 1 at expected landing time of a free leg foot 22 of a current time's gait may be set, and the gait generation processing (the processing for generating a current time's gait) may be carried out by the gait generator 100, taking the desired position and the desired velocity as future targets.

In this case, there are the following setting examples of the desired position and the desired velocity of the center of gravity of the robot 1 at the expected landing time of the free leg foot 22 of the current time's gait. The desired position of the center of gravity of the robot 1 in the horizontal direction at the expected landing time of the free leg foot 22 is set at the middle between the expected position of the free leg foot 22 and the expected position of a supporting leg foot 22 at the expected time. Alternatively, a value obtained by multiplying, by a given coefficient, the mean velocity obtained by dividing the change amount in the center of gravity of the robot 1 in the period from the beginning time of the current time's gait to the expected landing time of the free leg foot 22 by the time of the period is set as the desired velocity of the center of gravity of the robot 1 at the expected landing time of the free leg foot 22.

Targets other than the motion of a normal gait may be set as a future target related to the motion of a gait generated by the gait generator 100 as described above.

Further, in the aforesaid embodiments, the divergent component q(k) has been defined by the aforesaid expression 118. Alternatively, however, the divergent component may be simply defined in the same manner as that in Japanese Patent No. 3726081. More specifically, the divergent component q(k) may be defined as follows.

$q(k)$=Horizontal position of body mass point+Horizontal velocity of body mass point/$\omega a$ where ωa denotes a predetermined value set beforehand. Then, according to the definition, the initial divergent component of a normal gait and the terminal divergent component of a current time's gait may be calculated.

What is claimed is:

1. A control device for a legged mobile robot that controls the motion of a legged mobile robot, which travels by moving a plurality of legs extended from a base body thereof, so as to cause the actual motion of the robot to follow the time series of an instantaneous value of a desired motion while sequentially determining the instantaneous value of the desired motion of the robot by using a dynamic model expressing the dynamics of the robot, the control device including:

a first motion determining unit which uses a first dynamic model preset for expressing the dynamics of the robot to carry out first arithmetic processing for calculating the motion of a robot on the first dynamic model, thereby sequentially determining the instantaneous value of a first motion constituting a desired motion of the robot;

a second motion determining unit which uses a second dynamic model preset for expressing the dynamics of the robot to carry out second arithmetic processing for calculating the motion of a robot on the second dynamic model, thereby sequentially determining the instantaneous value of a second motion constituting a desired motion of the robot;

a desired motion determining unit which sequentially determines an instantaneous value of the desired motion by combining an instantaneous value of the first motion and an instantaneous value of the second motion;

a motion control unit which controls the motion of the robot such that the actual motion of the robot follows the time series of an instantaneous value of the desired motion;

a feedback manipulated variable determining unit which sequentially observes a posture state amount error indicating the degree of deviation of an actual posture of the robot from a posture of the robot defined by an instantaneous value of the desired motion and sequentially determines, on the basis of the observed value of the posture state amount error, a model basic manipulated variable, which is a feedback manipulated variable for manipulating at least the first dynamic model and the second dynamic model as a feedback manipulated variable having a function for bringing the posture state amount error close to zero; and a model external force manipulated variable determining unit which sequentially determines, on the basis of the model basic manipulated variable, a first model external force manipulated variable that defines an additional external force to be additionally applied to the robot on the first dynamic model and a second model external force manipulated variable that defines an additional external force to be additionally applied to the robot on the second dynamic model as the manipulated variables to be distributed to the first dynamic model and the second dynamic model, respectively, from the model basic manipulated variable, wherein the execution cycle of the processing by the second motion determining unit, the desired motion determining unit, the motion control unit, and the feedback manipulated variable determining unit, respectively, and the execution cycle of the processing for determining at least the second model force manipulated variable in the processing by the model external force manipulated variable determining unit are set to be shorter than the execution cycle of the processing by the first motion determining unit, the first motion determining unit carries out the first arithmetic processing while additionally applying the additional external force defined by the determined first model external force manipulated variable to the robot on the first dynamic model, the second motion determining unit carries out the second arithmetic processing while additionally applying the additional external force defined by the determined second model external force manipulated variable to the robot on the second dynamic model, and the model external force manipulated variable determining unit determines the first model external force manipulated variable and the second model external force manipulated variable such that the sensitivity of a change in the first model external force manipulated variable to a low frequency component is relatively higher than to a high frequency component out of the low frequency component and the high frequency component constituting the model basic manipulated variable and that the sensitivity of a change in the second model external force manipulated variable to the high frequency component is relatively higher than to the low frequency component.

2. The control device for a legged mobile robot according to claim 1, wherein the model external force manipulated variable determining unit sequentially acquires the low frequency component and the high frequency component from the model basic manipulated variable by using at least one of a filter having a low-pass characteristic and a filter having a high-pass characteristic, and determines the low frequency component and the high frequency component, which have been acquired, as the first model external force manipulated variable and the second model external force manipulated variable, respectively.

3. The control device for a legged mobile robot according to claim 1, wherein, when determining the second model external force manipulated variable anew, the model external force manipulated variable determining unit determines the second model external force manipulated variable such that the second model external force manipulated variable changes according to the resultant value of the difference between the value of the low frequency component at current time and the latest value of the low frequency component reflected on the instantaneous value of the first motion already determined by the first motion determining unit and the value of the high frequency component at current time.

4. The control device for a legged mobile robot according to claim 1, wherein the model external force manipulated variable determining unit determines the low frequency component sequentially acquired from the model basic manipulated variable as the first model external force manipulated variable and determines, as a new value of the second model external force manipulated variable, the value obtained by subtracting the latest value of the first model external force manipulated variable already used to determine the first motion by the first motion determining unit from the model basic manipulated variable at current time when newly determining the second model external force manipulated variable.

5. The control device for a legged mobile robot according to claim 1, wherein the feedback manipulated variable determining unit is a unit that sequentially determines, on the basis of an observed value of the posture state amount error, the model basic manipulated variable and an actual robot external force manipulated variable defining an additional external force to be additionally applied to the actual robot as the feedback manipulated variables that have the function for bringing the posture state amount error close to zero, and the motion control unit has a compliance control function that controls the motion of the robot to cause the actual motion of the robot to follow the time series of the instantaneous value of the desired motion while additionally applying an additional external force defined by the actual robot external force manipulated variable to the actual robot.

6. The control device for a legged mobile robot according to claim 5, wherein the feedback manipulated variable determining unit further includes a unit that sequentially calculates a model state amount error, which is the difference between the value of a predetermined type of state amount of the second dynamic model and a predetermined desired value of the state amount, and determines a set of the model basic manipulated variable and the actual robot external force manipulated variable on the basis of an observed value of the posture state amount error and a calculated value of the model state amount error as a feedback manipulated variable having the function for bringing the posture state amount error and the model state amount error close to zero.

7. The control device for a legged mobile robot according to claim 1, wherein the instantaneous value of the second motion determined by the second motion determining unit is the instantaneous value of a perturbation motion of a predetermined portion for correcting the instantaneous value of the motion of the predetermined portion of the robot defined by the instantaneous value of the first motion determined by the first motion determining unit, and the second motion determining unit uses, as the second dynamic model, a perturbation dynamic model preset to express the relationship between the perturbation motion of the predetermined portion and the perturbation amount of an external force to be applied to the robot and carries out, as the second arithmetic processing, the arithmetic processing for calculating the perturbation motion of the predetermined portion on a perturbation dynamic model while causing the perturbation amount of an external force to be applied to the robot on the perturbation dynamic model to agree with the additional external force defined by the second model external force manipulated variable.

8. The control device for a legged mobile robot according to claim 7, wherein the first motion determining unit is a unit that carries out the first arithmetic processing by using leg motion parameters defining a desired motion trajectory of the distal end portion of each leg of the robot and ZMP trajectory parameters defining the trajectory of a desired ZMP of the robot, and has a unit that variably determines the leg motion parameters and the ZMP trajectory parameters such that at least a predetermined requirement related to the motion of the robot on the first dynamic model is satisfied and the desired ZMP defined by the ZMP trajectory parameters exists in a predetermined permissible range that depends upon the desired motion trajectory of the distal end portion of each of the legs defined by the leg motion parameters, and the perturbation motion of the predetermined portion as the instantaneous value of the second motion determined by the second motion determining unit is a perturbation motion of the base body.

9. The control device for a legged mobile robot according to claim 1, further comprising:

a model external force manipulated variable predicting unit which determines the time series of a future predicted value of the first model external force manipulated variable supplied to the first motion determining unit from the model external force manipulated variable determining unit on the basis of the first model external force manipulated variable determined by the model external force manipulated variable determining unit; and a future target determining unit which determines a future target of a desired motion of the robot, wherein the first motion determining unit comprises at least a unit which determines arithmetic parameters necessary for the first arithmetic processing by using the time series of a future predicted value of the determined first model external force manipulated variable and the determined target such that a requirement that the time series of the instantaneous value of the first motion determined in the case where it is assumed that the first arithmetic processing has been carried out while additionally applying the time series of an additional external force, which is defined by the time series of a future predicted value of the determined first model external force manipulated variable, to the robot on the first dynamic model in a predetermined period in the future will reach or converge to the determined target in the future is satisfied, and carries out the first arithmetic processing by using the determined arithmetic parameters.

10. The control device for a legged mobile robot according to claim 8, further comprising:

a model external force manipulated variable predicting unit which determines the time series of a future predicted value of the first model external force manipulated variable supplied to the first motion determining unit from the model external force manipulated variable determining unit on the basis of the first model external force manipulated variable determined by the model external force manipulated variable determining unit; and a future target determining unit which determines a future target of a desired motion of the robot, wherein the predetermined requirement is a requirement that the time series of the instantaneous value of the first motion determined in the case where it is assumed that the first arithmetic processing has been carried out while additionally applying the time series of a future predicted value of the determined first model external force manipulated variable to the robot on the first dynamic model in a predetermined period in the future will reach or converge to the determined target in the future.

11. The control device for a legged mobile robot according to claim 9, wherein the future target determining unit is a unit that determines a reference parameter, which is a virtual reference motion indicating a future convergence target for a desired motion of the robot and which determines a reference motion cyclically repeating the same pattern of motion, as the one indicating the target, and the predetermined requirement is a requirement that the time series of the instantaneous value of the first motion determined in the case where it is assumed that the first arithmetic processing has been carried out while additionally applying the time series of a future predicted value of the determined first model external force manipulated variable to the robot on the first dynamic model in a predetermined period in the future will converge to a reference motion defined by the determined reference parameter in the future.

12. The control device for a legged mobile robot according to claim 10,
   wherein the future target determining unit is a unit that determines a reference parameter, which is a virtual reference motion indicating a future convergence target for a desired motion of the robot and which determines a reference motion cyclically repeating the same pattern of motion, as the one indicating the target, and
   the predetermined requirement is a requirement that the time series of the instantaneous value of the first motion determined in the case where it is assumed that the first arithmetic processing has been carried out while additionally applying the time series of a future predicted value of the determined first model external force manipulated variable to the robot on the first dynamic model in a predetermined period in the future will converge to a reference motion defined by the determined reference parameter in the future.

* * * * *